United States Patent
Ishida et al.

(10) Patent No.: US 8,394,181 B2
(45) Date of Patent: Mar. 12, 2013

(54) SELECTIVELY PERMEABLE MATERIAL, METHOD FOR PRODUCING SELECTIVELY PERMEABLE MEMBRANE STRUCTURE, SELECTIVELY PERMEABLE MEMBRANE STRUCTURE, AND AIR CONDITIONING SYSTEM

(75) Inventors: Junya Ishida, Saitama (JP); Katsunori Iwase, Kariya (JP); Akira Yamamoto, Annaka (JP); Masahiko Minemura, Annaka (JP)

(73) Assignees: Shin-Etsu Polymer Co., Ltd., Tokyo (JP); DENSO CORPORATION, Aichi (JP); Shin-Etsu Chemical Co., Ltd., Tokyo (JP)

( * ) Notice: Subject to any disclaimer, the term of this patent is extended or adjusted under 35 U.S.C. 154(b) by 494 days.

(21) Appl. No.: 12/442,933
(22) PCT Filed: Dec. 26, 2007
(86) PCT No.: PCT/JP2007/074902
§ 371 (c)(1), (2), (4) Date: May 11, 2009
(87) PCT Pub. No.: WO2008/081798
PCT Pub. Date: Jul. 10, 2008

(65) Prior Publication Data
US 2010/0132559 A1 Jun. 3, 2010

(30) Foreign Application Priority Data

Dec. 28, 2006 (JP) .................... 2006-355400
Nov. 2, 2007 (JP) .................... 2007-286503
Nov. 2, 2007 (JP) .................... 2007-286508
Nov. 2, 2007 (JP) .................... 2007-286557

(51) Int. Cl.
*B01D 53/22* (2006.01)
*B01D 71/70* (2006.01)
*B01D 67/00* (2006.01)
*B60H 3/06* (2006.01)

(52) U.S. Cl. ............. 96/4; 96/5; 96/11; 96/12; 96/13; 96/14; 95/47; 95/54; 55/385.2; 55/385.3; 55/DIG. 5; 427/245

(58) Field of Classification Search ............. 96/4, 11, 96/12, 13, 14, 5; 95/45, 47, 54; 55/385.2, 55/385.3, 385.4, 487, 524, DIG. 5; 427/245
See application file for complete search history.

(56) References Cited

U.S. PATENT DOCUMENTS 4,444,662 A * 4/1984 Conover ............. 210/500.36
4,740,219 A * 4/1988 Kulprathipanja et al. ........ 95/51
(Continued)

FOREIGN PATENT DOCUMENTS

JP 59-112802 A 6/1984
JP 61-035808 A 2/1986
(Continued)

OTHER PUBLICATIONS

Stevens, N. Shanan Moore et al., "Formation of Hybrid Organic/Inorganic Composite Membranes via Partial Pyrolysis of poly(dimethyl siloxane)", 1998, Chemical Engineering Science, vol. 53, No. 9, pp. 1699-1711.*
(Continued)

*Primary Examiner* — Jason M Greene
(74) *Attorney, Agent, or Firm* — Osha Liang LLP

(57) ABSTRACT

A permselective material has a polymer having an organosiloxane skeleton and containing a dispersed solid additive. When oxygen and nitrogen are passed through a membrane having the permselective material, the relation between the permeability coefficients [$cm^3 \cdot cm \cdot sec^{-1} \cdot cm^{-2} \cdot cmHg^{-1}$] of oxygen and nitrogen at a temperature of 23±2° C. under a pressure difference of 1.05 atm to 1.20 atm through the membrane is expressed by Formula (1):

$$0.94 \le \frac{P(O_2)}{P(N_2)} < 1 \qquad (1)$$

where $P(O_2)$ denotes the permeability coefficient of oxygen, while $P(N_2)$ denotes the permeability coefficient of nitrogen.

12 Claims, 30 Drawing Sheets

U.S. PATENT DOCUMENTS

| | | | |
|---|---|---|---|
| 5,127,925 | A | 7/1992 | Kulprathipanja et al. |
| 6,605,140 | B2 * | 8/2003 | Guiver et al. .................... 96/4 |
| 6,840,982 | B2 * | 1/2005 | Kunstadt et al. .................. 95/47 |
| 7,166,024 | B2 * | 1/2007 | Mashiko et al. ............. 454/370 |
| 7,749,312 | B2 * | 7/2010 | Takigawa et al. ................ 96/11 |

FOREIGN PATENT DOCUMENTS

| | | |
|---|---|---|
| JP | 63-49535 | 10/1988 |
| JP | 1-19929 | 4/1989 |
| JP | 3-262523 A | 11/1991 |
| JP | 4-70048 | 11/1992 |
| JP | 7-289864 | 11/1995 |
| JP | 8-208989 A | 8/1996 |
| JP | 10-087855 A | 4/1998 |
| JP | 10-192669 A | 7/1998 |
| JP | 2002-332305 A | 11/2002 |
| JP | 2004-203367 | 7/2004 |
| WO | 2005-068058 A1 | 7/2005 |

OTHER PUBLICATIONS

PCT International Preliminary Report on Patentability and English translation of Written Opinion of The International Searching Authority mailed Jul. 16, 2009, 6 pages.

Extended European Search Report issued in EP Application No. 07860131.7, dated Aug. 24, 2011. (40 pages).

Stevens, N. Shanan Moore et al., "Formation of Hybrid Organic/Inorganic Composite Membranes via Partial Pyrolysis of Poly(Dimethyl Siloxane)," Chemical Engineering Science, May 1, 1998.

Patent Abstracts of Japan. publicaton No. 2002-332305, publication date:Nov. 22, 2002, 1 page.

Patent Abstracts of Japan, publication No. 08-208989, publication date:Aug. 13, 1996, 1 Page.

Patent Abstracts of Japan, publication No. 61-035808, publication date: Feb. 20, 1986, 1 Page.

Patent Abstracts of Japan, publication No. 10-192669, publication date:Jul. 28, 1998, 1page.

Patent Abstracts of Japan, publication No. 03-262523, publication date:Nov. 22, 1991, 1 Page.

International Search Report for International Application No. PCT/JP2007/074902, Date of Mailing: Apr. 1, 2008, 4 pages.

English Abstract from esp@cenet for Japanese patent application with Publication No. 58067302, which corresponds to JP 1-19929, Publication Date: Apr. 21, 1983, 1 page.

English Abstract from esp@cenet for Japanese patent application with Publication No. JP57156006 which corresponds to JP-63-49535, Publication Date: Sep. 27, 1982, 1 page.

English Abstract from esp@cenet for Japanese patent application with Publication No. 7289864, Publication Date: Nov. 7, 1995, 1 page.

English Abstract from esp@cenet for Japanese patent application with Publication No. 62294420, Publication Date: Dec. 21, 1987, 1 page.

English Abstract from esp@cenet for Japanese patent application with Publication No. 2004203367, Publication Date: Jul. 22, 2004, 1 page.

European Office Action issued in European Application No. 07860131.7, dated Jun. 1, 2012 (7 pages).

Marcel Mulder: "Basic Principles of Membrane Technology", Jan. 1, 1991, XP002571341, pp. 221-222.

Office Action for Japanese Patent Application No. P2007-286557 dated Dec. 4, 2012, with English translation thereof (3 pages).

Patent Abstract for Japanese Publication No. 10-087855 published Apr. 7, 1998 (1 page).

Patent Abstract for Japanese Publication No. 59-112802 published Jun. 29, 1984 (1 page).

* cited by examiner

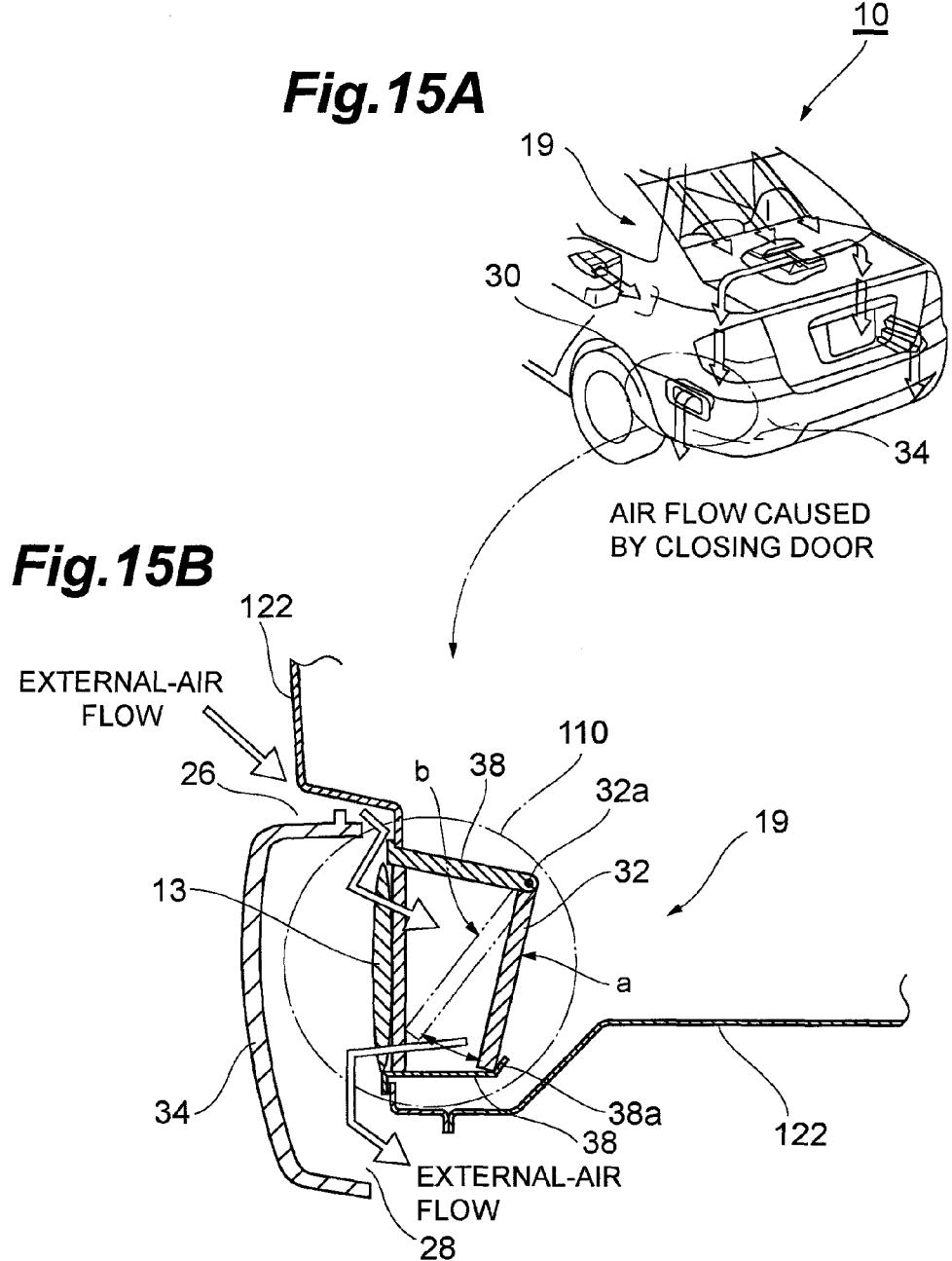

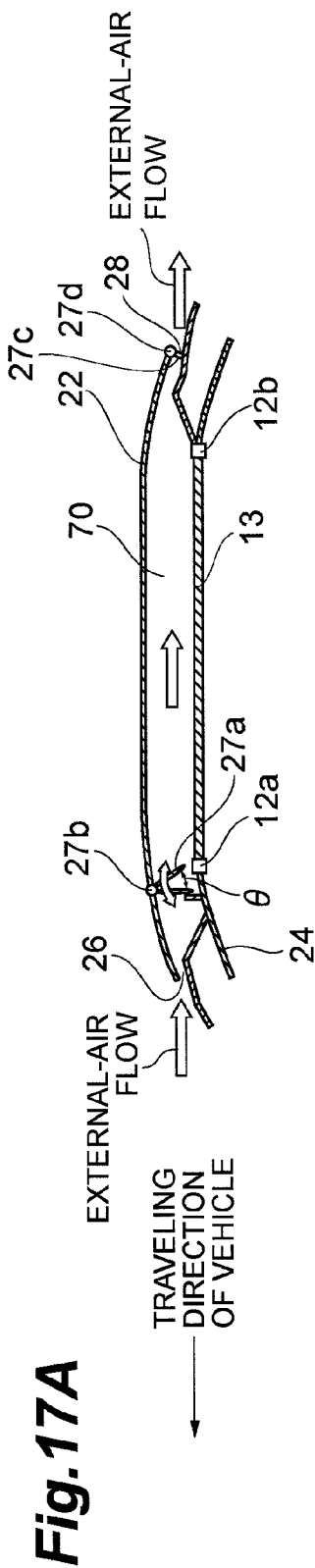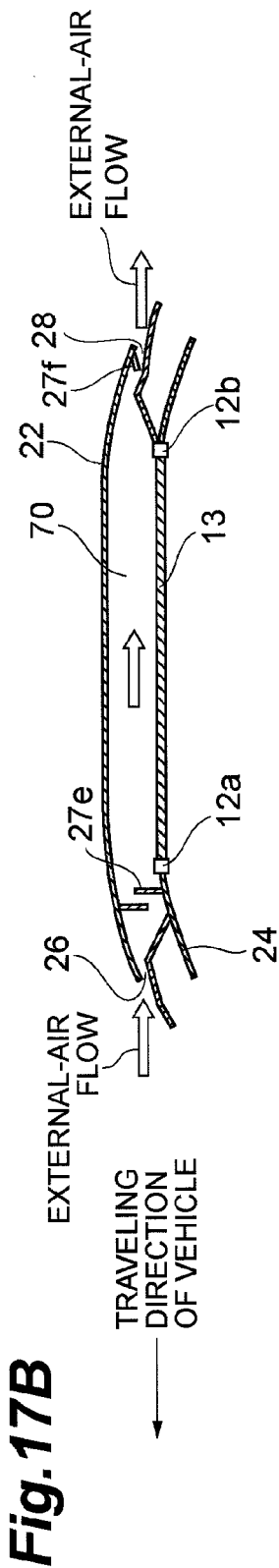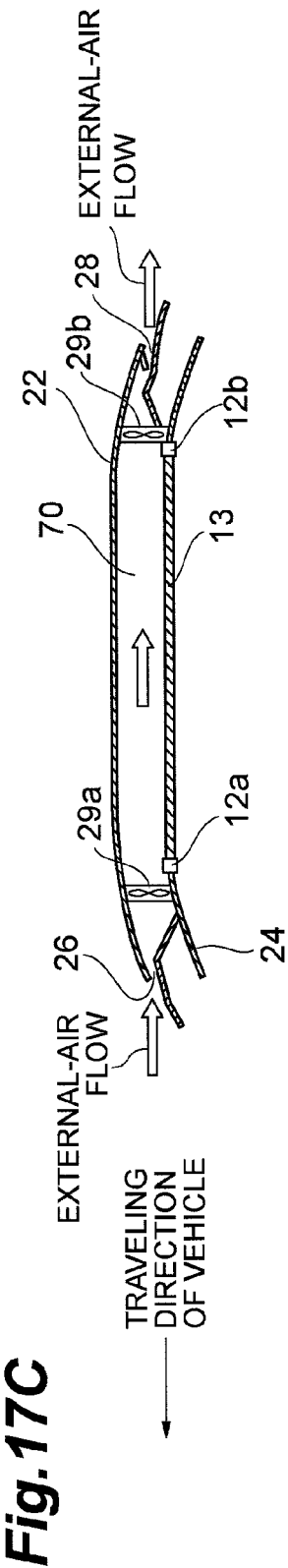

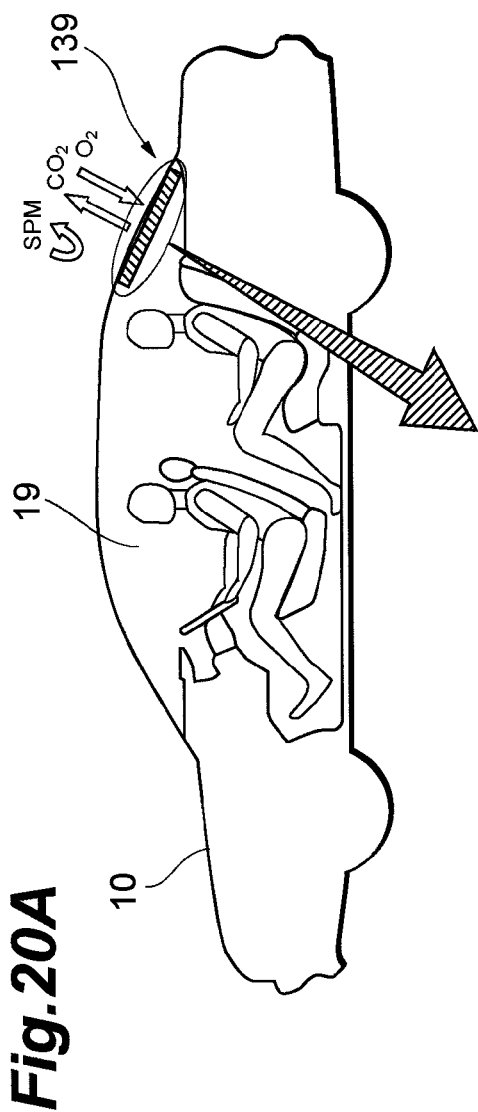
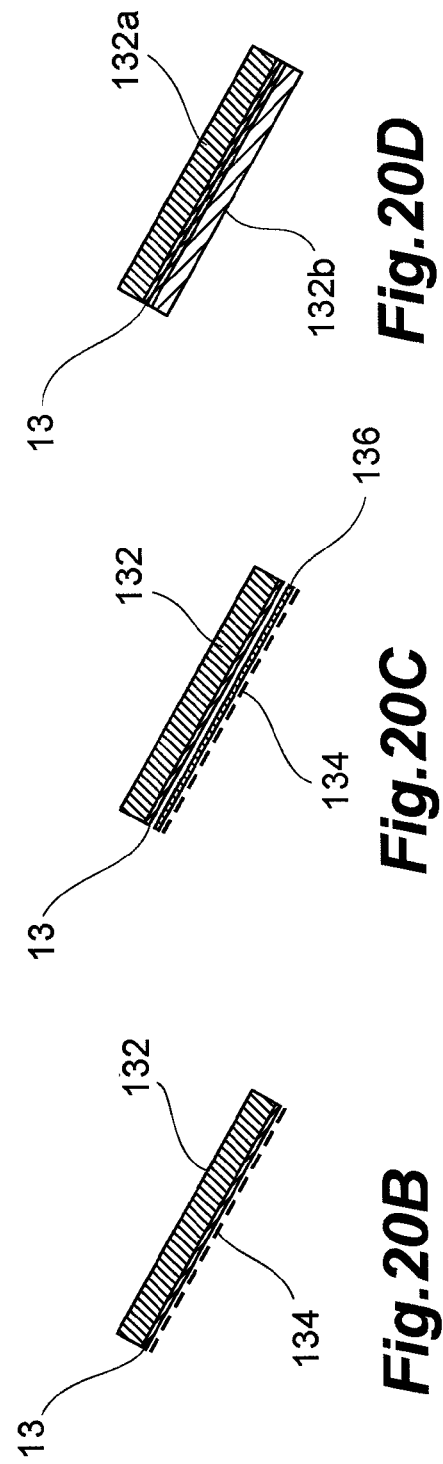

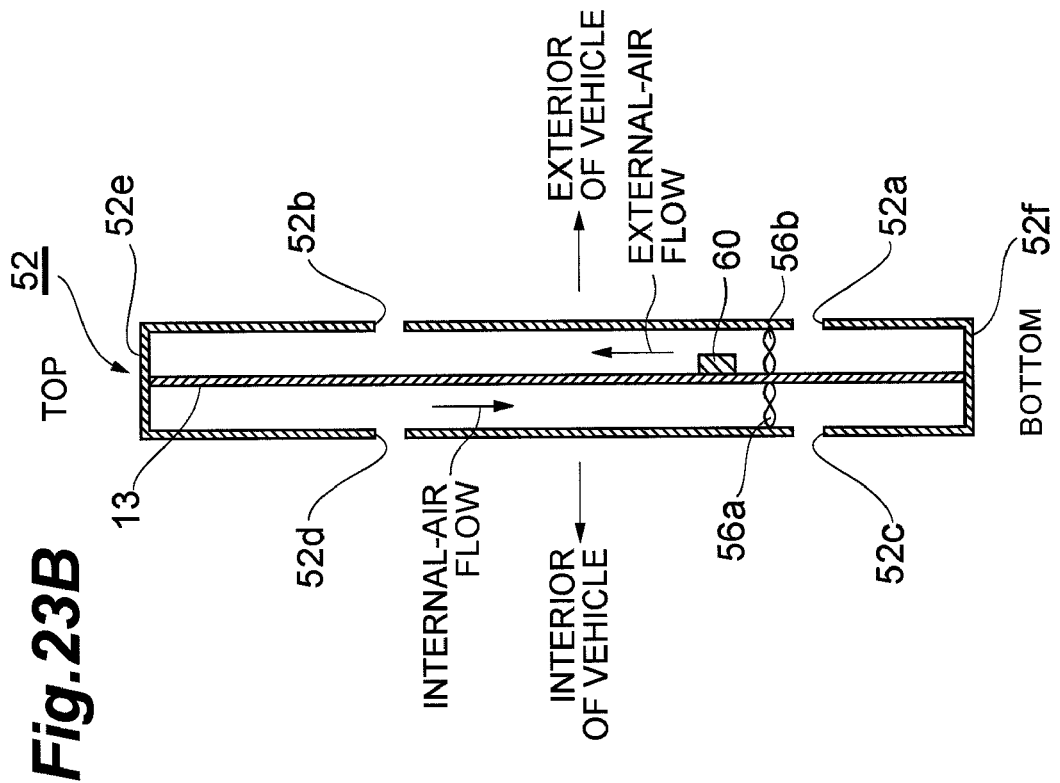
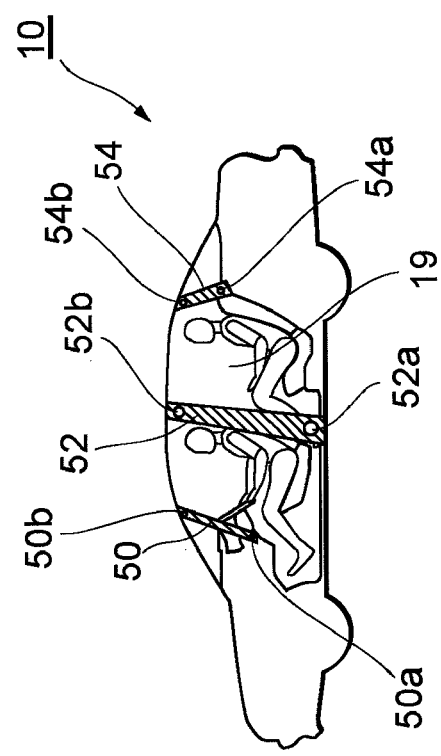

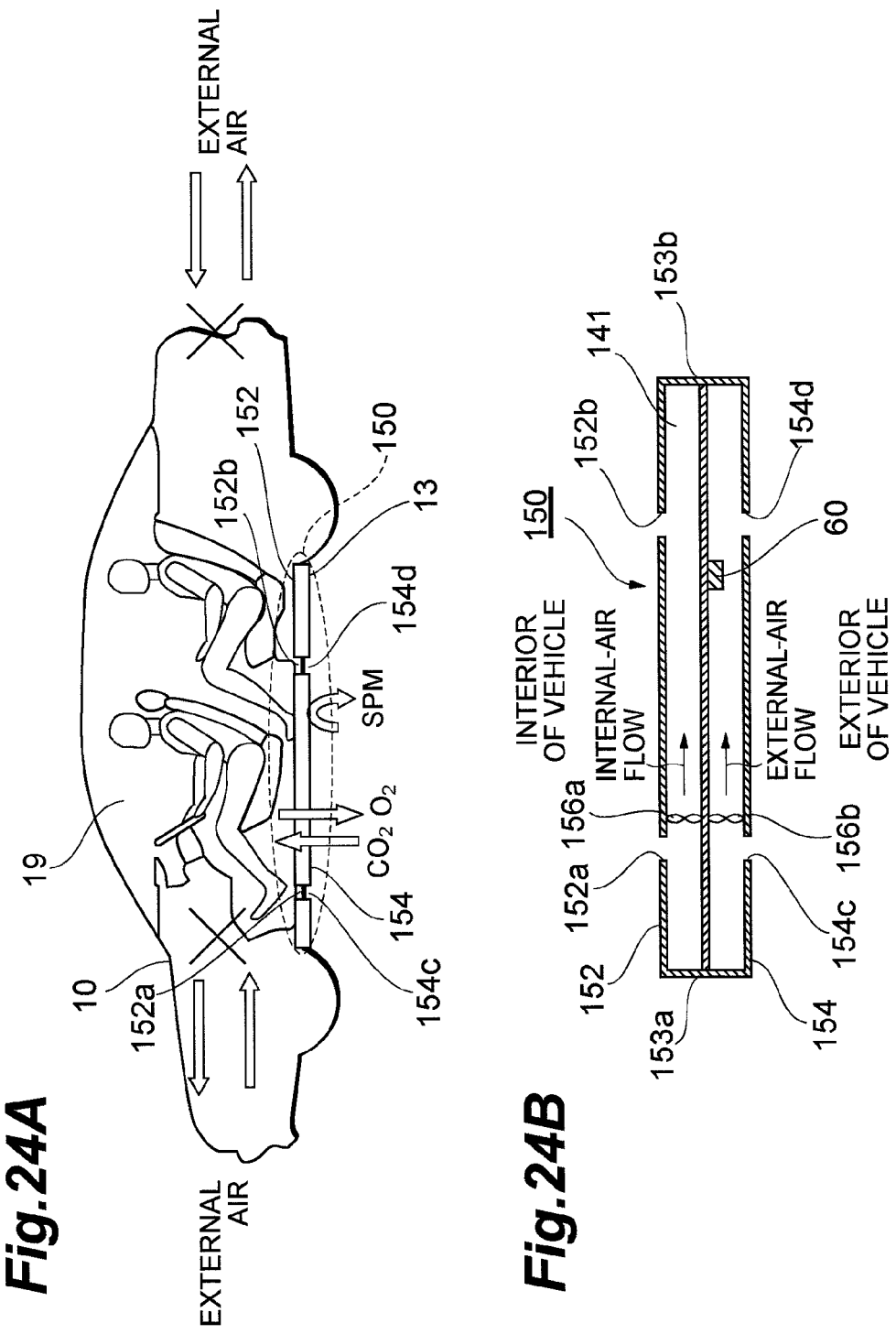

INTERIOR OF VEHICLE

EXTERIOR OF VEHICLE

EXTERNAL-AIR FLOW

SELECTIVELY PERMEABLE MATERIAL, METHOD FOR PRODUCING SELECTIVELY PERMEABLE MEMBRANE STRUCTURE, SELECTIVELY PERMEABLE MEMBRANE STRUCTURE, AND AIR CONDITIONING SYSTEM

TECHNICAL FIELD

The present invention relates generally to a permselective material, a method of making a permselective membrane structure, a permselective membrane structure, and a ventilation system.

BACKGROUND ART

Recently, the advancement of technology has enabled airtightness of spaces such as car interiors of which airtightness had not been able to be successfully achieved. In the case where many passengers stay in a car of which airtightness is high for long hours, external air must be introduced moderately into the interior to prevent the passengers from feeling headache or discomfort resulting from decreased oxygen concentration and increased carbon dioxide concentration.

Direct introduction of external air into the car interior raise health concerns to the passengers due to contaminants such as dust of urban roads and main roads. Thus, a filter may be used that removes the contaminants such as the suspended materials at an inlet of external air.

Conventionally, nonwoven cloth and mechanical filters have been used for the filter. In Patent Literature 1, an overall ventilation system for a car is proposed. No admission is made that the references discussed herein constitute prior art.
Patent Literature 1: Japanese Unexamined Patent Application Publication No. 2004-203367.

Conventional filters such as nonwoven cloth and mechanical filters may not remove suspended material in the air having a diameter not greater than 10 μm (hereinafter referred to as SPM) and especially a diameter not greater than 100 nm (hereinafter referred to as nSPM). When a gas permselective membrane made of polymer material, which can remove SPM and nSPM, is applied to the filter, the sufficient introduction of external air is not attained due to its low gas permeability.

Removal of suspended material in the air such as SPM and nSPM is one of the significant concerns in this art.

SUMMARY OF THE INVENTION

Embodiments of the invention relate generally to a permselective material made of a polymer having an organosiloxane skeleton (hereinafter referred to as silicone polymer if convenient) and a solid additive, so that the flow of the gas passing through the membrane formed of the permselective material is dominated by Knudsen flow. The "solid additive" includes an additive that is solid at normal temperature under normal pressure, but not fluid matter such as a plasticizer and an ionic liquid. The Knudsen flow represents a flow of sufficiently rarefied gas which can be readily affected by molecular motion (refer to "Kagaku Daijiten" edited by Kagaku Daijiten Henshuu Iinkai, vol. 3, p. 44 in compact edition), and is characterized by the gas permeation rate depending on the molecular weight. The term "dominated by Knudsen flow" represents that the gas permeation rate depends on the molecular weight.

Embodiments of the present invention provide a permselective material comprising a silicone polymer containing a dispersed solid additive, and when oxygen and nitrogen are passed through a membrane comprising the permselective material, the relation between the permeability coefficients $[cm^3 \cdot cm \cdot sec^{-1} \cdot cm^{-2} \cdot cmHg^{-1}]$ of oxygen and nitrogen at a temperature of 23±2° C. under a pressure difference of 1.05 atm to 1.20 atm through the membrane is expressed by Formula (1):

[Mathematical expression 1]

$$0.94 \leq \frac{P(O_2)}{P(N_2)} < 1 \tag{1}$$

where $P(O_2)$ denotes the permeability coefficient of oxygen, while $P(N_2)$ denotes the permeability coefficient of nitrogen.

Such a permselective material can remove suspended material such as SPM and nSPM in the air, while a membrane having sufficient gas permeability can be formed thereof. The term "sufficient gas permeability" in this description means that the permeability coefficients of oxygen and nitrogen at a temperature of 23±2° C. under a pressure difference of 1.05 atm to 1.20 atm are not less than $8.0 \times 10^{-8}$ $[cm^3 \cdot cm \cdot sec^{-1} \cdot cm^{-2} \cdot cmHg^{-1}]$, preferably not less than $1.0 \times 10^{-7}$ $[cm^3 \cdot cm \cdot sec^{-1} \cdot cm^{-2} \cdot cmHg^{-}]$. The term "can remove suspended material such as SPM and nSPM in the air" in this description means a blocking ratio of nSPM being not less than 80 wt % (preferably not less than 90 wt %, and more preferably not less than 99 wt %). In the case of a blocking ratio of nSPM of not less than 80 wt %, suspended materials having a larger diameter than nSPM such as SPM can be removed as a matter of course. The blocking ratio of nSPM can be measured, for example, by the method described in the Examples.

When gas passes through the membrane formed of the above-mentioned permselective material, a Knudsen flow occurs in the flow of gas therethrough. In this case, pores causing the Knudsen flow are formed preferably in at least one site selected from the group consisting of a boundary between the silicone polymer and a particle of the solid additive, a boundary between two adjacent particles of the solid additive, a particle itself of the solid additive, and a cell in the silicone polymer, more preferably in a boundary between the silicone polymer and a particle of the solid additive and/or a boundary between two adjacent particles of the solid additive.

Preferably, the solid additive is a filler, a conductive polymer, or a mixture of them. From a view point of further improving gas permeability, preferably the filler is a silica filler, and more preferably a porous filler. The solid additive being a filler preferably satisfies one of the following conditions (1) to (3):

(1) The filler is porous silica particles, and the amount of the solid additive is in the range of 25 to 1560 parts by mass for 100 parts by mass of silicone polymer;

(2) The filler is non-porous silica particle having an average particle diameter of 10 nm to 120 nm with a hydrophobic or hydrophilic surface, and the amount of the solid additive is in the range of 65 to 3800 parts by mass for 100 parts by mass of silicone polymer;

(3) The filler is non-porous titanium oxide particle having an average particle diameter of 10 nm to 60 nm with a hydrophilic surface, and the amount of the solid additive is in the range of 330 to 6400 parts by mass for 100 parts by mass of silicone polymer.

Examples of the conductive polymer include polyaniline and acid-treated polyaniline. Polyaniline and acid-treated polyaniline are, similar to silicone polymer, soluble in a solvent such as toluene. Accordingly, polyaniline dissolved in a solvent can be readily and reliably mixed with and dispersed in the silicone polymer.

One or more embodiments of the present invention provide a permselective material composed of a silicone polymer and an ionic liquid, wherein the flow of the gas passing through the membrane formed of the permselective material is dominated by the Knudsen flow.

One or more embodiments of the present invention provide a permselective material comprising a silicone polymer containing an ionic liquid additive, and when oxygen and nitrogen are passed through a membrane comprising the permselective material, the relation between the permeability coefficients [$cm^3 \cdot cm \cdot sec^{-1} \cdot cm^{-2} \cdot cmHg^{-1}$] of oxygen and nitrogen at a temperature of 23±2° C. under a pressure difference of 1.05 atm to 1.20 atm through the membrane is expressed by Formula (1):

[Mathematical expression 2]

$$0.94 \leq \frac{P(O_2)}{P(N_2)} < 1 \quad (1)$$

where $P(O_2)$ denotes the permeability coefficient of oxygen, while $P(N_2)$ denotes the permeability coefficient of nitrogen.

Such a permselective material can remove suspended material such as SPM and nSPM in the air, while a membrane having sufficient gas permeability can be formed thereof.

When gas passes through the membrane comprising the above-mentioned permselective material, a Knudsen flow occurs in the flow of gas therethrough. In this case, pores causing the Knudsen flow are formed preferably in at least one site selected from the group consisting of a boundary between the silicone polymer and the ionic liquid, a boundary between two adjacent ionic liquid regions, the ionic liquid itself, and a cell in the silicone polymer, more preferably in a boundary between the silicone polymer and the ionic liquid and/or a boundary between the two adjacent ionic liquid regions.

It is assumed that the ionic liquid dispersed in the silicone polymer contributes to the advantageous effect, although the exact reason is not clear. Such dispersion is especially notable when the permselective material of one or more embodiments of the present invention may be prepared using an ionic liquid capable of solidifying and an organic solvent. More specifically, when the organic solvent, in which the ionic liquid is insoluble, is used for silicone polymer (ionic liquids are usually insoluble in a non-polar organic solvent such as toluene), the ionic liquid is dispersed and separated in a suspended form in the polymer dissolved in such a solvent. When the solvent is evaporated, the ionic liquid is immobilized in the silicone polymer in the separated form. Subsequently, by reducing the temperature of the membrane below the melting point of the ionic liquid, the ionic liquid is solidified, so that a clearance is formed in boundaries between the silicone polymer and the ionic liquid and/or at the interior of the ionic liquid. It is believed that gas flows at high velocity in the clearance. Furthermore, when an ionic liquid region adjoins another ionic liquid region, it is believed that gas flows at high velocity in the clearance. Moreover, when cells are present in the silicone polymer, it is believed that gas flows at high velocity in the cells.

The ventilation system in accordance with one or more embodiments of the present invention includes a membrane comprising the permselective material that can supply gas to a space to be ventilated and/or can discharge gas from the space. Use of the permselective material in accordance with one or more embodiments of the present invention can block flow of suspended materials such as SPM and nSPM in the air into the space to be ventilated, and can remove suspended materials such as SPM and nSPM, if present, in the space.

One or more embodiments of the present invention also provide a method that has one or more of the following advantages. Since the airtightness of a vehicle has been enhanced in recent years, a filter and a permselective membrane to remove pollutants in the air such as suspended materials are required to be provided in various places in a vehicle. The filter and the permselective membrane for such applications must have sufficient mechanical strength for various purposes, in addition to capability to remove SPM and nSPM and gas permeability.

In view of such a situation, one or more embodiments of the present invention provide a method of making a permselective membrane structure, which has gas permeability, capability to remove SPM and nSPM, and sufficient mechanical strength for various purposes, a permselective membrane structure, and a ventilation system having the permselective membrane structure.

The first method of making a permselective membrane structure of one or more embodiments of the present invention includes the steps of filling openings of a reinforcement mesh with a mesh filler; reducing the volume of the mesh filler filled in the openings; forming a permselective membrane of a permselective material so as to cover exposed portions of the reinforcement mesh uncovered with the mesh filler and exposed portions of the mesh filler filled in the openings; and removing the mesh filler from the openings of the reinforcement mesh after the formation of the permselective membrane. In one or more embodiments of the present invention, the permselective membrane structure includes the reinforcement mesh and the permselective membrane stacked on the reinforcement mesh. Also, in one or more embodiments of the present invention, "the opening of the reinforcement mesh" corresponds to the mesh of the reinforcement mesh.

In the first method, the mesh filler is And in the opening of the reinforcement mesh for mesh filling of the reinforcement mesh, so that a smooth surface is formed on the reinforcement mesh. Since the permselective membrane is formed of the permselective material after the opening of the reinforcement mesh is filled with the mesh filler, excess flow of the permselective material into the opening of the reinforcement mesh (to an extent of filling-up of the opening) does not occur. Consequently, the permselective membrane having a uniform thickness and a smooth surface can be formed.

In addition, in the first method, the gas permeability of the permselective membrane facing the opening of the reinforcement mesh can be ensured by removing the mesh filler from the opening of the reinforcement mesh after the formation of the permselective membrane.

Furthermore, in the first method, the volume shrinkage ratio of the mesh filler can be controlled during the volume shrinkage of the mesh filler filled in the opening, so that the volume of the space formed in the opening of the reinforcement mesh accompanied with the volume shrinkage of the mesh filler can be controlled. The volume of the permselective material to be introduced into the space accompanied with the volume shrinkage of the mesh filler is, thus, adjustable. Consequently, the thickness of the permselective membrane after the membrane formation, more specifically, the thickness of the permselective membrane facing the opening is adjustable. Furthermore, the introduction of the permselective material into the space formed in the opening of the reinforcement mesh due to the volume shrinkage of the mesh filler generates a structure of the reinforcement mesh stuck in the permselective membrane after the formation of the membrane. Since this structure has an anchor effect, the permselective membrane can be attached firmly to the reinforcement mesh.

The second method of making a permselective membrane structure comprises the steps of filling openings of a reinforcement mesh with a mesh filler; forming an intermediate layer capable of bonding both the mesh filler and a permselective material on exposed portions of the mesh filler filled in the opening; reducing the volume of the mesh filler filled in the opening; forming a permselective membrane of a permselective material so as to cover exposed portions of the reinforcement mesh uncovered with the mesh filler and the intermediate layer; and removing the mesh filler and the intermediate layer from the openings of reinforcement mesh after the formation of the permselective membrane.

The above mentioned second method also has the advantages of the first method. Furthermore, since the permselective material is formed on the surface of the intermediate layer capable of bonding the mesh filler and the permselective material in the second method, the permselective material can be readily formed into a membrane, resulting in ready fabrication of a permselective membrane having an even thickness and a smooth surface. If the permselective membrane is formed so as to directly cover the exposed portions of the reinforcement mesh and the exposed portions of the mesh filler filled in the opening using a permselective material that cannot be readily bonded to the mesh filler, the permselective material is not easily formed into a membrane on the surface of mesh filler due to the difficulty in bonding between the mesh filler and the permselective material. In contrast, the second method is free from this problem, because the permselective material is formed on the surface of the intermediate layer capable of bonding both the mesh filler and the permselective material.

In the first and second methods, it is preferred to form exposed portions in the reinforcement mesh by partially exposing the reinforcement mesh originally covered with the mesh filler in the process to reduce the volume of the mesh filler filled in the opening.

The mesh filler readily shrinks during a treatment such as drying. Exposed portions of the reinforcement mesh can, thus, be readily formed by means of the volume shrinkage of the mesh filler. Furthermore, the process of removing the portions of the mesh filler covering the reinforcement mesh so as to form the exposed portions of the reinforcement and smoothing the surface of the reinforcement mesh by the removal of the mesh filler are not necessary before the formation of the permselective membrane by means of the volume shrinkage of the mesh filler.

One or more embodiments of the present invention provide a permselective membrane structure made by the above-mentioned first or second method, wherein a permselective material to form the permselective membrane comprising a silicone polymer containing a dispersed solid additive, and when oxygen and nitrogen are passed through the membrane comprising the permselective material, the relation between the permeability coefficients [$cm^3 \cdot cm \cdot sec^{-1} \cdot cm^{-2} \cdot cmHg^{-1}$] of oxygen and nitrogen at a temperature of 23±2° C. under a pressure difference of 1.05 atm to 1.20 atm through the membrane is expressed by Formula (1). The width of the opening of the reinforcement mesh is larger than the thickness of the permselective membrane, and the opening ratio of the reinforcement mesh is not less than 30%.

[Mathematical expression 3]

$$0.94 \le \frac{P(O_2)}{P(N_2)} < 1 \tag{1}$$

where $P(O_2)$ denotes the permeability coefficient of oxygen, while $P(N_2)$ denotes the permeability coefficient of nitrogen.

Preferably, the solid additive for the permselective membrane structure is selected from the above-mentioned additives.

One or more embodiments of the present invention provide a permselective membrane structure made by the above-mentioned first or second method, wherein a permselective material to form the permselective membrane comprising a silicone polymer containing an ionic liquid additive, and when oxygen and nitrogen are passed through the membrane comprising the permselective material, the relation between the permeability coefficients [$cm^3 \cdot cm \cdot sec^{-1} \cdot cm^{-2} \cdot cmHg^{-1}$] of oxygen and nitrogen at a temperature of 23±2° C. under a pressure difference of 1.05 atm to 1.20 atm through the membrane is expressed by Formula (1). The width of the opening of the reinforcement mesh is larger than the thickness of the permselective membrane, and the opening ratio of the reinforcement mesh is not less than 30%.

[Mathematical expression 4]

$$0.94 \le \frac{P(O_2)}{P(N_2)} < 1 \tag{1}$$

where $P(O_2)$ denotes the permeability coefficient of oxygen, while $P(N_2)$ denotes the permeability coefficient of nitrogen.

Since the permselective membrane in the permselective membrane structure of one or more embodiments of the present invention is formed of the above-mentioned permselective material (composed of one of the solid additive or the ionic liquid, and silicone polymer), the flow of the gas passing through the membrane comprising the permselective material is dominated by Knudsen flow. The permselective membrane structure having such a permselective membrane can remove suspended materials such as SPM and nSPM in the air and ensures sufficient gas permeability.

In order to improve the gas permeability of the permselective membrane, it is necessary to reduce the thickness of the permselective membrane. Although a reduction in thickness of the permselective membrane further improves the gas permeability, it causes a reduction in the strength of the membrane, resulting in ready breakage of the membrane. In one or more embodiments of the present invention, therefore, the permselective membrane having a small thickness can be reinforced by the permselective membrane structure composed of the permselective membrane layered on the reinforcement mesh. Such a permselective membrane structure can exhibit high strength durable in various applications.

In one or more embodiments of the present invention, by the use of the reinforcement mesh having a width of the opening larger than the thickness of the permselective membrane and an opening ratio not less than 30%, the permselective membrane can be reinforced without impairing the gas permeability of the permselective membrane and the gas permeability through the entire permselective membrane structure. In the permselective membrane structure using the reinforcement mesh superior to the porous films and the nonwoven cloth in gas permeability, the gas permeability of the entire permselective membrane structure can, therefore, be improved compared to that of a permselective membrane structure including the permselective membrane reinforced by a porous film or nonwoven cloth.

The ventilation system of one or more embodiments of the present invention is provided with the permselective membrane structure of one or more embodiments of the present invention that supplies gas to a space to be ventilated and/or discharges the gas from the space. Due to the use of the permselective membrane structure of one or more embodiments of the present invention, the suspended materials such as SPM and nSPM in the air do not flow into the space to be ventilated, and the suspended materials such as SPM and nSPM in the space, if present, can be removed.

One or more embodiments of the present invention provide a permselective material which can form a membrane which can remove suspended material such as SPM and nSPM in the air and has sufficient gas permeability, and a ventilation system using the material.

Furthermore, one or more embodiments of the present invention provide a method of making a permselective membrane structure, which has gas permeability, a capability to remove SPM and nSPM, and sufficient mechanical strength for the various purposes, a permselective membrane structure made by the method, and a ventilation system having the permselective membrane structure.

BRIEF DESCRIPTION OF THE DRAWINGS

FIG. 15 is an outline schematic view illustrating a vehicle provided with a permselective membrane made of a perm selective material of one or more embodiments of the present invention in ventilation equipment for pressure regulation, in an embodiment of a ventilation system of the present invention.

FIG. 17 is an outline schematic view illustrating a vehicle provided with a permselective membrane made of a permselective material of one or more embodiments of the present invention in the ceiling, in an embodiment of the ventilation system of the present invention.

FIG. 20 is an outline schematic view illustrating a vehicle provided with a permselective membrane made of a permselective material of one or more embodiments of the present invention in the rear windshield, in an embodiment of the ventilation system of the present invention.

FIG. 23 is a schematic cross-sectional view illustrating a vehicle provided with a permselective membrane made of a permselective material of one or more embodiments of the present invention in the pillar, in an embodiment of the ventilation system of the present invention.

FIG. 24 is a schematic cross-sectional view illustrating a vehicle provided with a permselective membrane made of a permselective material of one or more embodiments of the present invention in the floor, in an embodiment of the ventilation system of the present invention.

FIG. 25A is a side view illustrating a vehicle 10 provided with a permselective membrane made of a permselective material of one or more embodiments of the present invention in the door in an embodiment of a ventilation system of the present invention, while

REFERENCE SIGNS LIST

Figure 1:
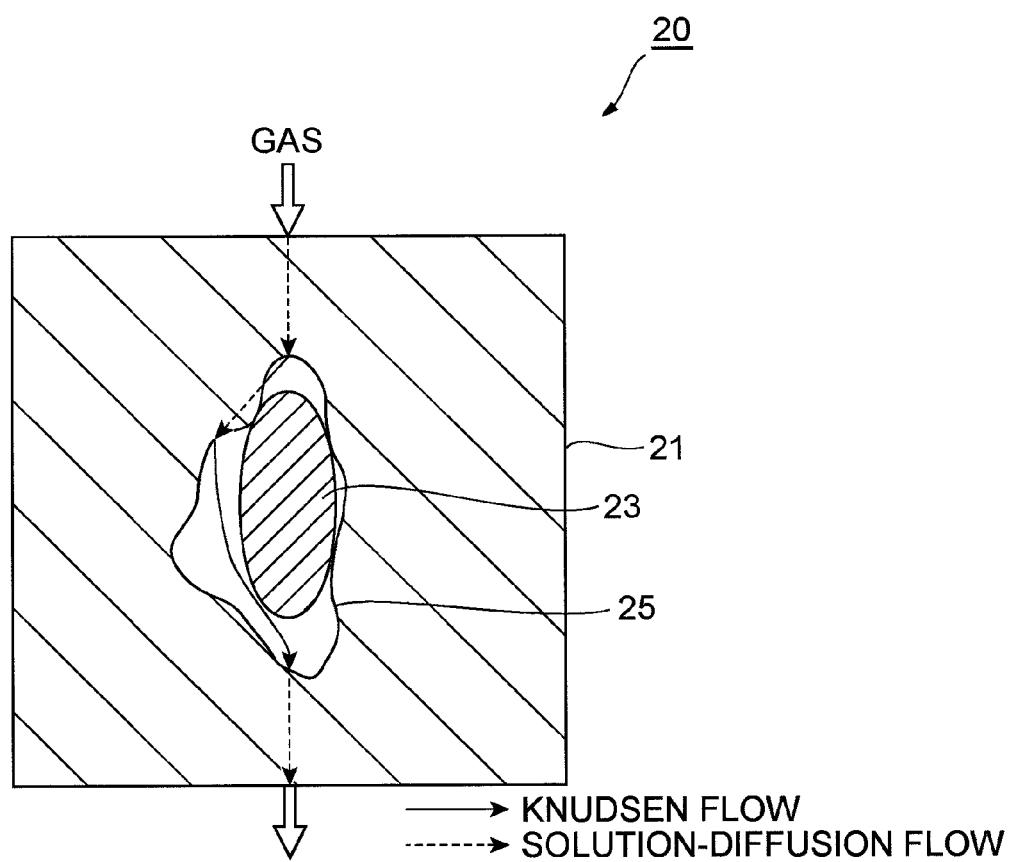
FIG. 1 is an imaginary picture illustrating a gas flow passing through a membrane formed of a permselective material of one or more embodiments of the present invention.

10: vehicle, 11: vehicle interior wall, 12a: front reinforcement, 12b: rear reinforcement, 13, 13a, and 13b: permselective membrane, 13c: reinforcement, 14 and 36: dust removal filter, 16: dehumidifier, 17: deodorant, 18: oxygen sensor, 19: vehicle interior, 20: membrane, 21: silicone, 22: exterior wall, 23: solid additive, 24: interior wall, 25: pore, 26 and 126: external air inlet, 27a: front flapper, 27b and 27d: hinge, 27c: rear flapper, 27e: front weir, 27f: rear weir, 28: external air outlet, 29a: front fan, 29b: rear fan, 30: air-conditioning unit, 32: damper, 32a: hinge, 34: bumper, 35: air-conditioning unit case, 35a: external air inlet, 35b: internal air inlet, 35c: opening, 37: centrifugal blower fan, 38: frame, 40a: permselective membrane structure, 42a and 42b: base, 50: front pillar, 52: central pillar, 52a and 154c: external air intake, 52b, 128, and 154d: external air outlet, 52c and 152a: internal air intake, 52d and 152b: internal air outlet, 52e: top end, 52f: bottom end, 53: side plate, 54: rear pillar, 60: temperature sensor, 70: cavity, 80: window, 90: control unit, 110: ventilating device for pressure regulation, 112: cover, 118: blower, 120: space, 122: vehicle body, 126: external air inlet, 127a: front weir, 127b: rear weir, 130: windshield, 132: porous glass, 138: sliding roof, 140: door, 150: floor, 151: space, 152: floor panel, 154: outer plate, 156a and 156b: fan, 164: interior component, 302: reinforcement mesh, 302b: opening of reinforcement mesh, 302c: exposed reinforcement mesh, 321: silicone polymer, 323: solid additive, 325: pore, 332: mesh filler, 332a: exposed mesh filler, 334: intermediate layer, 400, 400a and 400b: permeable member.

DETAILED DESCRIPTION

Exemplary embodiments of the invention will be described below with reference to the accompanying figures. In the following detailed description of embodiments of the invention, numerous specific details are set forth in order to provide a more thorough understanding of the invention. However, it will be apparent to those of ordinary skill in the art that the invention may be practiced without these specific details. In other instances, well-known features have not been described in detail to avoid obscuring the invention.

Permselective Material

A permselective material of one or more embodiments of the present invention is made of silicone polymer containing dispersed solid additives, and when oxygen and nitrogen are passed through a membrane comprising the permselective material, the relation between the permeability coefficients [$cm^3 \cdot cm \cdot sec^{-1} \cdot cm^2 \cdot cmHg^{-1}$] of oxygen and nitrogen at a temperature of 23±2° C. under a pressure difference of 1.05 atm to 1.20 atm through the membrane is expressed by Formula (1):

[Mathematical expression 5]

$$0.94 \leq \frac{P(O_2)}{P(N_2)} < 1 \tag{1}$$

where $P(O_2)$ denotes the permeability coefficient of oxygen, while $P(N_2)$ denotes the permeability coefficient of nitrogen.

A permselective material of one or more embodiments of the present invention may be made of silicone polymer containing ionic liquid additive, and when oxygen and nitrogen are passed through a membrane comprising the permselective material, the relation between the permeability coefficients [$cm^3 \cdot cm \cdot sec^{-1} \cdot cm^2 \cdot cmHg^{-1}$] of oxygen and nitrogen at a temperature of 23±2° C. under a pressure difference of 1.05 atm to 1.20 atm through the membrane is expressed by Formula (1) described above.

In the following description, when the quotient of the permeability of oxygen divided by the permeability of nitrogen ($P(O_2)/P(N_2)$), hereinafter also referred to as "separation ratio α") in Formula (1) is equal to or higher than 0.94 and below 1, the flow of the gas passing through the membrane formed of the permselective material is dominated by Knudsen flow. As described above, in the Knudsen flow, the gas permeability rate depends on the molecular weight, and when the flow of gas passing through a membrane is an ideal Knudsen flow, the gas permeability P is inversely proportional to the square root of the molecular weight. For example, the separation ratio α of the passing gas composed of oxygen and nitrogen is 0.935 as is expressed in Formula (2):

[Mathematical expression 6]

$$\alpha = \frac{P(O_2)}{P(N_2)} = \frac{\sqrt{M(N_2)}}{\sqrt{M(O_2)}} = 0.935 \tag{2}$$

where $P(O_2)$ and $P(N_2)$ denote the permeability coefficients of oxygen and nitrogen, respectively, while $M(O_2)$ and $M(N_2)$ denote the molecular weights of oxygen and nitrogen, respectively.

In contrast, there is another flow of gas called solution-diffusion flow. The solution-diffusion flow depends on the product of the solubility of gas in a membrane and the diffusion coefficient of gas in the membrane, so that the gas permeability rate in the membrane is generally lower than the rate in a Knudsen flow. In a conventional membrane containing silicone polymer, since the solution-diffusion flow is dominant in the flow of gas passing through the membrane, it is known that the separation ratio α for oxygen and nitrogen is equal to or higher than 1.

In consideration of these facts, it is predicted that the membrane formed of the permselective material of one or more embodiments of the present invention, which has a separation ratio α ($P(O_2)/P(N_2)$) expressed in the above Formula (1), causes a Knudsen flow when gas passes through the membrane and thus has a significantly improved gas permeability, compared to conventional membranes.

Details of embodiments of the present invention are provided below.

FIG. 1 is a schematic cross-sectional view illustrating a membrane 20 formed of a permselective material of one or more embodiments of the present invention. The membrane 20 is composed of a silicone polymer 21 and a solid additive particle 23, having a pore 25 (for example, a pore of 1 nm to 100 nm) that causes a Knudsen flow in the boundaries between them. It is believed that the pore 25 is generated due to low affinity between the silicone polymer 21 and the solid additive particles 23.

In such a membrane 20, gas passes through the silicone polymer 21 in a solution-diffusion flow regime and through the pore 25 in a Knudsen flow regime. When the solid additive particle 23 has permeable properties itself such as porous matter, it is believed that the gas also passes through the solid additive particle. Furthermore, it is believed that when the solid additive particles are attached to each other, gas passes through the pore formed in the boundaries between the adjacent solid additive particles in the Knudsen flow regime. When a cell is present in the silicone polymer 21, gas probably passes through the cell in the Knudsen flow regime.

In the membrane 20 formed of the permselective material of one or more embodiments of the present invention, it is assumed that the gas permeability is improved drastically, because the distance gas passing through in the Knudsen flow regime is longer than the distance in the solution-diffusion flow regime. Also, it is believed that the suspended material in the air such as SPM and nSPM can be removed, because SPM and nSPM are blocked by the portion gas passes through in the solution-diffusion flow regime.

Meanwhile, it is believed that using an ionic liquid instead of the solid additive 23 causes a Knudsen flow in a similar mechanism.

The silicone polymer includes polyorganosiloxane composed of one or more siloxy groups selected from the following Formulae (3), (4), (5), and (6) (Rs in the formulae each include independently an alkyl, aryl, aralkyl, or alkenyl group having a carbon number of 1 to 30, which may be substituted by halogen) or a copolymer composed of a polyorganosiloxane unit and an organic polymer other than silicone, i.e., silicone denatured cycloolefin polymer, silicone-denatured pullulan polymer (for example, one described in Japanese Unexamined Patent Application Publication No. 8-208989), and silicone denatured polyimide polymer (for example, one described in Japanese Unexamined Patent Application Publication No. 2002-332305).

$$R_3SiO_{1/2} \tag{3}$$

$$R_2SiO_{2/2} \tag{4}$$

$$RSiO_{3/2} \tag{5}$$

$$SiO_{4/2} \tag{6}$$

Preferably, the solid additive is a filler, a conductive polymer, or a mixture of them. The usable filler includes an organic filler and an inorganic filler, preferably an inorganic filler having a hydrophilic surface. Examples of such inorganic fillers include oxide fillers having a hydrophilic surface due to the presence of hydroxyl groups on the surface, such as silica, zeolite, alumina, titanium oxide, magnesium oxide, and zinc oxide. Among these, preferred is a silica filler from a view point of wetting with the silicone polymer. Example of the silica filler includes spherical silica, porous silica (including zeolite and mesoporous silica), quartz powder, glass powder, glass beads, talc, and silica nanotubes.

Preferably, the surface of the filler to be added is not hydrophobized. A hydrophilized filler surface-treated with a coupling agent or hydrated may be used, if necessary.

Preferably the filler is a porous filler, from a view point of gas permeability. The preferred porous fillers are mesoporous silica and zeolite. Preferably, from a view point of wettability with a silicone polymer, the filler has a spherical shape having practically negligible surface roughness, a small surface area, and no effect on changes in characteristics caused by orientation.

In order to reduce the thickness of the membrane formed of the permselective material, the diameter of the filler is preferably 1 nm to 100 μm, and more preferably 10 nm to 10 μm. A non-porous silica particle filler having a hydrophobic or hydrophilic surface has an average particle diameter in the range of preferably 10 to 120 nm, and more preferably 10 to 60 nm, from a view point of further improved gas permeability in the membrane. Alternatively, a non-porous titanium oxide particle filler having a hydrophilic surface has an average particle diameter in the range of preferably 10 to 60 nm from a view point of further improved gas permeability in the membrane.

Such a filler is added to a silicone polymer in an amount of preferably 25 to 500 parts by mass and more preferably 25 to 300 parts by mass for 100 parts by mass of silicone polymer. The gas permeability in the membrane containing less than 25 parts by mass of additive cannot be improved effectively, while the strength of the membrane containing more than 500 parts by mass of additive is liable to be reduced, precluding a reduction in thickness.

Examples of the conductive polymer include polyaniline, polyacethylene, polythiophene, and polypyrrole, and polyaniline is preferred. Polyaniline has low affinity to a silicone polymer and good solvents therefor are different from those for the silicone polymer. The pore size between polyaniline and the silicone polymer is therefore increased, so that the gas permeability will be improved.

From a view point of the gas permeability, the conductive polymer is preferably acid-treated before addition. A conductive polymer such as polyaniline forms leuco-emeraldin salt and/or emeraldine salt through contact with acid, so that the affinity to the silicone polymer is remarkably reduced. The pore size between the silicone polymer and the conductive polymer is therefore increased, so that it is believed that the gas permeability is improved. Examples of the acid to be added include hydrochloric acid, perchloric acid, sulfuric acid, nitric acid, vinylsulfonic acid and acrylic acid.

The preferred amount of the acid to be added for acid treatment of the conductive polymer depends on the combination of the silicone polymer and the conductive polymer, and is in the range of preferably 0.5 to 45.6 parts by mass for 100 parts by mass of the conductive polymer. In particular, in the case of the silicone polymer being silicone denatured pullulan polymer and the conductive polymer being polyaniline, it is preferred to add 0.9 to 1.4 parts by mass of 2 N hydrochloric acid to 100 parts by mass of the conductive polymer. In the case of the silicone polymer being silicone denatured cycloolefin polymer and the conductive polymer being polyaniline, it is preferred to add 4.6 to 9.1 parts by mass of 2 N hydrochloric acid to 100 parts by mass of the conductive polymer.

The amount of the conductive polymer (a solution of a conductive polymer polyaniline (made by Aldrich Co., molecular weight: 20,000) dissolved in cyclohexanone, a solid content: 2 wt %) that is added to a silicone polymer is preferably 2.2 to 80.0 parts by mass and more preferably 5.0 to 30 parts by mass, for 100 parts by mass of silicone polymer. At an amount of the conductive polymer of less than 2.2 parts by mass, the gas permeability in the resulting membrane cannot be improved effectively in some cases. At an amount of the conductive polymer of more than 80.0 parts by mass, the gas permeabilty in the resulting membrane cannot be improved effectively while a satisfactory membrane cannot be formed, resulting in a decrease in strength of the membrane.

The term "ionic liquid" means an ionic compound that is composed of anions and cations and that can be melted at a temperature region at which the compound is not thermally decomposed, without dissolution process to any solvent. Examples of the cation in the ionic liquid include imidazolium cation, pyridinium cation, and quaternary ammonium ions. Examples of the anion in the ionic liquid include $Cl^-$, $Br^-$, $BF_4^-$, $PF_6^-$, $NO_3^-$, and $CF_3SO_3^-$. Examples of the ionic liquid include 1-ethyl-4-methylimidazolium nitrate expressed by Formula (A) and 1-ethyl-4-methylimidazolium phosphate expressed by Formula (B). The melting point of the ionic liquid added to the permselective material of one or more embodiments of the present invention is preferably 20° C. (room temperature) to 100° C., and more preferably 40° C. to 60° C.

[Chemical Formula 1]

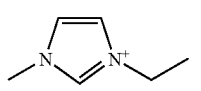

(A)

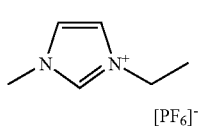

(B)

Any solvent may be added to the permselective material if necessary. Examples of the solvent include toluene, methyl ethyl ketone, ethyl acetate, n-methylpyrrolidone (hereinafter referred to as NMP), cyclohexane, and cyclohexanone. The type of solvent can be selected according to the type of the silicone polymer. For example, toluene, methyl ethyl ketone, ethyl acetate, and NMP are usable for a silicone-denatured pullulan polymer. When a conductive polymer such as polyaniline is added, it is preferred to dissolve the silicone polymer and the conductive polymer in separate solvents before mixing of them. For example, it is preferred to dissolve the silicone polymer in toluene and the polyaniline in cyclohexanone individually before mixing of them.

The permselective material may be blended if necessary. For example, a silicone polymer in the form of pellet or bale may be blended with other constituents using, for example, an extruder or kneader. Alternatively, the silicone polymer dissolved in a solvent may be blended by adding other constituents to the solution and stirring the solution. Optionally, the solvent may be removed after blending.

A membrane can be produced with the permselective material described above by any process suitable for constituents used. For example, for a silicone polymer having in the form of pellet, a membrane can be formed by a process such as melt-extrusion, or calendering. Alternatively, for a silicone polymer dissolved in a solvent, a membrane can be formed by a process such as casting, coating, or developing on a water surface.

Permselective Membrane Structure

Figure 2:
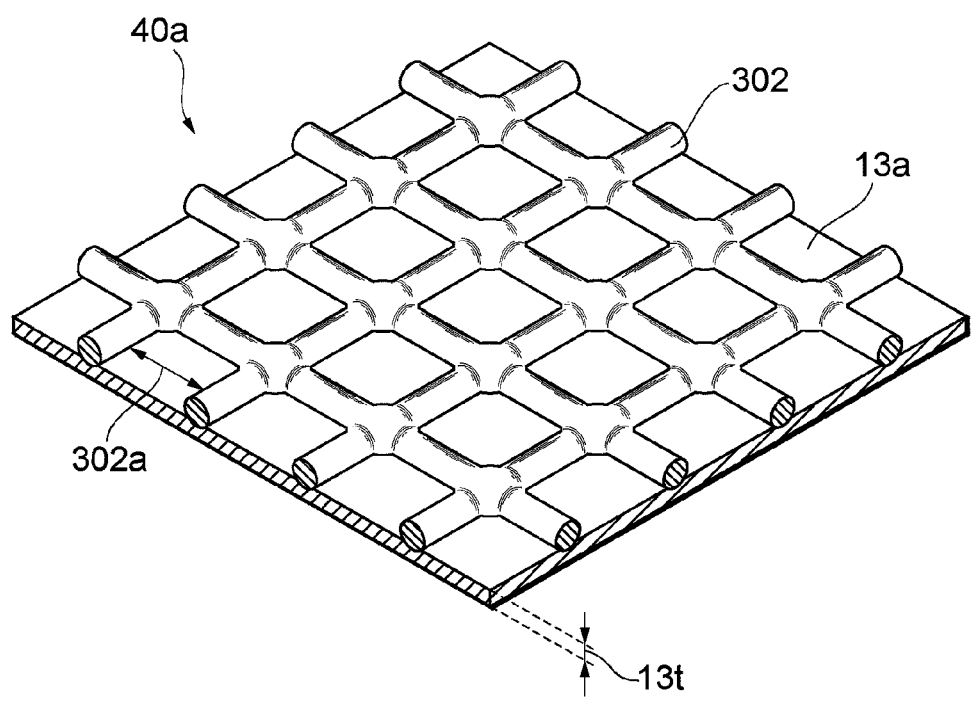
FIG. 2 is a schematic perspective view illustrating a permselective membrane structure in accordance with an embodiment of the present invention.

With reference to FIG. 2, a permselective membrane structure 40a in accordance with an embodiment of the present invention has a reinforcement mesh 302 and a permselective membrane 13a layered on the reinforcement mesh 302. The permselective materials described above are usable to form the permselective membrane 13a. The width of the opening 302a of the reinforcement mesh 302 is larger than the thickness 13t of the permselective membrane 13a, and the opening ratio of the reinforcement mesh is not less than 30%.

Since the permselective membrane 13a in the permselective membrane structure 40a in accordance with an embodiment of the present invention is composed of the above described permselective material, the flow of the gas passing through the permselective membrane 13a is dominated by the Knudsen flow. The permselective membrane structure 40a including the permselective membrane 13a can remove the suspended material in the air such as SPM, while ensuring sufficiently high gas permeabilty.

In order to improve the gas permeabilty in the permselective membrane 13a, it is necessary to reduce the thickness of the permselective membrane 13a. Although a reduction in thickness of the permselective membrane 13a further improves the gas permeabilty, it causes a reduction in the strength of the membrane, resulting in ready breakage of the membrane. In this embodiment of the present invention, therefore, the permselective membrane 13a having a small thickness can be reinforced by the permselective membrane structure 40a composed of the permselective membrane 13a layered on the reinforcement mesh 302. Such a permselective membrane structure 40a can exhibit high strength durable in various applications.

The thickness 13t of the permselective membrane 13a is preferably 0.1 to 10 μm, and more preferably 1 μm to 5 μm. Although the permselective membrane 13a formed of the permselective material in an embodiment of the present invention causes gas flow passing through the membrane dominated by the Knudsen flow regardless of the thickness, a thickness 13t of the permselective membrane 13a ranging from 0.1 μm to 10 μm can readily satisfy both gas permeability and formability of the permselective membrane 13a (formation of the permselective membrane 13a with ease). In particular, a thickness 13t of the permselective membrane 13a ranging from 1 μm to 5 μm can ensure a sufficient volume of gas flow through the permselective membrane 13a, while the permselective membrane 13a can be readily formed without formation of defects.

It is preferred that the reinforcement mesh 302 have gas permeability (volume of gas passing through) to an extent not to lower the permeability of the permselective membrane 13a to be layered on the mesh. The volume of gas consisting of either $N_2$ or $O_2$ passing through the reinforcement mesh 302 is preferably not less than $1.0 \times 10^{-4}$ $cm^3 \cdot sec^{-1} \cdot cm^{-2}$ and more preferably not less than $1.0 \times 10^{-2}$ $cm^3 \cdot sec^{-1} \cdot cm^{-2}$. For such a reinforcement mesh 302, screen mesh materials listed in Table 1 are preferably used. Table 1 lists porous films and nonwoven cloth which can be used as reinforcement materials of the permselective membrane 13a, instead of the reinforcement mesh 302 in the permselective membrane structure 40a of one or more embodiments of the present invention, for the purpose of reference. In one or more embodiments of the present invention, however, the reinforcement mesh 302, which is superior to the porous films and the nonwoven cloth in gas permeability, is used for the reinforcement material of the permselective membrane 13a.

TABLE 1

| Material | Product name | Mfr. | Opening ratio (%) | Opening 102a (mm) | Thickness (mm) | Volume of permeating gas $(cm^3 \times sec^{-1} \times cm^{-2})$ $O_2$ |
|---|---|---|---|---|---|---|
| Screen mesh | NYM120 | SEFER | 49 | 120 | 80 | $4.3 \times 10^{-2}$ |
|  | PET85-HC |  | 46 | 85 | 65 | $3.1 \times 10^{-2}$ |
|  | PET64-HC |  | 45 | 64 | 45 | $2.2 \times 10^{-2}$ |
| Porous film | Celgard 2500 | Celgard | — | — | 25 | $2.6 \times 10^{-3}$ |
|  | POREFLON WP-500-100 | Sumitomo EI | — | 5 | 100 | $3.9 \times 10^{-3}$ |
| Nonwoven cloth | ESPOIR N30 | Mitsui Chemicals | — | — | 30 | $1.8 \times 10^{-3}$ |

Conditions for measurement of the volume of permeable gas in Table 1
Temperature: 23±2° C.
Pressure downstream of the membrane (total pressure): about 1 atm
Pressure upstream of the membrane (total pressure): about 1 atm
Difference in pressure across the membrane: zero
Pressure of $O_2$ downstream of the membrane (partial pressure): about 19% (the balance being $N_2$)
Pressure of $O_2$ upstream of the membrane (partial pressure): about 20.9% (the balance being $N_2$)
Difference in pressure of $O_2$ across the membrane (partial pressure): 1.9%

In accordance with an embodiment of the present invention, by the use of the reinforcement mesh 302 having a width of the opening 302a larger than the thickness 13t of the permselective membrane 13a and an opening ratio not less than 30%, the permselective membrane 13a can be reinforced without impairing the gas permeability of the permselective membrane 13a and the gas permeability through the entire permselective membrane structure. In the permselective membrane structure 40a using the reinforcement mesh 302 superior to the porous films and the nonwoven cloth in gas permeability, the gas permeability of the entire permselective membrane structure can, therefore, be improved compared to that of a permselective membrane structure including the permselective membrane 13a reinforced by a porous film or nonwoven cloth.

Method of Making Permselective Membrane

In accordance with an embodiment of the present invention, the permselective membrane structure 40a is fabricated by a first method or a second method. The first and the second methods are as described below.

The first method of making a permselective membrane structure 40a in accordance with an embodiment of the present invention comprises the steps of filling openings of a reinforcement mesh 302 with a mesh filler; reducing the volume of the mesh filler filled in the openings; forming a permselective membrane 13a of a permselective material so as to cover exposed portions of the reinforcement mesh 302 uncovered with the mesh filler and exposed portions of the mesh filler filled in the openings; and removing the mesh filler from the openings of reinforcement mesh 302 after forming the permselective membrane 13a. With reference to FIGS. 3 to 7, these steps are described below.

Figure 3:
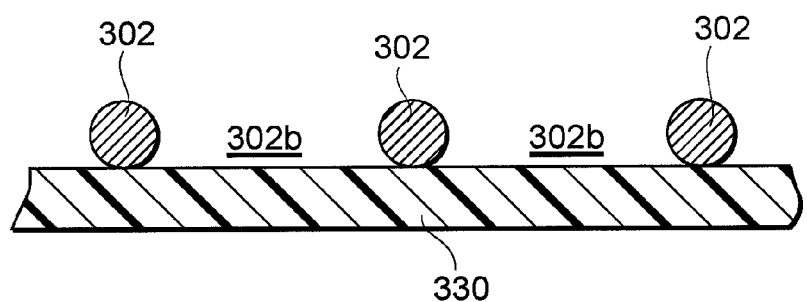
FIG. 3 is a schematic view illustrating a process in a first method of making a permselective membrane structure in accordance with an embodiment of the present invention.
Figure 4:
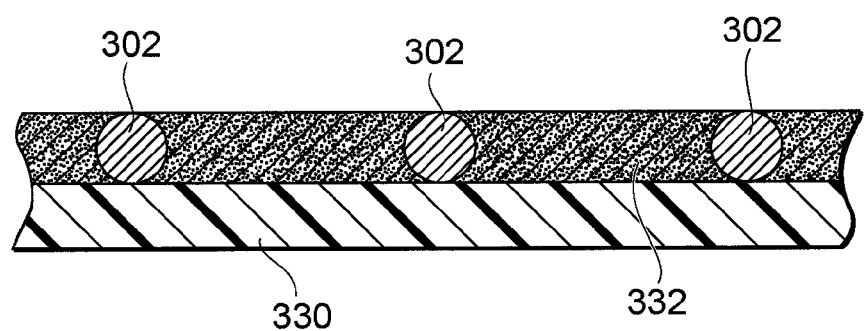
FIG. 4 is a schematic view illustrating a process in a first method of making a permselective membrane structure in accordance with an embodiment of the present invention.

With reference to FIG. 3, the reinforcement mesh 302 is placed on a PET film 330 at the beginning. Next, the mesh filler 332 is applied to the reinforcement mesh 302 on the PET film 330 with a wire coater so as to fill the openings 302b with the mesh filler 332 (refer to FIG. 4).

The mesh filler 332 is composed of at least one of N,N-diethylacrylamide (chemical formula: $CH_2=C-ONHC_2H_5C_2H_5$, hereinafter referred to as DEAA), diethylene glycol monovinyl ether (chemical formula: $CH_2=C-(OCH_2CH_2)_2-OH$, hereinafter referred to as DEGV), polyethylene glycol (chemical formula: $HO-(CH_2-CH_2-O)_n-H$ (n=300), hereinafter referred to as PEG), and N,N-hydroxyethylacrylamide (chemical formula: $CH_2=C-ONHC_2H_5OH$, hereinafter referred to as HEAA), or a coating medium composed of these compounds diluted with an organic solvent. In particular, HEAA is preferred as a material for the mesh filler 332. The use of HEAA ensures mesh-filling of the reinforcement mesh. In the case of the use of HEAA as the mesh filler 332, for example, HEAA is diluted with ethanol such that HEAA in the form of a coating medium has a concentration of 80 wt %. Through controlling the amount of the solvent (ethanol) diluting HEAA, the mesh-filling level (the amount of the mesh filler 332 filling in the openings 302b) of the reinforcement mesh 302 can be adjusted, so that the thickness of the permselective membrane 13a to be formed is adjustable.

Figure 5:
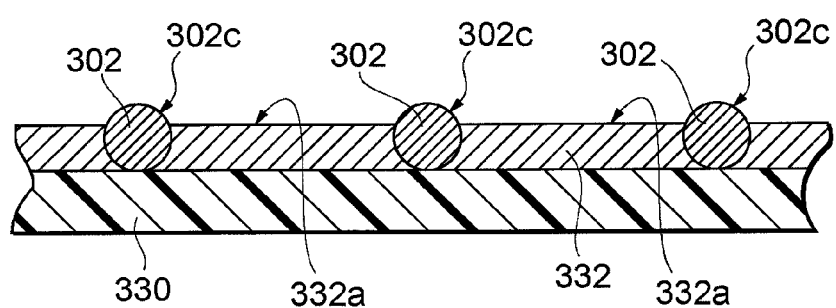
FIG. 5 is a schematic view illustrating a process in a first method of making a permselective membrane structure in accordance with an embodiment of the present invention.

Subsequently, with reference to FIG. 5, the mesh filler 332 applied to the reinforcement mesh 302 is heat-treated to volatilize the diluent solvent (ethanol) from the mesh filler 332 filled in the opening 302a to reduce the volume of the mesh filler 332. It is preferred to form exposed portions 302c in the reinforcement mesh 302 by partially exposing the reinforcement mesh 302 originally covered with the mesh filler 332 with reducing the volume of the mesh filler 332, in the process to reduce the volume of the mesh filler 332 filled in the opening 302a.

The mesh filler 332 shrinks during heat treatment such as drying, whereby exposed portions 302c of the reinforcement mesh 302 can be readily formed by means of the volume shrinkage of the mesh filler 332. Furthermore, the process removing the portions of the mesh filler 332 covering the reinforcement mesh 302 is not necessary, because the exposed portions are formed before the formation of the permselective membrane 13a by means of the volume shrinkage of the mesh filler 332. In the subsequent process, the permselective membrane 13a is fixed to the reinforcement mesh 302 by bonding the exposed portion 302c with the permselective material. Optionally, the method of forming the exposed portion 302c in the reinforcement mesh 302 is not limited to the volume shrinkage of the mesh filler 332.

Figure 6:
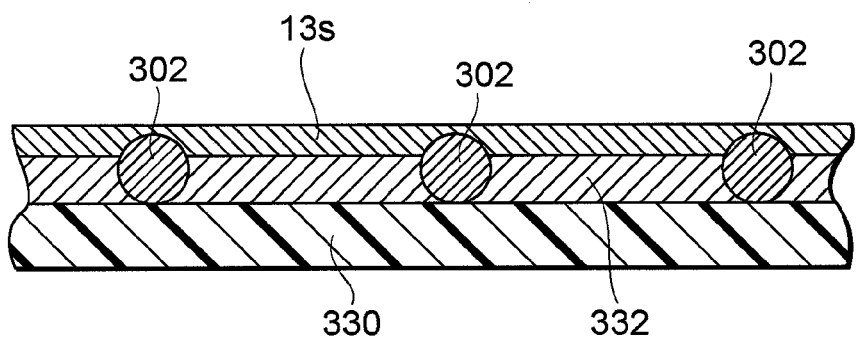
FIG. 6 is a schematic view illustrating a process in a first method of making a permselective membrane structure in accordance with an embodiment of the present invention.

With reference to FIG. 6, after the volume shrinkage of the mesh filler 332, a permselective material 13s in the form of a coating medium is applied with a wire coater so as to cover the exposed portion 302c of the reinforcement mesh 302 and the exposed portion 332a of the mesh filler 332 filled in the opening 302b. Subsequently, a permselective membrane 13a is formed by removing the solvent from the permselective material 13s during the heat treatment. Alternatively, the permselective material 13s in the form of a coating medium may further contain a leveling agent. When the permselective material 13s in a form of coating medium further contains a leveling agent, the permselective membrane 13a having a level surface can be formed even if the permselective material 13s and the mesh filler 332 have poor bonding capability.

Figure 7:
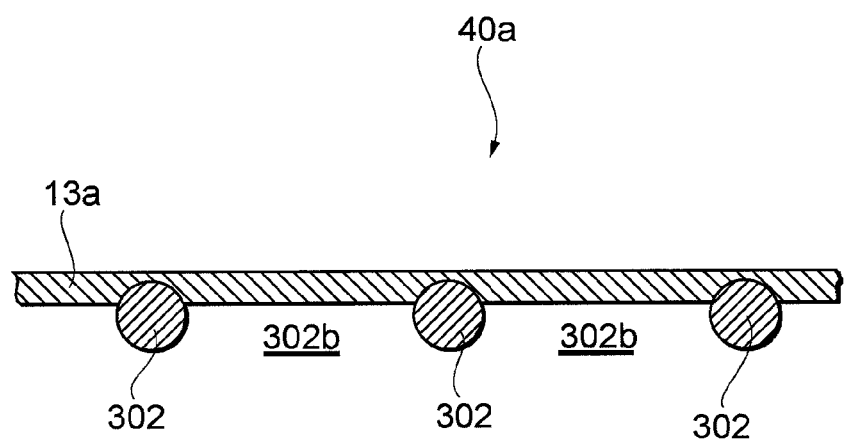
FIG. 7 is a schematic cross-sectional view illustrating a permselective membrane structure in accordance with an embodiment of the present invention.

Next, the PET film 330 is peeled off from the reinforcement mesh having the layered permselective membrane. The mesh filler 332 filled in the opening 302b of the reinforcement mesh 302 is removed through water washing from the surface remote from the reinforcement mesh 302 having the layered permselective membrane 13a. After the mesh filler 332 is removed, the reinforcement mesh 302 and the permselective membrane 13a are dried to eliminate water so as to yield a permselective membrane structure 40a, as illustrated in FIG. 7.

Optionally, the method of removing the mesh filler filled in the opening 302b of the reinforcement mesh 302 is not limited to the water washing. For example, the mesh filler 332 may be washed and removed with any solvent or chemical which can dissolve the constituents of the mesh filler 332. Alternatively, the portions to be removed in the mesh filler 332 applied to the reinforcement mesh 302 may be reformed by irradiation with UV (ultra violet rays) or EB (electron beams) into a form that can be readily removed before the removal of these portions.

In accordance with an embodiment of the present invention, the mesh filler 332 is filled in the opening 302b of the reinforcement mesh 302 for mesh filling of the reinforcement mesh 302, so that a nearly level surface is formed on the reinforcement mesh 302. Since the permselective membrane 13a is formed of the permselective material 13s after the opening 302b of the reinforcement mesh 302 is filled with the mesh filler 332, excess flow of the permselective material 13s in the form of a coating medium into the opening 302b of the reinforcement mesh 302 (to the extent of filling up the opening 302b) does not occur. Consequently, the permselective membrane 13a having a uniform thickness and a level surface can be formed.

In a conventional method of forming a layered membrane on a substrate using a coater, a membrane-formable material having a viscosity controlled using a solvent for optimal process conditions has been used. In a typical case of forming a thin membrane, a membrane-formable material having a low viscosity containing a relatively large amount of solvent has been used. It has been difficult, however, to apply the membrane-formable material having a low viscosity to the substrate having a large diameter of an opening such as the reinforcement mesh, due to its surface tension and fluidity. Since the applied membrane-formable material flows into the openings of the reinforcement mesh, a layered structure of the reinforcement mesh and the membrane cannot be attained. This precludes the formation of a membrane with high precision (control of the adjustment and variation of the thickness). In contrast, in accordance with an embodiment of the present invention, the formation of the permselective membrane 13a using the permselective material 13s after the opening 302b of the reinforcement mesh 302 is filled with the mesh filler 332 can control the flow of the permselective material 13s into the opening 302b of the reinforcement mesh 302, solving the disadvantages inherent with a conventional method.

In addition, in accordance with an embodiment of the present invention, the gas permeability of the permselective membrane 13a facing the opening 302b of the reinforcement mesh 302 can be ensured by removing the mesh filler 332 from the opening 302b of the reinforcement mesh 302 after formation of the permselective membrane 13a.

Furthermore, in accordance with an embodiment of the present invention, the volume shrinkage ratio of the mesh filler 332 can be controlled during the volume shrinkage of the mesh filler 332 filled in the opening 302b, by adjusting the amount of the solvent that dilutes the mesh filler 332. The volume of the space formed in the opening 302b of the reinforcement mesh 302 accompanied with the volume shrinkage of the mesh filler 332 can, therefore, be controlled, so that the volume of the permselective material 13s to be introduced into the space is adjustable. Consequently, the thickness of the permselective membrane 13a after the membrane formation, more specifically, the thickness of the permselective membrane 13a facing the opening 302b (the thickness of the permselective membrane 13a located in the opening 302b) is adjustable. Furthermore, the introduction of the permselective material 13s into the space formed in the opening 302b of the reinforcement mesh 302 due to the volume shrinkage of the mesh filler 332 generates a structure of the reinforcement mesh 302 stuck in the permselective membrane 13a after the membrane formation. Since this structure has an anchor effect, the perm selective membrane 13a can be attached firmly to the reinforcement mesh 302.

Subsequently, the second method of making a permselective membrane structure 40a in accordance with an embodiment of the present invention is described. Differences between the first method and the second method are described below, while the description on the common steps in the both methods is skipped. In the first method, the permselective membrane 13a is formed to cover the exposed portion 332a of the mesh filler 332 filled in the opening 302b directly, while in the second method the permselective membrane 13a is formed to cover an intermediate layer formed preliminarily on the exposed portion 332a of the mesh filler 332 filled in the opening 302b. The second method is different from the first method in this regard.

Figure 8:
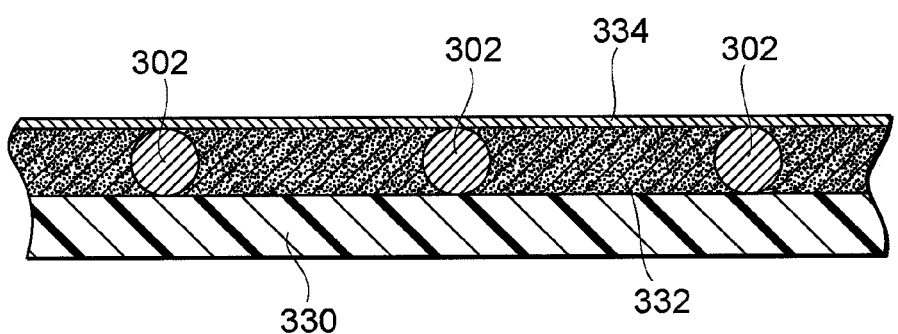
FIG. 8 is a schematic view illustrating a process in a second method of making a permselective membrane structure in accordance with an embodiment of the present invention.
Figure 9:
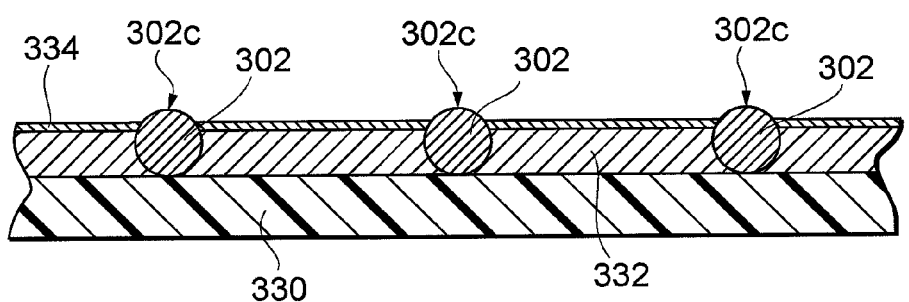
FIG. 9 is a schematic view illustrating a process in a second method of making a permselective membrane structure in accordance with an embodiment of the present invention.
Figure 10:
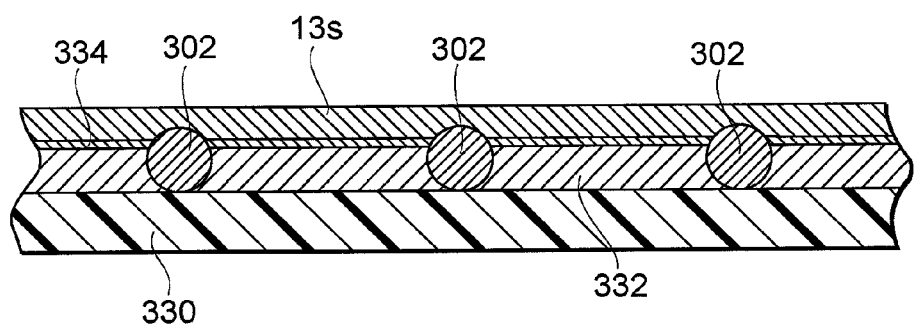
FIG. 10 is a schematic view illustrating a process in a second method of making a permselective membrane structure in accordance with an embodiment of the present invention.

In accordance with an embodiment of the present invention, the second method of making a perm selective membrane structure 40a comprises the steps of filling openings 302b of a reinforcement mesh 302 with a mesh filler 332; forming an intermediate layer 334 capable of bonding both the mesh filler 332 and a permselective material 13s on exposed portions 332a of the mesh filler 332 filled in the opening 302b; reducing the volume of the mesh filler 332 filled in the opening 302b; forming a permselective membrane 13a of a permselective material 13s so as to cover exposed portions 302c of the reinforcement mesh 302 uncovered with the mesh filler and the intermediate layer 334; and removing the mesh filler 332 and the intermediate layer 334 from the openings 302b of reinforcement mesh 302 after formation of the permselective membrane 13a. With reference to FIGS. 8 to 10, these steps of the second method in accordance with an embodiment of the present invention are described below.

In the first place, with reference to FIG. 8, after the reinforcement mesh 302 is placed on the PET film 330, the mesh filler 332 is applied to the reinforcement mesh 302 on the PET film 330 with a wire coater, so that the mesh filler 332 is filled in the opening 302b of the reinforcement mesh 302.

Subsequently, a coating medium capable of bonding both the mesh filler 332 and the permselective material 13s is applied to the reinforcement mesh 302 coated with the mesh filler 332, so that the intermediate layer 334 is formed of the coating medium. Consequently, the exposed portions 332a of the mesh filler 332 filled in the opening 302b of the reinforcement mesh 302 is covered with the intermediate layer 334. The intermediate layer 334 includes any layer capable of bonding both the mesh filler 332 and the permselective material 13s, for example, a layer containing polyvinyl alcohol (hereinafter referred to as PVA). Since PVA is barely soluble in water compared to the mesh filler 332 such as HEAA, it is preferred that the intermediate layer 334 containing PVA be thinned so as to be removed easily in a subsequent step, and have a thickness in the range of preferably about 0.01 µm to 30 µm.

An example of the PVA use in the intermediate layer 334 includes a known PVA having a degree of polymerization ranging from about 400 to 4000 and a degree of saponification not less than 80 mol %. In accordance with an embodiment of the present invention, it is preferred to use a PVA having high solubility in water, for example, a PVA having a degree of polymerization ranging from about 100 to 400 and a degree of saponification ranging from about zero to 90 mol %. More specifically, it is preferred to use a PVA having a degree of polymerization ranging from about 200 to 250 and a degree of saponification of about 81 mol % (JL-05E made by Japan Vam & Poval Co., Ltd) or a PVA having a degree of polymerization ranging from about 200 to 250 and a degree of saponification of about 88 mol % (ASP05 made by Japan Vam & Poval Co., Ltd). Alternatively, a denatured-PVA having functional groups other than hydroxyl groups and acetyl groups of a normal PVA may be used.

After the intermediate layer 34 is formed, the solvent contained in the mesh filler 332 filled in the opening 302b and the intermediate layer 334 is removed during the heat treatment to reduce the volume of the mesh filler 332 and the intermediate layer 334, thereby the exposed portions 302c of the reinforcement mesh 302 is formed (refer to FIG. 9).

Subsequently, the permselective material 13s in the form of a coating medium is applied with a wire coater so as to cover the exposed portions 302c of the reinforcement mesh 302 and the intermediate layer 334. Next, the solvent of the permselective material 13s is removed during the heat treatment, so that the permselective membrane 13a is formed of the permselective material 13s (refer to FIG. 10).

After the permselective membrane 13a is formed, the PET film 330 is peeled off from the reinforcement mesh 302 having the layered permselective membrane 13a. Next, the mesh filler 332 filled in the opening 302b of the reinforcement mesh 302 and the intermediate layer 334 located behind are removed through water washing from the surface remote from the reinforcement mesh 302 having the layered permselective membrane 13a.

After the mesh filler 332 and the intermediate layer 334 are removed, the reinforcement mesh 302 and the permselective membrane 13a are dried to remove water, thereby a permselective membrane structure 40a is yielded, as illustrated in FIG. 7.

The above mentioned second method has the same advantages achieved by one or more embodiments of the first method. Furthermore, since the permselective material 13s is formed on the surface of the intermediate layer 334 capable of bonding the mesh filler 332 and the permselective material 13s in the second method, the permselective material 13s can be readily formed into a membrane, resulting in ready fabrication of a permselective membrane 13a having an even thickness and a smooth surface. If the permselective membrane 13a is formed so as to cover directly the exposed portions 302c of the reinforcement mesh 302 and the exposed portions 332a of the mesh filler filled in the opening 302b using a permselective material 13s that cannot be readily bonded to the mesh filler 332, the permselective material 13s is not easily formed into a membrane on the surface of mesh filler 332 due to the difficulty in bonding between the mesh filler 332 and the permselective material 13s. In contrast, the second method is free from this problem, because the permselective material is formed on the surface of the intermediate layer capable of bonding both the mesh filler 332 and the permselective material 13s. In the second method, intervention of the intermediate layer 334 having an affinity to both the mesh filler 332 and permselective material 13s leads to an improvement in the wettability (membrane formability) of the permselective material 13s on the mesh filler and thus the precision of the membrane formation of the permselective material 13s. When the mesh filler 332 and the intermediate layer 334 are removed from the opening 302b after the formation of the permselective membrane 13a, the intermediate layer 334 may be etched through the reinforcement mesh 302 as a mask such that the intermediate layer 334 remains between the permselective membrane 13a and the reinforcement mesh 302. In this case, the use of an adhesive material as the intermediate layer 334 (i.e. a material developing adhesiveness under a secondary load such as a thermal load) enables the permselective membrane 13a to adhere (fix) to the reinforcement mesh 302.

Ventilation System

The ventilation system of one or more embodiments of the present invention is provided with a membrane formed of the permselective material that supplies gas to a space to be ventilated and/or discharges the gas from the space. For example, the membrane is placed at an intake of the external air (an external air inlet). Examples of the space to be ventilated include spaces requiring the exchange of the gas in the space for external air, such as vehicles (cars), housings, bullet trains, and airplanes, and more specifically a vehicle as is illustrated in FIG. 11.

Figure 11:
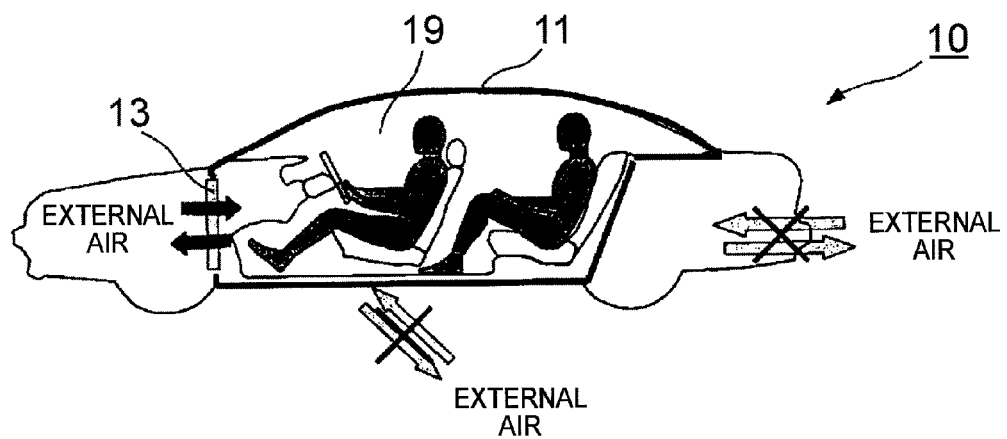
FIG. 11 is a view illustrating a ventilation system in accordance with an embodiment of the present invention.

FIG. 11 is a schematic cross-sectional view taken along the longitudinal direction of a vehicle in accordance with an embodiment of the ventilation system of one or more embodiments of the present invention. The interior 19 of the vehicle 10 includes an interior wall 11 and a permselective membrane (permeable membrane) 13 (composed of the permselective material of one or more embodiments of the present invention), so that the external air is substantially blocked over places other than the permselective membrane 13 installed for intake of the external air.

The interior wall 11 is composed of materials such as iron, aluminum, and glass which are substantially impermeable to gas. The permselective membrane 13 is composed of the above-mentioned permselective material having a thickness in the range of preferably 0.1 µm to 10 µm. Examples of the actual place for the installation of the permselective membrane 13 in the vehicle 10 include an external air inlet in an air-conditioning unit illustrated in FIG. 12.

Figure 12:
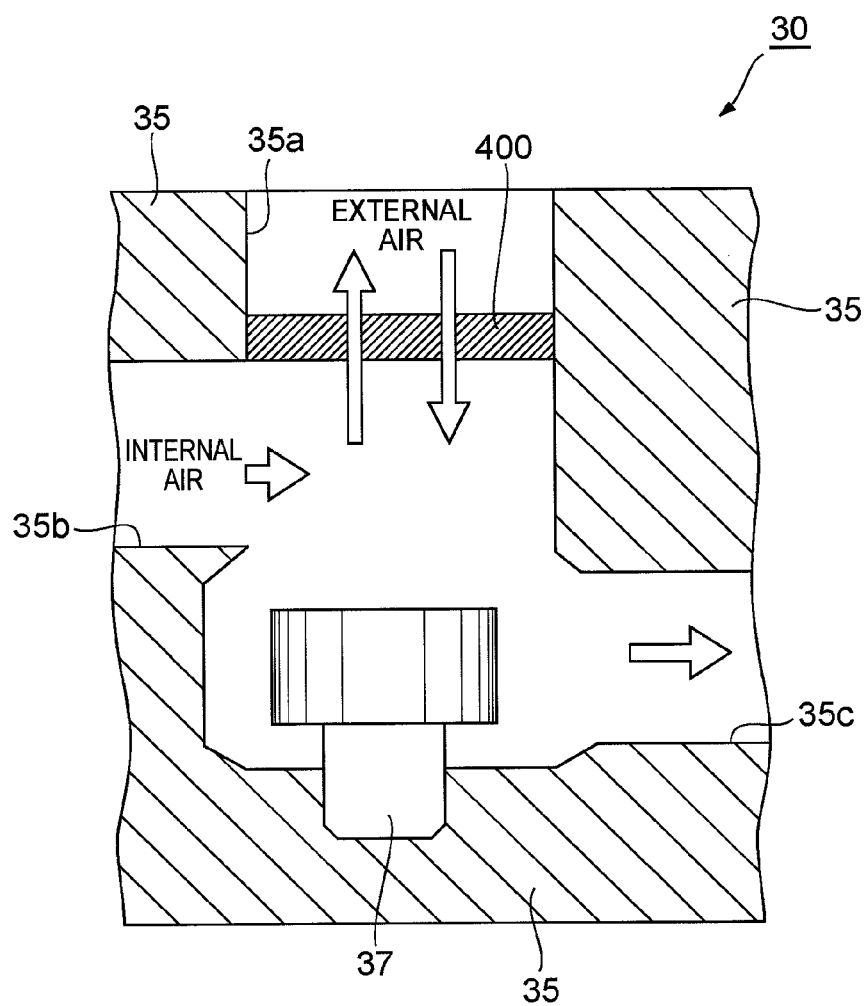
FIG. 12 is a schematic cross-sectional view illustrating part of an air conditioning unit 30 in a vehicle in accordance with an embodiment of the ventilation system of the present invention.

FIG. 12 is a schematic cross-sectional view illustrating part of an air-conditioning unit 30 in a vehicle in accordance with an embodiment of the ventilation system of the present invention. As illustrated in FIG. 12, the air conditioning unit 30 includes an air-conditioning unit case 35, a centrifugal blower fan 37, and a permeable member 400. The air-conditioning unit case 35 has an external air inlet 35a, an internal air inlet 35*b*, and an opening 35*c*. The centrifugal blower fan 37 is installed in a circulating pathway of the internal air in the air-conditioning unit case 35. The permeable member 400 is installed in the air-conditioning unit case 35 so as to block the external air inlet 35*a*.

Such an air-conditioning-unit 30 can take in the external air from the external air inlet 35*a* through the permeable member 400 and the internal air from the internal air inlet 35*b*, so that the external air and/or the internal air is supplied to the vehicle interior through the opening 35*c*. Alternatively, the internal air may be discharged to the outside from the external air inlet 35*a* through the permeable member 400 in some cases.

The air-conditioning unit case 35 is composed of a resin having some extent of elasticity and high mechanical strength, such as polypropylene. The centrifugal blower fan 37 may be a conventional fan used for the circulation of the internal air in a vehicle. Any permeable member 400 having the permselective membrane 13 through which the external air can be introduced is usable. Examples of such members include permeable members 400*a* and 400*b*, respectively, of which permselective membrane 13 backed with base 42*a* and 42*b* as illustrated in FIGS. 13 and 14, and the permselective membrane structure 40*a* made by the above-mentioned method.

Figure 13:
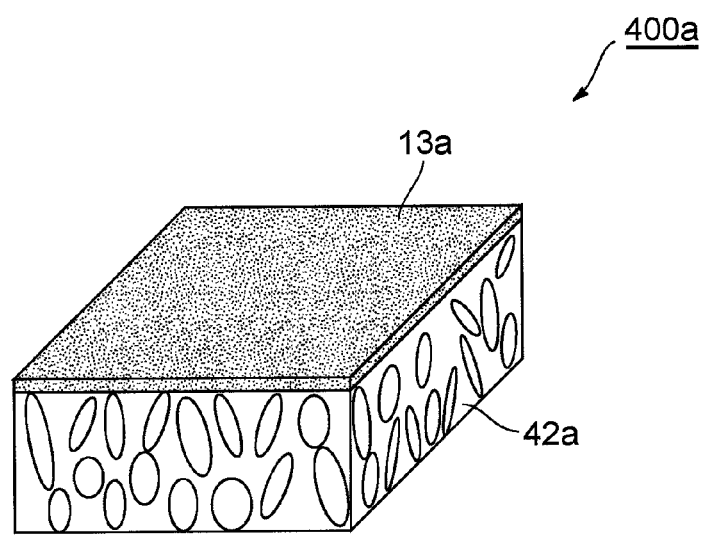
FIG. 13 is a perspective view illustrating an embodiment of the permselective membrane structure.

FIG. 13 is a perspective view illustrating a preferred embodiment of the permeable member 400. A permeable member 400*a* in accordance with this embodiment includes a permselective membrane 13*a* and a base 42*a*. The permselective membrane 13*a* has a planar shape, and is backed with the planar base 42*a* attaching closely to a surface of the plane. The base 42*a* may be attached closely to parts of the permselective membrane 13*a*, for example, peripheries of the permselective membrane 13*a*, or the entire permselective membrane 13*a*.

Figure 14:
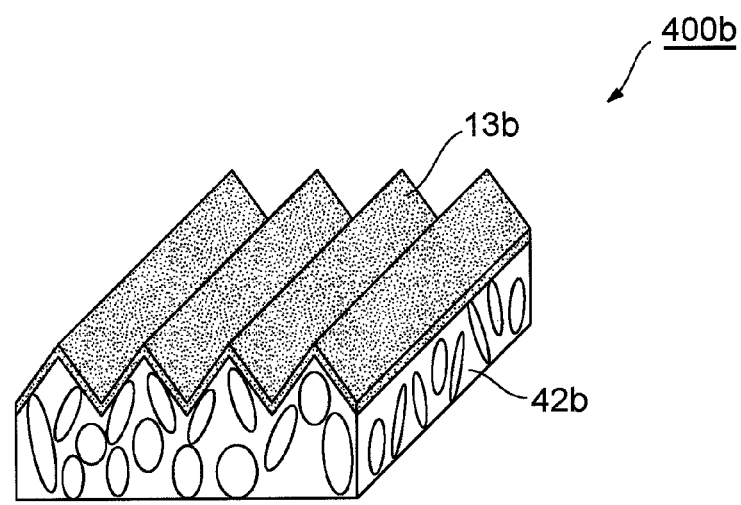
FIG. 14 is a perspective view illustrating another embodiment of the permselective membrane structure.

FIG. 14 is a perspective view illustrating another preferred embodiment of the permeable member 400. The permeable member 400*b* in accordance with this embodiment includes a permselective membrane 13*b* and a base 42*b*. The permselective membrane 13*b* is serrated, and is backed with the serrated base 42*b* attaching closely to a surface of the membrane. The base 42*b* may be attached closely to part or all of the permselective membrane 13*b*.

The permselective membranes 13*a* and 13*b* are composed of the membrane formed of the above-mentioned permselective material having a thickness in the range of preferably 0.1 μm to 10 μm. The base 42*a* and 42*b* may be composed of any gas permeable material. Examples of material for the base include fibrous sheets, and porous materials and meshes having a pore diameter in the range of 0.1 μm to 500 μm. The thickness of the base is in the range of preferably 50 μm to 500 μm.

The permselective membranes 13*a* and 13*b*, which are backed with the base in the permeable members 400*a* and 400*b*, respectively, can be thinned to increase the volume of permeable gas while ensuring the strength of the permselective membrane structure. Furthermore, the increased surface area of the permselective membranes 13*a* and 13*b* in the permeable member 400*b* enables the volume of permeable gas to further increase.

The permselective membrane structure can be made, for example, through the steps of forming a permselective membrane on a removable film by the above-mentioned method of forming and processing a membrane, transferring a base on the formed permselective membrane, and removing the film. Examples of the removable films include films that can be removed by washing with water, solvents, or chemicals, and films that can be removed after reforming by irradiation with UV or EB. Examples of transferring the base on the permselective membrane include bonding between the permselective membrane and the base with an adhesive or tackiness agent and bonding the permselective membrane to the base by heating or dissolution with a solvent.

The permselective membrane 13 in the vehicle 10 may be installed in a ventilation equipment for pressure regulation (FIG. 15), a ceiling (FIGS. 16 to 18), a glass (FIGS. 19 to 21), a pillar (FIGS. 22 and 23), a floor (FIG. 24) and a door (FIGS. 25 to 29). The permselective membrane 13 to be installed may be used alone, in the form of the permselective members 400*a* and 400*b* backed with the above mentioned base, or in the form of the permselective membrane structure 40*a* prepared by the method described above. The places of installation are described below in detail.

Ventilation Equipment for Pressure Regulation

FIG. 15 is an outline schematic view illustrating a vehicle, which is an embodiment of a ventilation system of the present invention, provided with a permselective membrane made of a permselective material of one or more embodiments of the present invention in ventilation equipment for pressure regulation.

With reference to FIG. 15A, the ventilation equipment for pressure regulation 110 in accordance with this embodiment is disposed on both sides of a vehicle 10 in the vicinity of the rear bumper 34. With reference to FIG. 15B, which is a backward cross-sectional view of the rear portion of the vehicle 10, the ventilation equipment for pressure regulation 110 includes a frame 38, a damper 32, and a permselective membrane 13.

The ventilation equipment for pressure regulation 110 is mounted in the nearly rectangular cutout provided in a body 122 of the vehicle 10.

More specifically, the frame 38 of the ventilation equipment for pressure regulation 110 is a rectangular pipe of which the edge face, remote from the vehicle 10, is equipped with a flange. The flange is fixed to the body 122, for example, by welding.

In the frame 38, an edge (the back edge), not the edge fixed to the body 122, of the bottom portion is bent obliquely upward toward the vehicle interior 19. The bent portion is referred to as a damper receiver 38*a*. As described below, the lower edge of the damper 32 comes into contact with the damper receiver 38*a* from the exterior to the interior 19 of the vehicle 10 when the door is shut.

The damper 32 is fixed to the frame 38 with the hinge 32*a*. More specifically, the upper side of the damper 32 and the back inside of the upper wall of the parallelepiped frame 38 are connected to a hinge 32*a*, so that the damper 32 is pivoted around the hinge 32*a*.

In the ventilation equipment for pressure regulation 110, when the door (not shown in the drawing) of the vehicle 10 is shut, the pressure in the vehicle interior 19 increases. The damper 32 is pushed from the interior toward the exterior of the vehicle 10 by the increased pressure. The damper 32 is thereby pivoted around the hinge 32*a* toward the open position, which is illustrated as a position β in FIG. 15B.

When the damper 32 is in the open position, the air flow indicated as an arrow in FIG. 15A arises so that the air in the vehicle interior 19 escapes toward outside. In this way, shutting the door causes the damper 32 to open, moderating the increase of the pressure in the vehicle interior 19.

In contrast, the pressure in the vehicle interior 19 does not increase while the door is kept closed, so that no pressure is applied to the damper 32 from the vehicle interior 19. When no pressure is applied to the damper 32 from the vehicle interior 19, the damper 32 is pivoted toward the vehicle interior 19 around the hinge 32a by its own weight. Through the pivoting of the damper 32, the lower end of the damper 32 is put into contact with the damper receiver 38a to stop further pivoting. Consequently, the damper 32 comes to the closed position, which is illustrated as a position α in FIG. 15B, so that the vehicle interior 19 is kept airtight.

Incidentally, when the pressure is applied to the damper 32 from the exterior toward the interior 19 of the vehicle 10, the lower end of the damper 32 is put into contact with the damper receiver 38a before the damper 32 pivots around the hinge 32a toward the vehicle interior 19. Since the damper 32 cannot be further pivoted, the damper 32 resides in the closed position, the vehicle interior 19 being kept airtight.

Ceiling

Figure 16A:
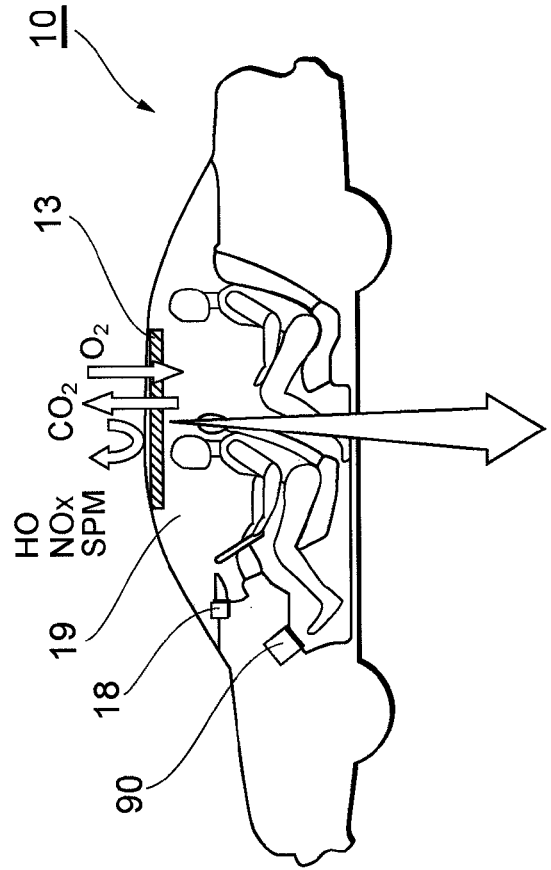
FIG. 16 is an outline schematic view illustrating a vehicle provided with a permselective membrane made of a permselective material of one or more embodiments of the present invention in the ceiling, in an embodiment of a ventilation system of the present invention.

FIGS. 16 to 18 are outline schematic views illustrating a vehicle, which is an embodiment of a ventilation system of the present invention, provided with a permselective membrane made of a permselective material of one or more embodiments of the present invention in the ceiling. With reference to FIG. 16A, the vehicle 10 in accordance with this embodiment is provided with the permselective membrane 13 in the ceiling. Implementations of ceilings in accordance with this embodiment are described below.

Implementation 1A

Figure 16B:
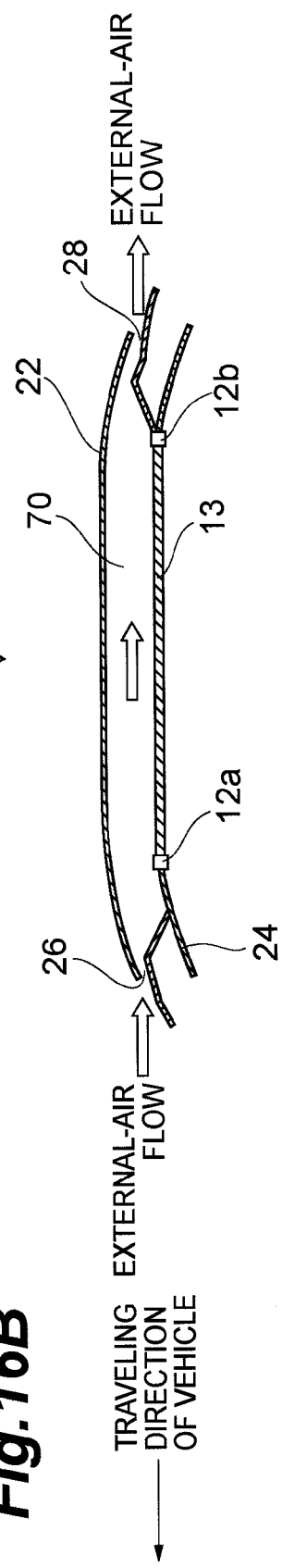

With reference to FIG. 16B, the ceiling of the vehicle 10 in Implementation 1A has a cavity 70, and includes an external air inlet 26 and an external air outlet 28 disposed at portions of an exterior wall 22 of the vehicle 10, and a permselective membrane disposed at a portion of the cavity 70.

The cavity 70 is defined by the interior wall 24 facing the vehicle interior 19 in the ceiling of the vehicle 10 and the exterior wall 22 facing outward. The exterior wall 22 and the interior wall 24 are composed of gas impermeable materials such as iron, aluminum, and glass.

The external air inlet 26 is a hole provided in the exterior wall 22 defining the cavity 70 in order to introduce the external air to the cavity 70 from the traveling direction of the vehicle 10, while the external air outlet 28 is a hole provided in the exterior wall 22 defining the cavity 70 in order to discharge the external air introduced into the cavity 70 to the opposite direction of the traveling.

The external air inlet 26 and the external air outlet 28 are substantially rectangular holes which have a long side in the lateral direction of the vehicle 10, the lengths of the long side and the short side being determined by the type of vehicle and the volume of the external air to be introduced into the cavity 70.

The permselective membrane 13 is disposed in the interior wall 24 such that at least part of the permselective membrane 13 is in contact with the external air introduced into the cavity 70 through the external air inlet 26 and the remaining parts are in contact with the air in the vehicle interior 19.

More specifically, with reference to FIG. 16B, a portion of the interior wall 24 of the vehicle 10 is cut out nearly into a substantially square shape. The permselective membrane 13 of the substantially square shape having the same size of the cut out portion of the interior wall 24 is provided and is reinforced at the peripheries. Among the reinforcements to reinforce the peripheries of the permselective membrane 13, one in the traveling direction of the vehicle 10 is hereinafter referred to as a front reinforcement 12a and one in the direction opposite to the traveling direction of the vehicle 10 as a rear reinforcement 12b.

Subsequently, the permselective membrane 13 having the reinforced peripheries is fixed to the substantially rectangular hole of the interior wall 24.

Although the cutout portion of the interior wall 24 has the substantially rectangular shape in this implementation, the shape of the cutout portion is not limited. The portion can be cut out into other shapes corresponding to the shape of the ceilings, for example, a circle, a trapezoid, or a complex shape composed of a number of lines and curves.

Next, with reference to FIG. 17, the ventilation system preventing water drops from coming in the cavity 70 through the external air inlet 26 and the external air outlet 28 is described. FIGS. 17A to C illustrate the structure to prevent water drops from coming in the cavity 70.

Implementation 2A

FIG. 17A illustrates means to prevent water drops from coming in the cavity 70 having a front flapper 27a and a rear flapper 27c in this embodiment (Implementation 2A). The front flapper 27a and the rear flapper 27c, respectively, are fixed to the exterior wall 22 with hinges 27b and 27d so as to open or close along the traveling direction of the vehicle 10 by pivoting around the hinges 27b and 27d.

The fixing position of the hinge 27b is located behind the external air inlet 26 and in front of the front reinforcement 12a along the traveling direction of the vehicle 10. The fixing position of the hinge 27d is located in front of the external air outlet 28 and behind the rear reinforcement 12b along the traveling direction of the vehicle 10.

The front flapper 27a and the rear flapper 27c are actuated by the external air pressure. More specifically, the external air is introduced into the cavity 70 through the external air inlet 26 while the vehicle 10 is moving. The external air introduced through the inlet 26 hits against the front flapper 27a. Consequently, the pressure caused by the external air on the surface of the front flapper 27a facing the external air inlet 26 allows the flapper 27a to open.

On the contrary, when the vehicle 10 stops, the external air is not introduced through the external air inlet 26. Accordingly, no pressure is applied to the surface of the front flapper 27a facing the external air inlet 26, allowing the flapper 27a to close.

The rear flapper 27c, also, is actuated by the external air introduced to the cavity 70 in the same way as the front flapper 27a.

The maximum angle θ when the front flapper 27a is open is determined by the position of the front reinforcement 12a. More precisely, the lower end of the front flapper 27a resides in front of the front reinforcement 12a in the traveling direction of the vehicle 10 when the flapper 27a opens fully, so that the maximum angle θ is determined.

In this way, when the front flapper 27a is fully open at the maximum angle θ by the incoming external air, the water drops contained in the external air hit the front flapper 27a and fall downward in the drawing, without contact with the surface of the permselective membrane 13. Since no water drop attaches to the surface of the permselective membrane 13, the gas permeability of the permselective membrane 13 can be kept.

Implementation 3A

FIG. 17B illustrates an embodiment of use of weirs as means to prevent water drops from coming in. More specifically, the front weir 27e is disposed between the external air inlet 26 and the front reinforcement 12a, while the rear weir 27f is disposed between the rear reinforcement 12b and the external air outlet 28 in this embodiment (Implementation 3A).

The front weir 27e includes a pair of substantially rectangular slender plates disposed in sequence in the direction of traveling of the vehicle 10. The pair of plates is fixed so as to dispose their long sides in the width direction of the vehicle 10. One of the pair of plates, i.e. the plate disposed adjacent to the external air inlet 26, is fixed to the exterior wall 22 of the vehicle 10, with a clearance to the interior wall 24. Meanwhile, the plate disposed adjacent to the permselective membrane 13 is fixed to the interior wall 24 of the vehicle 10, with a clearance to the exterior wall 22. Hereupon, each length of the plates is slightly greater than the length of the permselective membrane 13 in the width direction of the vehicle 10, so that the permselective membrane 13 is protected against the invasion of water drops.

The rear weir 27f is composed of a single plate. The plate is fixed to the end of the exterior wall 22 defining the external air outlet 28 extending downward and diagonally forward in the direction of traveling of the vehicle 10. This plate, also, has a length greater than the length of the permselective membrane 13 in the width direction of the vehicle 10.

Due to the front weir 27e, the water drops contained in the external air introduced in the cavity 70 are removed with the plate on the side of the external air inlet 26 defining the front weir 27e, fall onto the outer surface of the interior wall 24, and then are discharged to a drain (not shown in the drawing) outside the vehicle 10 via the outer surface of the interior wall 24. The remaining water drops not removed by the plate on the side of the external air inlet 26 are removed with the plate on the side of the permselective membrane 13, fall onto the outer surface of the interior wall 24, and are discharged to a drain (not illustrated) outside the vehicle 10 via the outer surface of the interior wall 24. Consequently, no water drop comes in the cavity 70 through the external air inlet 26.

Since the external air is discharged through the external outlet 28, it is preferred that the rear weir 27f can prevent the raindrops from splattering on the outer panel of the vehicle 10 rather than the water drops contained in the external air introduced to the external air outlet 28 incoming. The plates fixed to the end of the external air outlet 28 can thereby prevent invasion of water drops to the cavity 70.

Since no water drop comes in the cavity 70 through the external air inlet 26 and the external air outlet 28, no water drop attaches to the surface of the permselective membrane 13 installed in the cavity 70. The gas permeability of the permselective membrane 13 can thus be kept.

Implementation 4A

Next, with reference to FIGS. 16 and 17C, a case (Implementation 4A) of introduction of the external air to the cavity 70 in response to the oxygen concentration in the vehicle interior 19 is described.

Configuration

With reference to FIGS. 16 and 17C, the ventilation system in Implementation 4A includes the ventilation system in Implementations 1A to 3A, a front fan 29a, a rear fan 29b, an oxygen sensor 18, and a control unit 90.

The front fan 29a and the rear fan 29b control the volume of the external air introduced to the cavity 70 based on a command to take in the external air.

With reference to FIG. 17C, the front fan 29a is disposed between the external air inlet 26 and the front reinforcement 12a in the cavity 70 as in the front weir in Implementation 3A (refer to FIG. 17B). Meanwhile, the rear fan 29b is disposed between the external air outlet 28 and the rear reinforcement 12b in the cavity 70 as illustrated in FIG. 17C.

The oxygen sensor 18 measuring the oxygen concentration in the vehicle interior 19 is mounted in the dashboard of the vehicle 10 as illustrated in FIG. 16.

The control unit 90 outputting the command to take in the external air toward the front fan 29a and the rear fan 29b when the measured oxygen concentration in the vehicle interior 19 with the oxygen sensor 18 is at the predefined level is composed of CPU (Central Processing Unit), ORM (Object/Relational Mapping), RAM (Random Access Memory), and I/O (Input/Output) and etc. Hereupon, the control unit 90 is mounted in the dashboard of the vehicle 10 as illustrated in FIG. 16.

Operation and Characteristics

In such a ventilation system, the information of the oxygen concentration measured with the oxygen sensor 18 is sent to the control unit 90.

The control unit 90 determines whether the oxygen concentration is under the predefined level or not, based on the information of the oxygen concentration sent from the oxygen sensor 18. When the determination is made that the oxygen concentration is under the predefined level, a command to take in the external air is output to the front fan 29a and the rear fan 29b so that the external air is introduced to the cavity 70. In contrast, when the control unit determines that the oxygen concentration is above the predefined level, no command to take in the external air is output to the front fan 29a and the rear fan 29b. Hereupon, the term "predefined level" means an oxygen concentration necessary for the comfort of the vehicle interior 19.

The front fan 29a and the rear fan 29b operate when receiving the command from the control unit 90, so as to take in more external air to the cavity 70 compared to the external air inlet 26 installed alone.

In this way, the ventilation system in Implementation 4A introduces the external air to the cavity 70 only at an oxygen concentration below the predefined level in the vehicle interior 19. Since the external air containing certain amounts of hydrocarbons does not always come into contact with the permselective membrane 13, hydrocarbons are not always adsorbed or absorbed with the permselective membrane 13. Consequently, the deterioration of the selective separation ability of the permselective membrane 13 is retarded, resulting in a longer operating life of the permselective membrane 13.

Although the case using the oxygen sensor 18 has been described thus far, a carbon dioxide sensor may be used instead of the oxygen sensor 18 to introduce the external air to the cavity 70 with the front fan 29a and the rear fan 29b operating when the carbon dioxide concentration in the vehicle interior 19 increases.

Alternatively, the oxygen sensor 18 or the carbon dioxide sensor may be replaced with another sensor such as a sensor for the concentration of fine solid components or a counter of the numbers of fine solid components, to introduce the external air to the cavity 70 in response to the observed concentration and etc.

Other Implementations (1) In Implementations 1A to 4A, a part of the inner wall 24 of the ceiling 10 is composed of the permselective membrane 13. Alternatively, with reference to FIG. 18, holes may be provided in the ceiling of the interior wall 24.

Figure 18A:
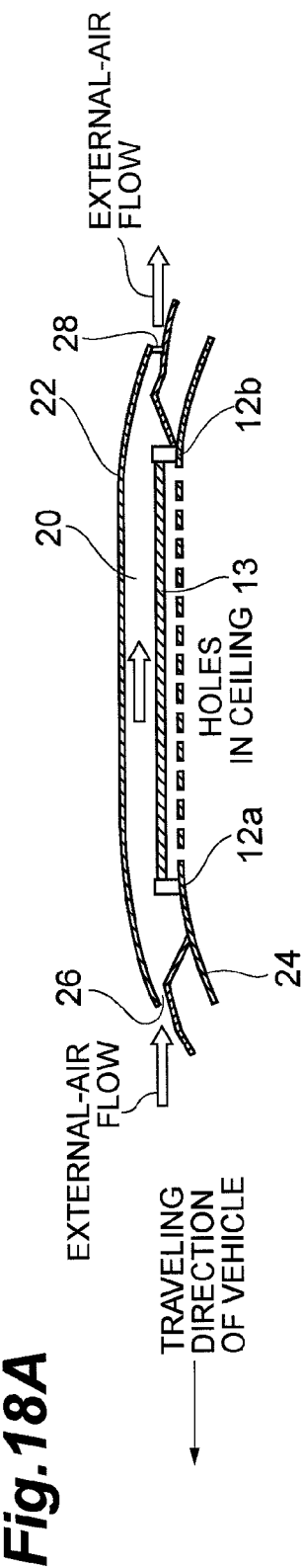
FIG. 18 is an outline schematic view illustrating a vehicle provided with a permselective membrane made of a permselective material of one or more embodiments of the present invention in the ceiling, in an embodiment of the ventilation system of the present invention.

With reference to FIG. 18A, many small holes are provided in the ceiling of the interior wall 24, and the portions having the holes are covered with a permselective membrane 13. All the multiple small holes are covered with the permselective membrane 13, and a reinforcement 12 reinforcing the peripheries of the permselective membrane 13 is in close contact with the interior wall 24, so that the external air taken in through the external air inlet 26 does not directly reach the vehicle interior 19.

Figure 18B:
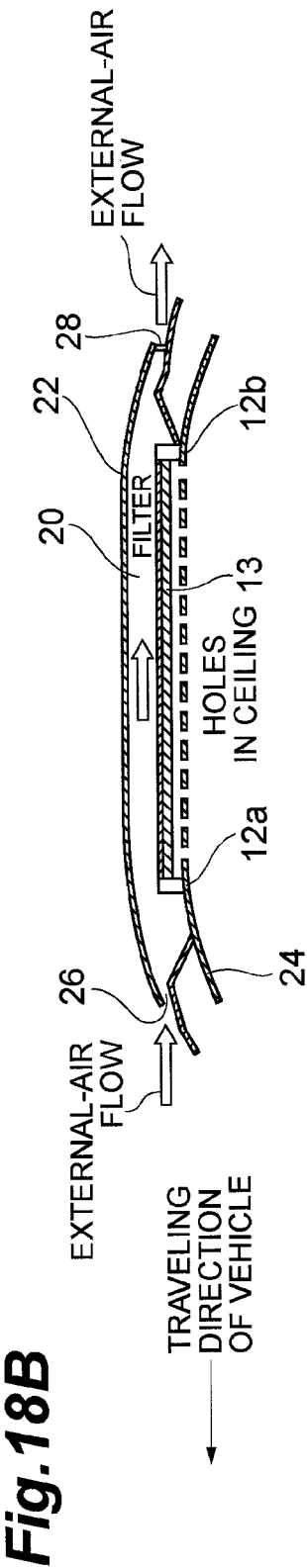

Optionally, with reference to FIG. 18B, a filter to remove the dust particles larger than the fine solid components may be installed on the surface of the permselective membrane 13.

Figure 18C:
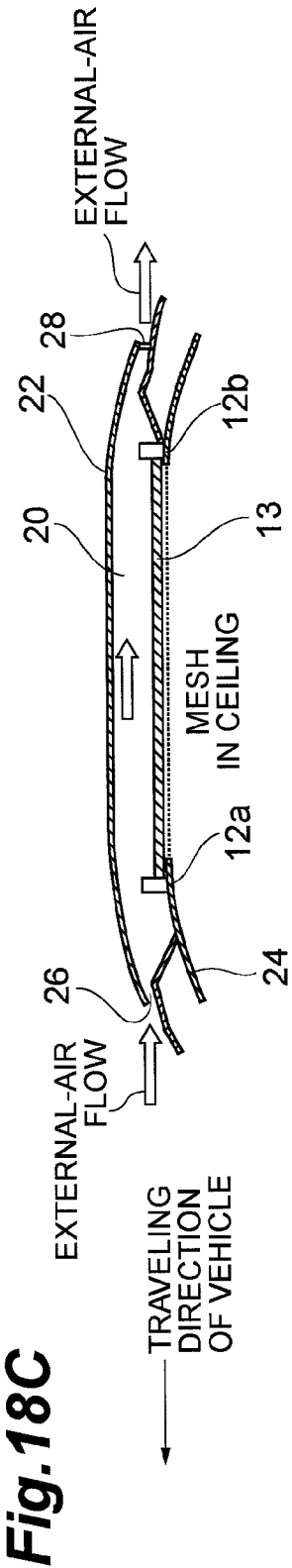

Alternatively, with reference to FIG. 18C, the ceiling part of the interior wall 24 may be cut out and infilled with a mesh material on which the permselective membrane 13 to be disposed.

Glasses

Implementation 1B: Front Windshield

Figure 19A:
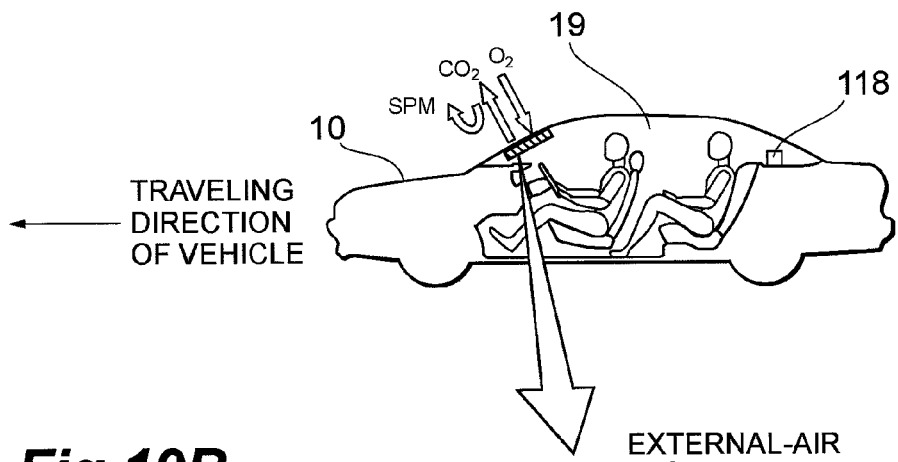
FIG. 19 is an outline schematic view illustrating a vehicle provided with a permselective membrane made of a permselective material of one or more embodiments of the present invention in the windshield, in an embodiment of the ventilation system of the present invention.
Figure 19B:
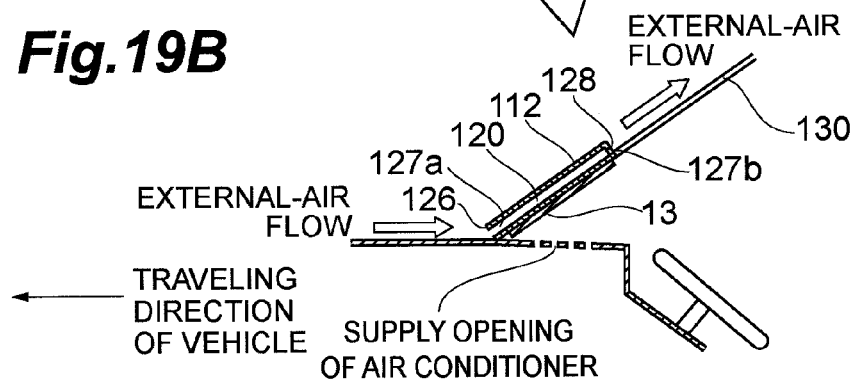

FIG. 19 is an outline schematic view of a vehicle (Implementation 1B), as an embodiment of the ventilation system of the present invention, provided with a permselective membrane made of a permselective material of one or more embodiments of the present invention in the windshield. With reference to FIG. 19B, the permselective membrane 13 is installed in the lower part of the windshield of the vehicle 10 accompanied by a cover 112, an external air inlet 126, an external air outlet 128, a front weir 127a, and a rear weir 127b.

The cover 112 shields the permselective membrane 13 on a side facing the external air in order to block the water drops. The cover 112 is substantially rectangular viewed from the front side and is curved along the windshield 130 viewed from the side of the vehicle 10.

The lengths of the long and short sides of the cover 112 are slightly greater than the lengths of the long and short sides of the planar permselective membrane 13 to be described below, so that one surface of the planar permselective membrane 13 can be covered entirely.

At the end of cover 112 in the direction of traveling of the vehicle, the external air inlet 126 to introduce the external air to the space 120 shielded with cover 112 (hereinafter referred to the space 120) is disposed, while at the end in the opposite direction of traveling of the vehicle, the external air outlet 128 to discharge the external air introduced to the space 120.

The external air inlet 126 and the external air outlet 128 are slender holes in a substantially rectangular shape having a long side in the lateral direction of the vehicle 10. The size of the holes i.e. the lengths of the long and short sides are determined depending on the type of vehicle and the volume of the external air to be introduced to the space 120.

The front weir 127a is disposed in the vicinity of the space 120 of the external air inlet 126, while the rear weir 127b is disposed outside the windshield 130 in the space 120 close to the upper boundary between the windshield 130 and the permselective membrane 13.

The front weir 127a includes a substantially rectangular slender plate disposed along in the direction of traveling of the vehicle 10. The plate is fixed so as to dispose its long side in the width direction of the vehicle 10 with a clearance to the permselective membrane 13. Hereupon, the length of the long side of the plate is slightly greater than the length of the permselective membrane 13 in the width direction of the vehicle 10, so that the permselective membrane 13 is protected against the invasion of water drops.

The rear weir 127b includes a similar plate to the front weir 127a. These plates, also, have a length greater than the length of the permselective membrane 13 in the width direction of the vehicle 10.

Due to the front weir 127a, the water drops contained in the external air introduced to the space 120 is removed, fall onto the outer surface of the body of the vehicle 10, and then are discharged to a drain (not shown in the drawing) outside the vehicle 10 via the outer surface of the body.

Furthermore, due to the rear weir 127b, the water drops to come in the space 120 via the outer surface of the windshield 130 are blocked, and are discharged to a drain (not illustrated) outside the vehicle 10.

The permselective membrane 13 constitutes part of the windshield 130 of the vehicle 10. More specifically, with reference to FIG. 19B, a lower part of the windshield 130 of the vehicle 10 is cut out in a substantially rectangular shape having a long side in the width direction of the vehicle 10. Then, the permselective membrane 13 has a substantially rectangular planar shape having the same size as that of the substantially rectangular cutout windshield 130, so as to fit in the cutout part of the windshield 130.

The sizes of the permselective membrane 13, i.e. the lengths of the long and short sides are determined by the type of vehicle 10 and the volume of the air introduced to the space 120.

Implementation 2B: Rear Windshield

With reference to FIG. 20, a rear windshield 139 formed of a permselective membrane 13 on a porous glass sheet 132 in the embodiment (Implementation 2B) is described below. FIG. 20 is an outline schematic view illustrating the rear windshield 139 including the porous glass 132 provided with the permselective membrane 13.

In the ventilation system of a vehicle in accordance with this embodiment, the glass part in the rear windshield 139 illustrated in FIG. 20A is replaced with a porous glass sheet 132 provided with the permselective membrane 13 as illustrated in FIG. 20B.

The porous glass sheet 132 has fine pores over the entire mass that can pass the air in both directions to and from the vehicle interior 19.

The permselective membrane 13 is in close contact with the entire surface of the porous glass sheet 132 facing the vehicle interior 19. Additionally, a reinforcement 134 formed of a mesh material is provided on the permselective membrane 13 on the porous glass sheet 132 facing the vehicle interior 19.

With reference to FIG. 20C, a dust protective filter 136 may be disposed between the reinforcement mesh 134 and the permselective membrane 13 illustrated in FIG. 20B. The dust protective filter 136 can prevent the dust in the vehicle interior 19 from attaching directly to the permselective membrane 13.

With reference to FIG. 20D, instead of the reinforcement mesh 134 in FIG. 20B, the permselective membrane 13 may be sandwiched between two porous glass sheets 132a and 132b, thereby the porous glass sheet 132a, the permselective membrane 13, and the porous glass sheet 132b are stacked in sequence.

Implementation 3B: Sliding Roof

With reference to FIG. 21, a sliding roof 138 formed of the permselective membrane 13 provided on a porous glass sheet 132 in the embodiment (Implementation 3B) is described below. FIG. 21 is an outline schematic view illustrating the sliding roof 138 including the porous glass sheet 132 provided with the permselective membrane 13.

Figure 21A:
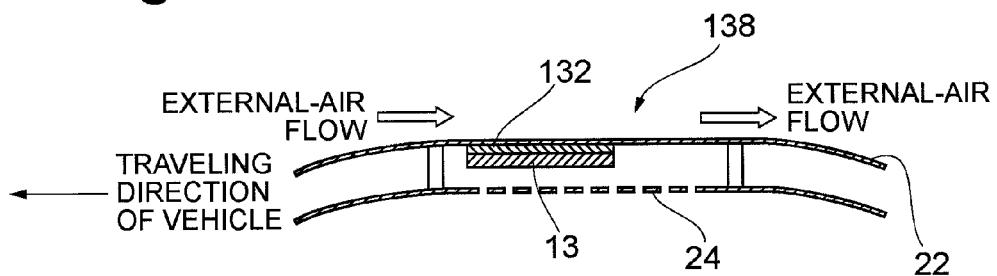
FIG. 21 is an outline schematic view illustrating a vehicle provided with a permselective membrane made of a permselective material of one or more embodiments of the present invention in the sliding roof, in an embodiment of the ventilation system of the present invention.
Figure 21B:
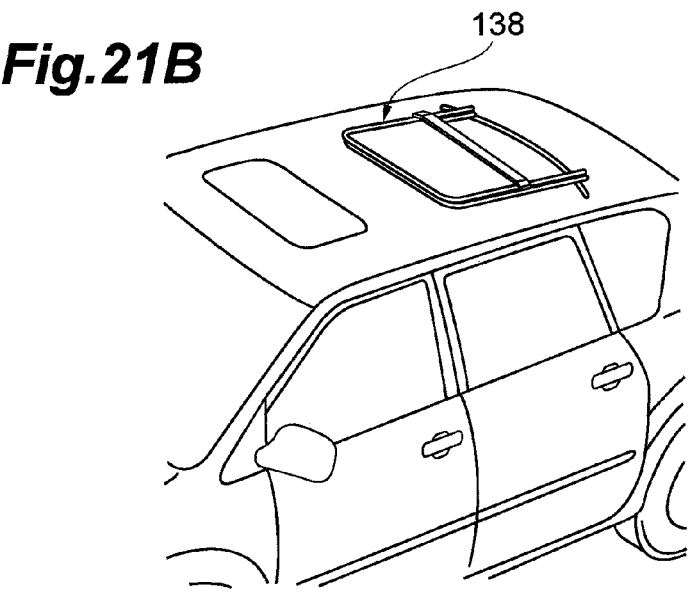

In this ventilation system, the glass part in the sliding roof 138 illustrated in FIG. 21B is replaced with the porous glass 132 provided with the permselective membrane 13 as illustrated in FIG. 21A, and the interior wall 24 of the vehicle 10 defining the sliding roof 138 is provided with many holes.

The external air, thus, flows along the outer surface of the porous glass 132 as the sliding roof 138, in a direction opposite to the traveling direction of the vehicle. During this period, the air in the vehicle interior 19 is exchanged with the external air through the permselective membrane 13.

Pillars

Figure 22:
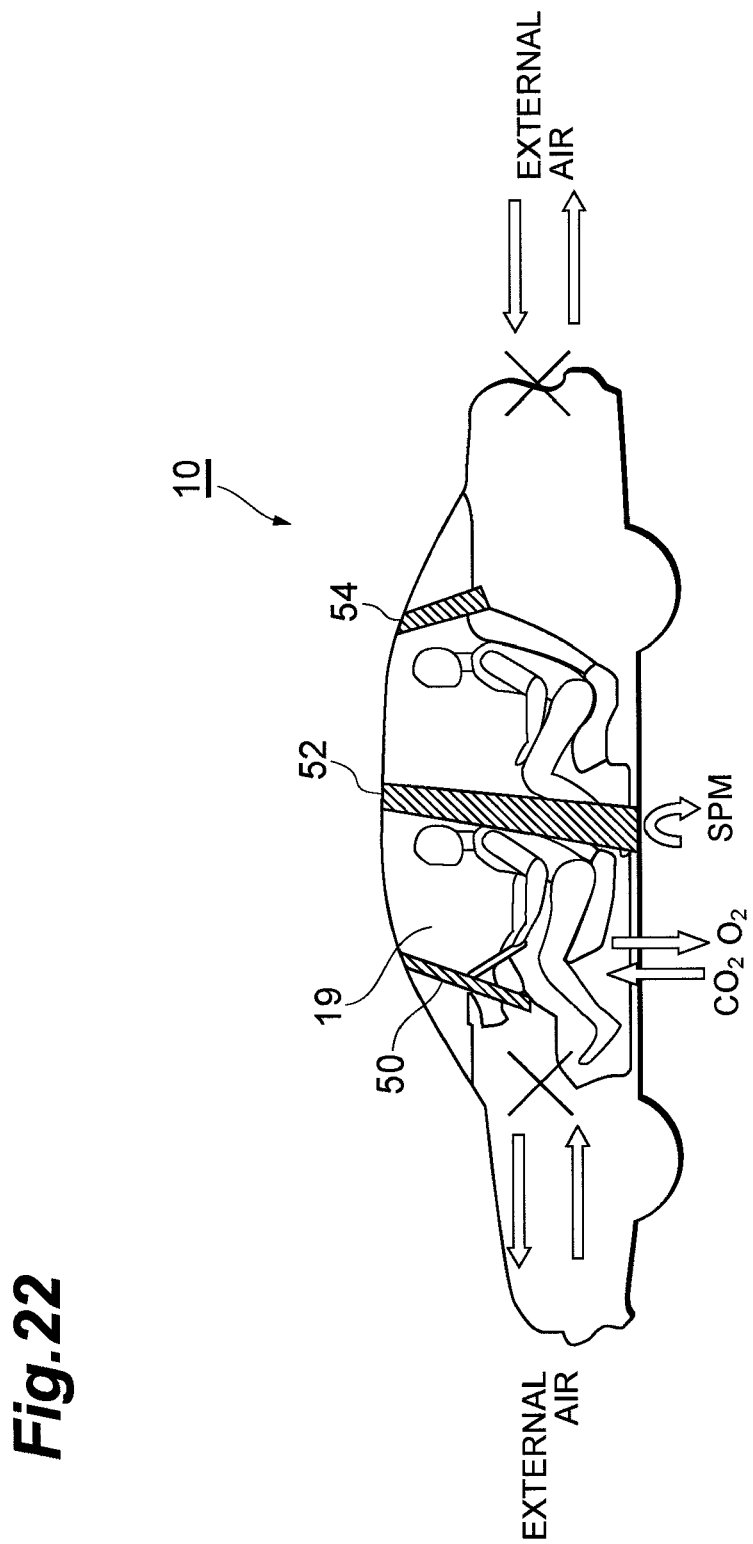
FIG. 22 is a schematic cross-sectional view illustrating a vehicle provided with a permselective membrane made of a permselective material of one or more embodiments of the present invention in the pillar, in an embodiment of the ventilation system of the present invention.

FIG. 22 is a schematic cross-sectional view illustrating a vehicle, which is an embodiment of the ventilation system of the present invention, provided with a permselective membrane made of a permselective material of one or more embodiments of the present invention in a pillar. With reference to FIG. 22, the vehicle 10 includes a vehicle 10 that is surrounded by substantially non-permeable walls of aluminum and glass and that blocks ambient air, and spaces outside the vehicle interior 19 such as a trunk and an engine compartment, wherein the spaces allow ambient air to enter.

Parts of the walls defining the vehicle interior 19 include pillars 50, 52, and 54. The front pillars 50 are disposed at both ends of the windshield in the front section of the vehicle interior 19, the central pillars 52 roughly in the center of the long sides of the windows on both sides of the vehicle 10, and the rear pillars 54 at both ends of the rear windshield in the rear section of the vehicle interior 19.

The vehicle 10 is provided with an air conditioner, also (not shown in the drawing). The air conditioner circulates the interior air only.

With reference to FIG. 23, the configuration of the ventilation system in this embodiment is described. FIG. 23A is an outline schematic view illustrating the vehicle 10 and pillars 50, 52, and 54 in the vehicle 10, while FIG. 23B is an outline schematic view illustrating a pattern of the structure of the central pillar 52.

With reference to FIG. 23A, the vehicle 10 is provided with the front pillar 50, the central pillar 52, and the rear pillar 54. Since each pillar 50, 52, and 54 has the same structure, the central pillar 52 is described below in details as an example with reference to FIG. 23B.

The central pillar 52 forms a hollow cylinder having an elliptical upper end 52e and an elliptical lower end 52f. An external air intake 52a and an external air outlet 52b are disposed in the side face, remote from the vehicle interior 19, of the cylinder, while an internal air intake 52c and an internal air outlet 52d are disposed in the side face, adjacent to the vehicle interior 19, of the cylinder.

The external air intake 52a is disposed at the lower part of the central pillar 52, while the external air outlet 52b is disposed at the upper part of the central pillar 52. The internal air intake 52c is disposed at the lower part of the central pillar 52, while the internal air outlet 52d is disposed at the upper part of the central pillar 52.

The permselective membrane 13 is installed in the hollow portion of the central pillar 52 so as to separate the external air taken in through the external air intake 52a and discharged to the external air outlet 52b from the internal air taken in through the intake 52c and discharged to the outlet 52d.

More specifically, the permselective membrane 13 is disposed such that the upper and lower ends of the permselective membrane 13 are aligned to the major axes of the elliptical upper and lower ends 52e and 52f, respectively of the central pillar 52. The upper end of the permselective membrane 13 is in close contact with the inner surface of the elliptical upper end 52e of the central pillar 52 with an adhesive, while the lower end of the permselective membrane 13 is in close contact with the inner surface of the elliptical lower end 52f of the central pillar 52 with an adhesive.

Furthermore, the upper and lower ends of the perm selective membrane 13 is in close contact with the minor arc inside the cylinder of the central pillar 52 having elliptic cross sections along the axis of the cylinder with an adhesive.

Although FIG. 23B schematically illustrates a planar permselective membrane 13, a bellows membrane may be used.

A temperature sensor 60 is provided on the surface, remote from the vehicle interior 19, of the permselective membrane 13, and two fans 56a and 56b are provided in the central pillar 52.

The temperature sensor 60 such as a thermocouple or Peltier device is used for measuring the surface temperature of the permselective membrane 13 and outputting electric signals converted from the temperature.

The fan 56a and 56b are provided in the pathway introducing the external air from the external air intake 52a to the external air outlet 52b and in the pathway circulating the internal air from the internal air intake 52c and the internal air outlet 52d, respectively. When the surface temperature of the permselective membrane 13 measured with the temperature sensor 60 reaches a predefined temperature, the fans 156a and 156b cool (air-cool) the permselective membrane 13 by taking in the external air from the external air intake 52a and the internal air from the intake 52c.

The front pillar 50 and the rear pillar 54 can be described in the same way as the central pillar 52, which is described above as an example.

Floor

FIG. 24 is a schematic cross-sectional view illustrating a vehicle, which is an embodiment of the ventilation system of the present invention, provided with a permselective membrane made of a permselective material of one or more embodiments of the present invention in a floor. FIG. 24A is a schematic longitudinal cross-sectional view of the vehicle 10, while FIG. 24B is an enlarged view of the floor 150.

With reference to FIG. 24A, the vehicle 10 includes the vehicle interior 19 that is surrounded by substantially non-permeable walls of aluminum and glass and that blocks ambient air, and spaces outside the vehicle interior 19 such as a trunk and an engine compartment, wherein the spaces allow ambient air to enter.

With reference to FIG. 24B, a floor 150 of the vehicle interior 19 defines a space 141 between a floor panel 152 and an outer plate 154.

The vehicle 10 is provided with an air conditioner, also (not shown in the drawing). This air conditioner circulates the interior air only.

Structure of Ventilation System

The configuration of the ventilation system in this embodiment is described below. FIG. 24B is an outline schematic view illustrating a structure of the floor 150.

With reference to FIG. 24B, the floor 150 includes a floor panel 152 adjacent to the vehicle interior 19 and an outer plate 154 remote from the vehicle interior 19.

The floor panel 152, the outer plate 154, and side plates 153a and 153b define the space 141 between the floor panel 152 and the outer plate 154, and the permselective membrane 13 is disposed in the space 141.

The floor panel 152 is provided with an internal air intake 152a taking in the internal air to the space 141 from the vehicle interior 19 and an internal air outlet 152b discharging the internal air taken in the space 141 to the vehicle interior 19.

The internal air intake 152a is disposed in front of the driving seat in the direction of traveling of the vehicle 10, more specifically under the driver feet. Meanwhile, the internal air outlet 152b is disposed at the back of the driving seat in the direction of traveling of the vehicle 10, more specifically right in front of the rear seat.

The outer plate 154 defining the space 141 includes the external air intake 154c taking in the external air into the space 141 from the outside of the vehicle interior 19 and the external air outlet 154d discharging the external air taken in the space 141 to the outside of the vehicle interior 19.

The external air intake 154c is disposed in front of the driving seat in the direction of traveling of the vehicle 10, more specifically under the driver feet. Meanwhile, the external air outlet 154d is disposed at the back of the driving seat in the direction of traveling of the vehicle 10, more specifically right in front of the rear seat.

The permselective membrane 13 is disposed in the space 141 so as to separate the vehicle interior 19 from the outside of the vehicle interior 19. More specifically, the side ends of the permselective membrane 13 are in close contact with the inner surfaces, adjacent to the space, of the side plates 153a and 153b, which define the space 141, with an adhesive or a seal material.

Although FIG. 24B schematically illustrates a planar permselective membrane 13, a bellows membrane may be used.

A temperature sensor 60 is provided on the surface, remote from the vehicle interior 19, of the permselective membrane 13, and two fans 156a and 156b are provided in the space 141.

A temperature sensor 60 such as a thermocouple, a platinum resistive element, or a thermistor is used for measuring the surface temperature of the permselective membrane 13 and outputting electric signals converted from the surface temperature.

The fan 156a and 156b are provided in the pathway for circulating the internal air from the internal air intake 152a to the internal air outlet 152b and in the pathway for introducing the external air from the external air intake 154c to the external air outlet 154d, respectively. When the surface temperature of the permselective membrane 13 measured with the temperature sensor 60 reaches a predefined temperature, the fans 156a and 156b cools (air-cool) the permselective membrane 13 by taking in the external air from the intake 154c and the internal air from the intake 152a.

Doors

Implementation 1C

Configuration of Ventilation System

Figure 25A:
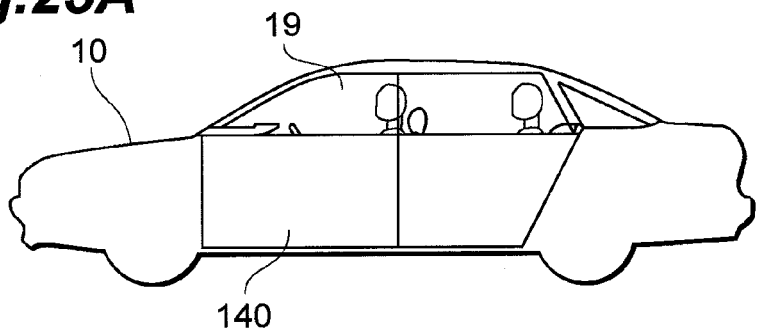
Figure 25B:
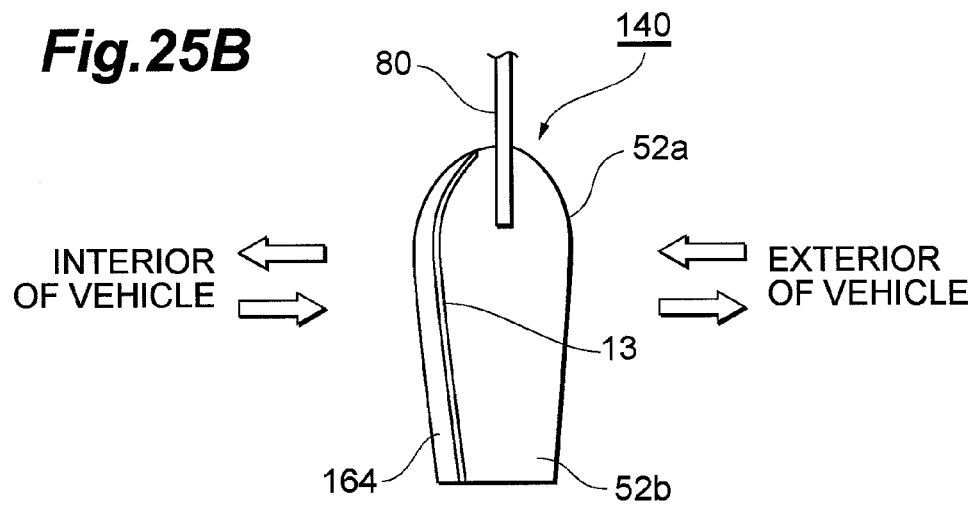
FIG. 25B is a schematic cross-sectional view of a door 140 taken along the width direction of the vehicle.

FIG. 25A is a side view illustrating a vehicle 10, which is an embodiment of a ventilation system of the present invention, provided with a permselective membrane made of a permselective material of one or more embodiments of the present invention in the door, while FIG. 25B is a schematic cross-sectional view of a door 140 taken along the width direction of the vehicle 10.

With reference to FIG. 25, the ventilation system includes an interior component 164, a permselective membrane 13, an external air intake 52a, and an external air outlet 52b disposed on a door 140. A window 80 made of glass is attached roughly on the central line of the door 140.

The external air intake 52a is a hole to take in the external air outside the vehicle interior 19, disposed in the upper part of the door 140 remote from the vehicle interior 19 relative to the window 80. Meanwhile, the external air outlet 52b is a hole to discharge the external air taken in from the external air intake 52a, disposed in the lower part of the door 140 remote from the vehicle interior 19 relative to the window 80.

The interior component 164 is provided on a surface of the vehicle interior 19, and is made of an air-permeable material. More particularly, the component is composed of an inorganic or organic compound having a form of porous object, fiber, thin film, or a composite thereof. Although the interior component 164 is not particularly limited provided that air can pass through its fine pores, it is preferred that the size of the pores be in the range from several tens of nanometers to several hundred nanometers.

Figure 25C:
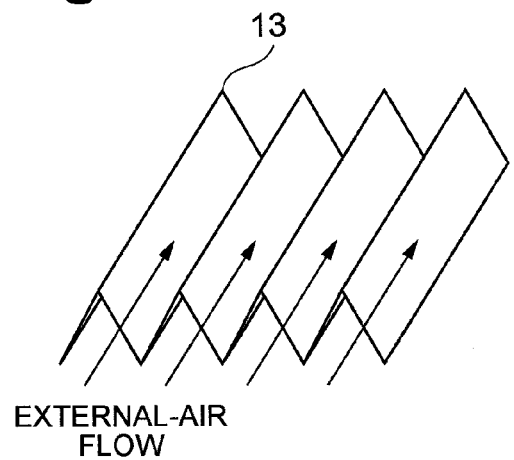
FIG. 25C is a perspective view of planar permselective membrane 13.
Figure 25D:
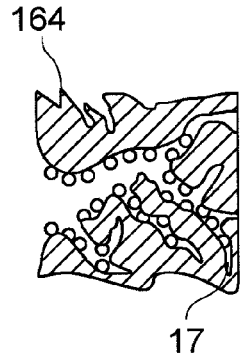
FIG. 25D is a sectional view of an interior component 164 with a deodorant 17.

With reference to FIG. 25D, the interior component 164 is provided with a deodorant 17 supported on the inner wall of the pores.

The deodorant 17 is a heated catalyst composed of one or more oxides of copper, manganese, platinum, nickel, iron, tantalum, aluminum, and titanium. The deodorant 17 is supported on the interior component 164 made of a porous inorganic compound. Although the diameter of the pores of the inorganic porous component is not limited provided that the supply of the gas to the permselective membrane 13 is not impaired, it is preferred that the diameter be in the range from several tens of micrometers to several hundred micrometers.

The permselective membrane 13 is in close contact with the surface, remote from the vehicle interior 19, of the interior component 164.

With reference to FIG. 25C, the planar permselective membrane 13 is accordion-folded, so that the plane is disposed roughly in parallel with the flow of the external air introduced from the outside of the vehicle interior 19, i.e. the ridge lines of the bellows are disposed roughly in parallel with the air flow.

The door 140 is provided with the permselective membrane 13 in close contact with the surface, remote from the vehicle interior 19, of the interior component 164, and the external air intake 52a and the external air outlet 52b are disposed remote from the vehicle interior 19 relative to the window 80; whereby the side adjacent to the vehicle interior 19 is separated from the side remote from the vehicle interior 19 in the door 140 and the external air introduced from the external air intake 52a hits against the surface, remote from the vehicle interior 19, of the permselective membrane 13.

Operation and Characteristics of Ventilation System

In the ventilation system in accordance with this embodiment, the external air introduced from the external air intake 52a comes in contact with the surface, remote from the vehicle interior 19, of the permselective membrane 13. The external air in contact with the surface, remote from the vehicle interior 19, of the permselective membrane 13 is discharged from the external air outlet 52b.

While the vehicle 10 is moving, the volume of external air introduced from the external air intake 52a increases, so that the external air continues to hit against the surface, remote from the vehicle interior 19, of the permselective membrane 13. In other words, the supply of the external air containing certain amounts of oxygen, carbon dioxide, and fine solid components to the surface, remote from the vehicle interior 19, of the permselective membrane 13 is kept.

Consequently, the permselective membrane 13 can maintain the concentrations of oxygen and carbon dioxide in the vehicle interior 19 at the same levels as the concentrations in the external air while the vehicle 10 is moving, without a blower introducing the external air into the vehicle interior 19. Since no blower is required, the load for a battery of the vehicle can be reduced.

Furthermore, the deodorant 17 supported in the fine pores of the porous object of the interior component 164 can remove malodorous components contained in the external air, which enters the vehicle interior 19 through the permselective membrane 13. Since no malodorous component enters the vehicle interior 19, the vehicle interior 19 can be maintained at comfort.

Moreover, the accordion-folded permselective membrane 13 can increase the surface area of the permselective membrane 13. Since the large surface area of the permselective membrane 13 increases the exchange volumes of oxygen and carbon dioxide, changes in the concentrations of oxygen and carbon dioxide in the vehicle interior 19 can be adjusted to certain levels for a short time.

Implementation 2C

Figure 26A:
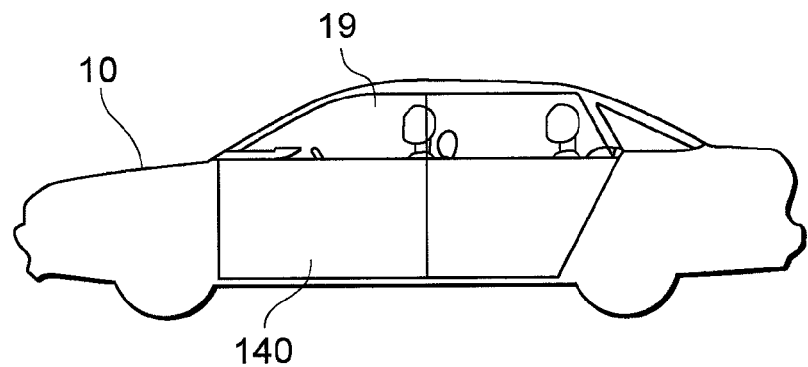
FIG. 26 is a schematic cross-sectional view illustrating a vehicle provided with a permselective membrane made of a permselective material of one or more embodiments of the present invention in the door in an embodiment of a ventilation system of the present invention.
Figure 26B:
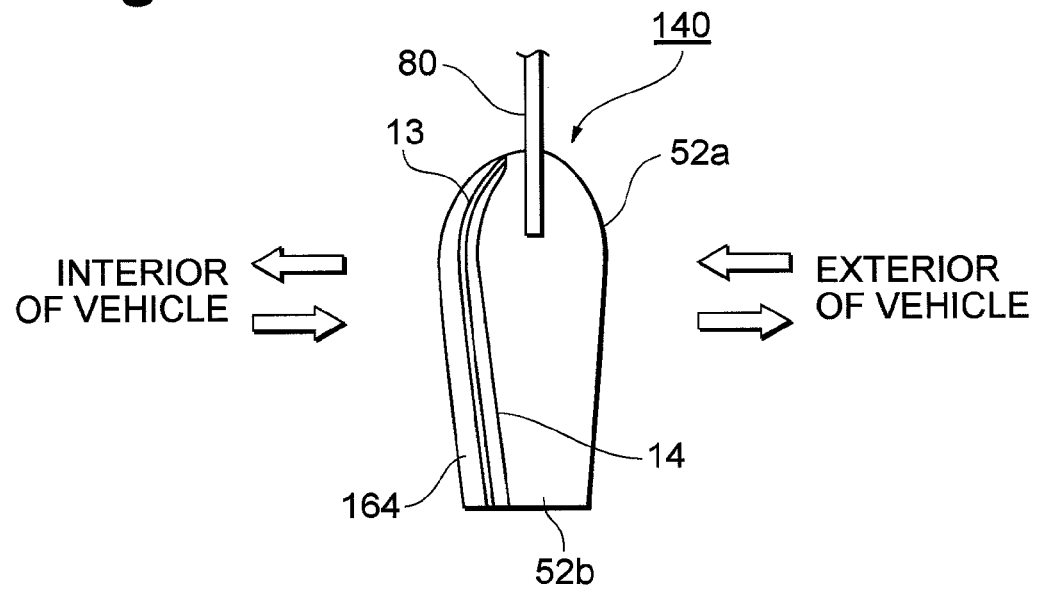

With reference to FIGS. 26 and 27, permselective membranes 13 provided with various functional members are described below. FIG. 26A is a side view illustrating a vehicle 10, and FIG. 26B is a schematic cross-sectional view illustrating a door 140 taken along the width direction of the vehicle 10. FIG. 27 is a schematic cross-sectional view illustrating another door 140 taken along the width direction of the vehicle 10.

With reference to FIG. 26B, a ventilation system in accordance with the Implementation 2C is provided with a dust removal filter 14 in close contact with a surface, remote from the vehicle interior 19, of a permselective membrane 13.

The dust removal filter 14 is a membranous member having pores greater than the fine pores in the permselective membrane 13, the membranous member including, for example, an activated carbon fiber, a nonwoven fabric, a plastic fiber, or a charged fiber; and a fibrous, nonwoven, planar, undulant, or granular substrate.

Examples of the material used for the plastic fiber include polypropylene, nylons, polyesters, polyvinyl chloride, polyvinylidene chloride, polyethylene, polyvinylidene fluoride, and acrylic plastics. These plastic fibers are braided alone or in combination of two or more.

Examples of the charged fiber include electret fibers of polymers such as polypropylene charged by an electro-electret method, in which ions are forcibly implanted from an external electrode. Examples of the polymer include fluorine resins, silicone resins, epoxy resins, polyolefins, polystyrene derivatives, polystyrene, polyamides, polyvinyl halides, polyurethanes, polyvinyl chloride, and polycarbonates, in addition to polypropylene.

Examples of the electrification method for the charged fiber include a photo-electret method involving irradiation of an electric field with UV rays, a mechano-electret method causing a plastic flow by an applied stress, a thermo-electret method involving application of a high electric field to the polymer at an increased temperature, a magnet-electret method involving application of a magnet field at an increased temperature, and a radio-electret method involving irradiation with electromagnetic rays such as γ rays, in addition to the electro-electret method.

The dust removing filter 14, which is disposed on the surface, remote from the vehicle interior 19, of the permselective membrane 13, can remove the dust from the external air in contact with the surface, remote from the vehicle interior 19, of the permselective membrane 13. Consequently, no dust attaches to the surface, remote from the vehicle interior 19, of the permselective membrane 13, so that the gas permeability of the permselective membrane 13 can be kept.

Figure 27A:
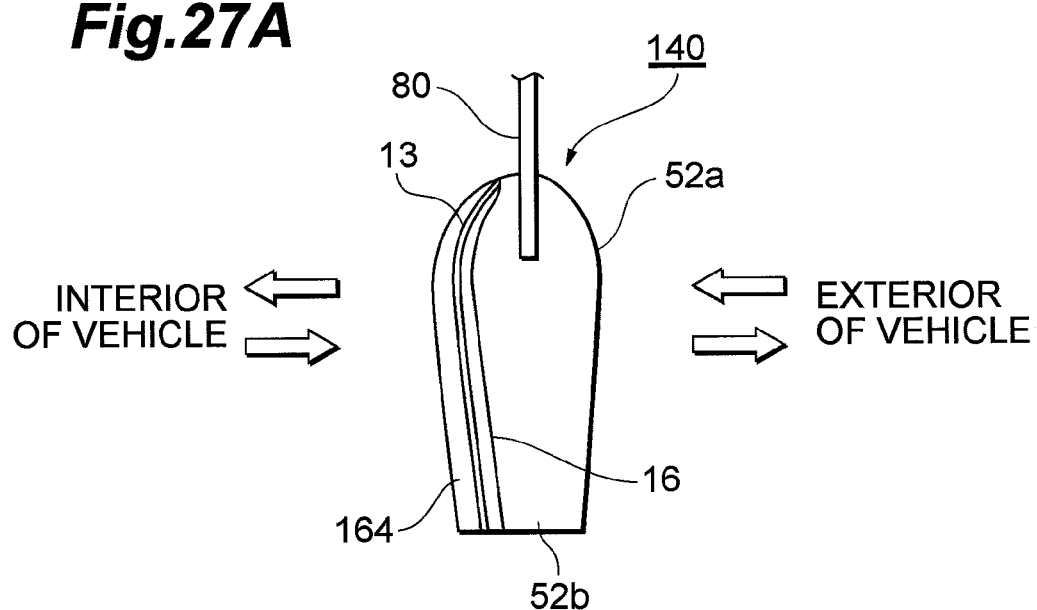
FIG. 27 is a schematic cross-sectional view illustrating a vehicle provided with a permselective membrane made of a permselective material of one or more embodiments of the present invention in the door in an embodiment of a ventilation system of the present invention.

With reference to FIG. 27A, a dehumidifier 16 may be disposed in close contact with the surface, remote from the vehicle interior 19, of the permselective membrane 13.

The dehumidifier 16 is in close contact with the surface, remote from the vehicle interior 19, of the permselective membrane 13, and removes the moisture contained in the external air which comes in contact with the surface, remote from the vehicle interior 19, of the permselective membrane 13.

More specifically, examples of the dehumidifier 16 include; mixtures of water-absorbing polymers, cotton pulp, feed-water paper, silica gel, calcium oxide, magnesium oxide, or calcium chloride with porous materials; water-absorbing polymers such as electrolytic polymers or hydrophilic polymers; acrylic polymers; vinyl alcohol; or a polymer of acrylic acid. Such a dehumidifier 16 is stacked on the surface, remote from the vehicle interior 19, of the permselective membrane 13.

Due to the configuration, the moisture contained in the external air which comes in contact with the surface, remote from the vehicle interior 19, of the permselective membrane 13 can be removed, so that no water attaches to the surface of the permselective membrane 13. Consequently, the gas permeability of the permselective membrane 13 can be kept.

Furthermore, since no water comes in the vehicle interior 19 through the permselective membrane 13, the clouding of the window 80 of the vehicle interior 19 can be prevented. The term "to remove the moisture" here means removal of the moisture to an acceptable level, not complete removal.

Figure 27B:
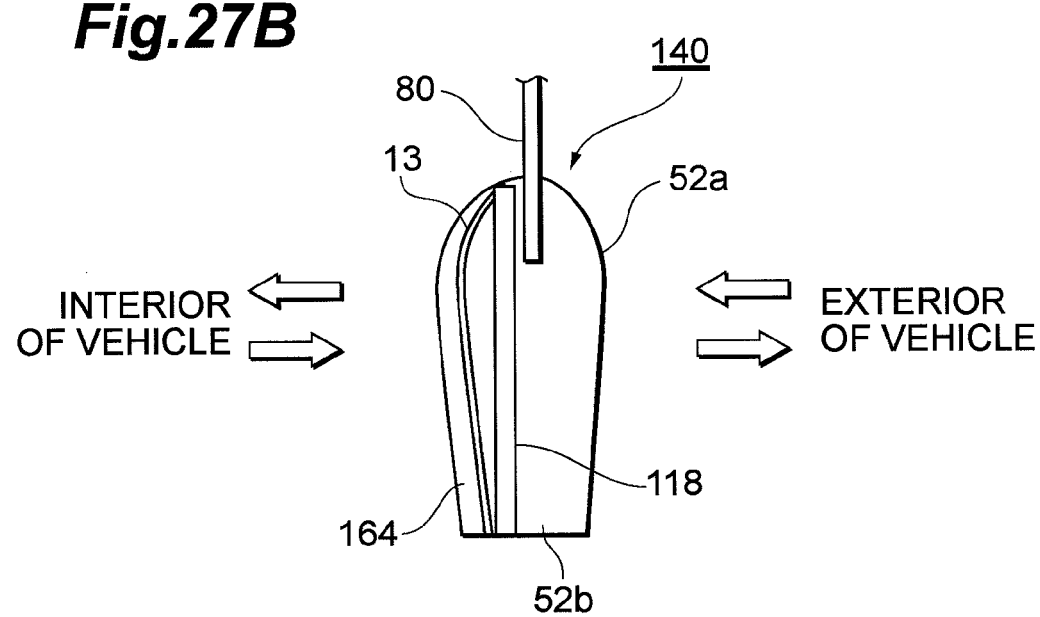

With reference to FIG. 27B, an optional blower 118 may be provided in the vicinity of the surface, remote from the vehicle interior 19, of the permselective membrane 13.

The blower 118 provided in the vicinity of the surface, remote from the vehicle interior 19, of the permselective membrane 13 supplies the air from the outside of the vehicle interior 19 through the external air intake 52a to the surface, remote from the vehicle interior 19, of the permselective membrane 13.

This configuration allows the blower 118 to feed the external air remote from the vehicle interior 19 to the permselective membrane 13. Since the fresh air continues to hit against the surface, remote from the vehicle interior 19, of the permselective membrane 13, the concentrations of oxygen and carbon dioxide remote from the vehicle interior 19 are kept constant at the surface, remote from the vehicle interior 19, of the permselective membrane 13. Consequently, changes in the concentrations of oxygen and carbon dioxide in the vehicle interior 19 can be recovered to certain levels for a short time.

Furthermore, since no water enters the vehicle interior through the permselective membrane 13, the clouding of the window 80 of the vehicle interior 19 can be prevented.

Implementation 3C

Figure 28A:
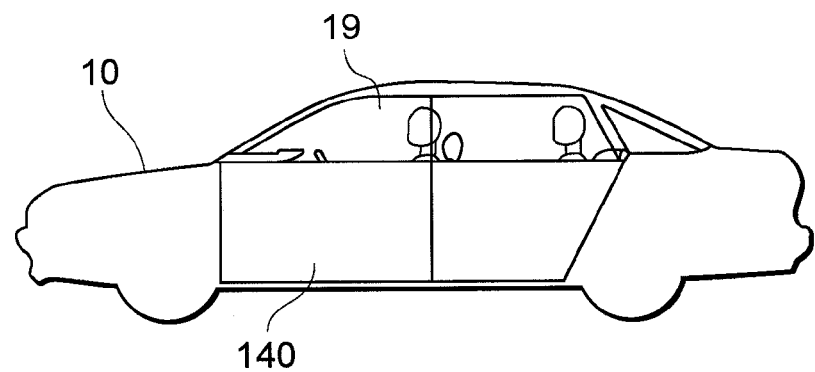
FIG. 28 is a schematic cross-sectional view illustrating a vehicle provided with a permselective membrane made of a permselective material of one or more embodiments of the present invention in the door in an embodiment of a ventilation system of the present invention.
Figure 28B:
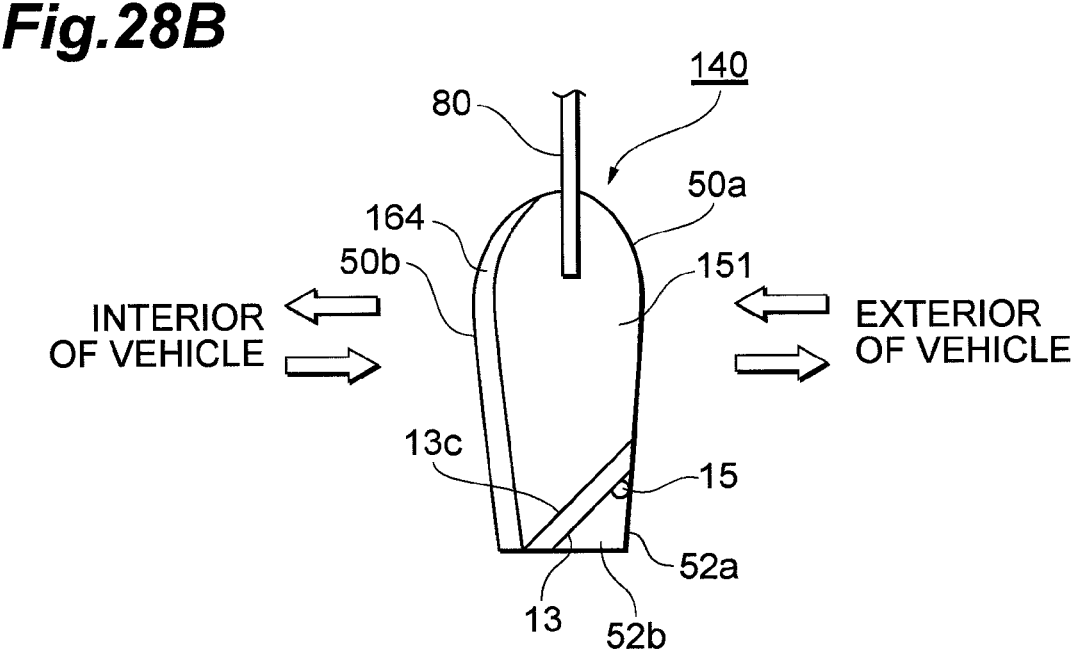

With reference to FIGS. 28 and 29, an implementation in which a permselective membrane 13 disposed in the door 140 covers an external air intake 52a and an external air outlet 52b is described below, instead of the above-mentioned Implementation 1C and 2C in which the permselective membrane 13 is in close contact with the interior component 164. FIG. 28A is a side view illustrating a vehicle 10, and FIG. 28B is a schematic cross-sectional view of a door 140 taken along the width direction of the vehicle 10. FIG. 29 is a schematic cross-sectional view of another door 140 taken along the width direction of the vehicle 10.

With reference to FIG. 28B, in the ventilation system of Implementation 3C, the door 140 has a space 151 which is defined by an outer wall 50a remote from the vehicle interior 19 and an inner wall 50b adjacent to the vehicle interior 19. An external air intake 52a is disposed in a lower position of the outer wall 50a above the external air outlet 52b.

The external air outlet 52b is provided in a lower position of the outer wall 50a, and the permselective membrane 13 is disposed diagonally from the upper right to the bottom left in the space 151 in the drawing so as to cover the external air intake 52a and the external air outlet 52b. The overall surface, adjacent to the vehicle interior, of the permselective membrane 13 is reinforced with a reinforcement 13c. Furthermore, a heat accumulator 15 is provided in the portions between the permselective membrane 13 and the outer wall 50a.

The reinforcement 13c is composed of one or more materials selected from polyolefins, polycarbonates, polyether sulfones, polyvinyl idene fluoride, polyethylene, fluorine resins (e.g. PTFE and PEF), glass (e.g. glass fiber), and cellulose. Preferably, the reinforcement 13c has a porous structure, of which the diameter of the fine pores is in the range, for example, from several nanometers to several hundred nanometers.

The heat accumulator 15 heats the permselective membrane 13 directly or indirectly through the reinforcement 13c. Actually, the heat accumulator 15 accumulates the heat supplied from outside, to heat the permselective membrane 13 by the accumulated heat. More specifically, the accumulator is composed of a material of which thermal conductivity is higher than those of the permselective membrane 13 and the reinforcement 13c, such as a honeycomb ceramic, inorganic hydrated salt, paraffin or wax supported on a porous object.

Actually, the heat accumulator 15 stores the radiation heat from the sun as external heat. Consequently, when the permselective membrane 13 is disposed inside the door 140, the radiation heat from the sun, which shines above the vehicle 10, is accumulated.

Figure 29A:
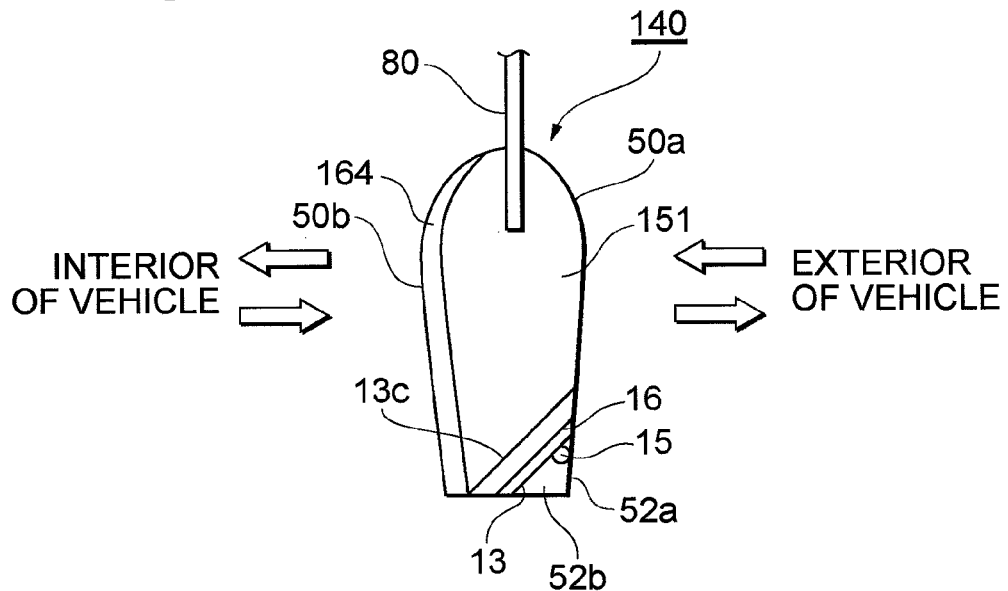
FIG. 29 is a schematic cross-sectional view illustrating a vehicle provided with a permselective membrane made of a permselective material of one or more embodiments of the present invention in the door in an embodiment of a ventilation system of the present invention.

With reference to FIG. 29A, a dehumidifier 16 on the surface, remote from the vehicle interior 19, of the permselective membrane 13 can remove the moisture contained in the external air which comes in contact with the surface, remote from the vehicle interior 19, of the permselective membrane 13, so that no water attaches to the surface of the permselective membrane 13. Consequently, the gas permeability of the permselective membrane 13 can be kept.

Figure 29B:
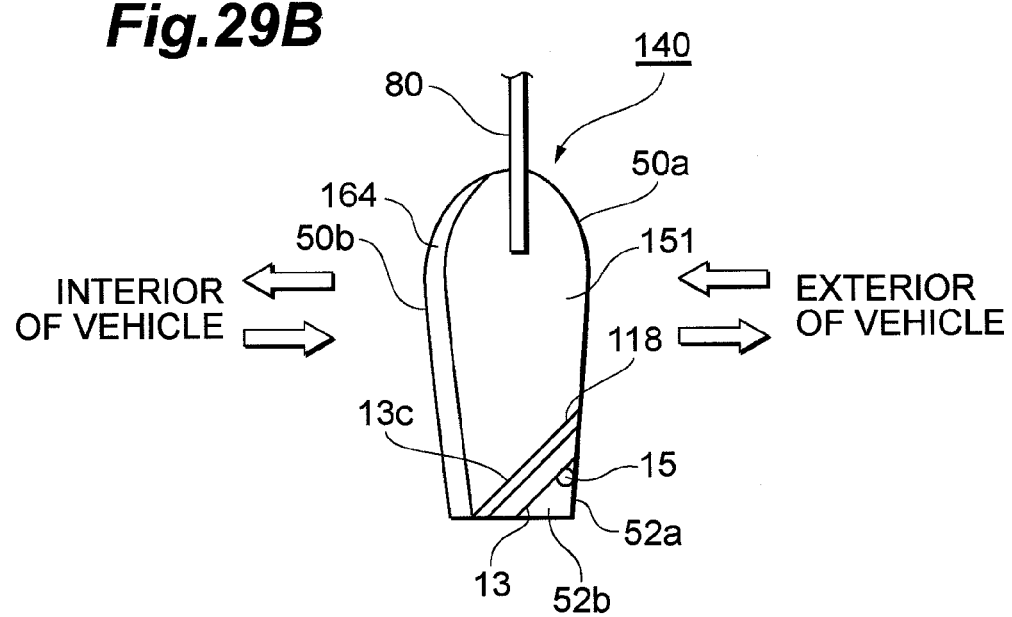

With reference to FIG. 29B, an optional blower 118 may be provided over the surface, adjacent to the vehicle interior 19, of reinforcement 13c. The blower 118 which suctions the external air to the vehicle interior 19 increases the volume of the external air introduced from the external air intake 52a in contact with the surface, remote from the vehicle interior 19, of the permselective membrane 13.

Consequently, the volume of oxygen introduced to the vehicle interior 19 and the volume of carbon dioxide discharged from the vehicle interior 19 increase, so that changes in the concentrations of oxygen and carbon dioxide in the vehicle interior 19 can be recovered to certain levels for a short time.

In the vehicle equipped with the above-mentioned ventilation system, gas is discharged and introduced through the permselective membrane made of the permselective material of one or more embodiments of the present invention. Consequently, the suspended materials such as SPM and nSPM in the air does not flow into the vehicle interior, and the suspended materials such as SPM and nSPM in the vehicle interior, if present, can be removed.

EXAMPLES

Synthetic Example 1A

After 150 g (0.38 mol) of norbornen-2-yltris(trimethylsiloxy)silane and 3000 g of toluene were placed into a 5-L three-necked flask provided with a stirrer, a thermometer, and a condenser tube, the mixture was heated to 40° C. A solution of 0.31 g (0.38 mmol) of bis(tricyclohexylphosphine)benzylideneruthenium(IV) dichloride in 330 g of toluene was added to the mixture, followed by polymerization reaction at 40° C. From the start of the polymerization reaction, the viscosity of the solution gradually increased, and 20 minutes later, 1 g of ethyl vinyl ether was added to terminate the polymerization. The polymer solution was placed into a large volume of methanol to coagulate the precipitate, which was pulverized, washed and separated by filtration. It was dried under reduced pressure at 70° C. for 5 hours to recover white powdered silicone modified cycloolefin polymer. The yield of the resulting polymer was 147 g, and Mn=259,000 and Mw=604,000 on the basis of polystyrene by gel permeation chromatography using toluene as a solvent. The resulting silicone modified cycloolefin polymer has a structure represented by Formula (7):

[Chemical Formula 2]

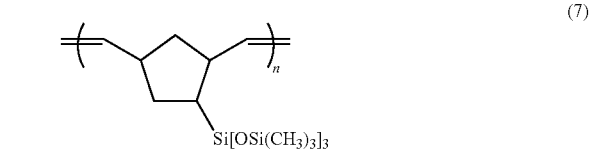

(7)

Synthetic Example 2A

A liquid mixture of 88 g of Pluronic P123 (available from BASF, (ethylene oxide)$_{20}$(propylene oxide)$_{70}$(ethylene oxide)$_{20}$), 2640 g of water, 453.5 ml of hydrochloric acid was stirred with a mechanical stirrer at room temperature. After Pluronic P123 was dissolved, 187.8 g of tetraethoxysilane (available from Kanto Chemical Co., Inc.) was added dropwise, and then the mixture was further stirred for 12 hours. The mixture was heated in an oven held at 35° C. for 20 hours, and further heated in an oven held at 100° C. for 24 hours. The resulting white solid was washed with water, was recovered by filtration, and was dried with a vacuum pump. The product was calcined in a furnace held at 550° C. for 6 hours to yield mesoporous silica (56.3 g).

Example 1A

Silicone modified pullulan polymer (X-22-8400 available from Shin-Etsu Chemical Co., Ltd.) was dissolved in toluene into a solid content of 1 wt %. To the solution (12 g), 0.196 g of spherical silica (X-24-9163A available from Shin-Etsu Chemical Co., Ltd., average diameter: 110 nm) [163 parts by mass for 100 parts by mass of silicone modified pullulan polymer (50 vol % to silicone modified pullulan polymer)] was compounded, and the mixture was agitated with an ultrasonic homogenizer. The resulting solution was placed into a Teflon (Registered Trade Mark by Du Pont, USA) petri dish (diameter: 90 mm), and toluene was removed using a vacuum drier. A membrane having an average thickness of 25 μm was yielded.

Example 2A

Silicone modified pullulan polymer (X-22-8400 available from Shin-Etsu Chemical Co., Ltd.) was dissolved in toluene into a solid content of 1 wt %. To the solution (12 g), 0.098 g of mesoporous silica prepared in Synthetic Example 2A [82 parts by mass for 100 parts by mass of silicone modified pullulan polymer (50 vol % to silicone modified pullulan polymer)] was compounded, and the mixture was agitated with an ultrasonic homogenizer. The resulting solution was placed into a Teflon (Registered Trade Mark by Du Pont, USA) petri dish (diameter: 90 mm), and toluene was removed using a vacuum drier. A membrane having an average thickness of 25 μm was yielded.

Example 3A

Silicone modified pullulan polymer (X-22-8400 available from Shin-Etsu Chemical Co., Ltd.) was dissolved in toluene into a solid content of 1 wt %. To the solution (12 g), 0.098 g of mesoporous silica prepared in Synthetic Example 2A subjected to hydrophobic treatment with 3-aminopropyltriethoxysilane (KBE903 available from Shin-Etsu Chemical Co., Ltd.) [82 parts by mass for 100 parts by mass of silicone modified pullulan polymer (50 vol % to silicone modified pullulan polymer)] was compounded, and the mixture was agitated with an ultrasonic homogenizer. The resulting solution was placed into a Teflon (Registered Trade Mark by Du Pont, USA) petri dish (diameter: 90 mm), and toluene was removed using a vacuum drier. A membrane having an average thickness of 25 μm was yielded.

Example 4A

Silicone modified pullulan polymer (X-22-8400 available from Shin-Etsu
Chemical Co., Ltd.) was dissolved in toluene into a solid content of 10 wt %. A conductive polymer polyaniline (emeraldine base available from Aldrich, molecular weight: 20000) was dissolved in cyclohexanone into a solid content of 2 wt %. To 0.6 ml of the silicone modified pullulan polymer solution, 0.4 ml of the polyaniline solution [13.3 parts by mass for 100 parts by mass of silicone modified pullulan polymer (40 vol % to the silicone modified pullulan polymer)] was compounded, and the mixture was agitated with an ultrasonic homogenizer. Using the mixed solution, a film was formed on a polycarbonate support (Isopore available from Japan Millipore Ltd., average pore diameter: 0.22 μm) by a water surface process. Toluene and cyclohexanone were removed using a drier to yield a membrane having an average diameter of 0.1 μm.

Example 5A

Silicone modified pullulan polymer (X-22-8400 available from Shin-Etsu Chemical Co., Ltd.) was dissolved in toluene into a solid content of 10 wt %. A conductive polymer polyaniline (emeraldine base available from Aldrich, molecular weight: 20000) was dissolved in cyclohexanone into a solid content of 2 wt %. To 0.6 ml of the silicone modified pullulan polymer solution, 0.4 ml of the polyaniline solution [13.3 parts by mass for 100 parts by mass of silicone modified pullulan polymer (40 vol % to silicone modified pullulan polymer)] was compounded. To 1 mL of this solution, 1 μL [0.1 parts by mass for 100 parts by mass of silicone modified pullulan polymer (0.17 vol % to the silicone modified pullulan polymer)] of 2N—HCl was added, and the mixture was agitated with an ultrasonic homogenizer. Using the mixed solution, a film was formed on a polycarbonate support (Isopore available from Japan Millipore Ltd., average pore diameter: 0.22 μm) by a water surface process. Toluene and cyclohexanone were removed using a drier to yield a membrane having an average diameter of 0.1 μm.

Example 6A

The silicone modified cycloolefin polymer prepared in Synthetic Example 1A was dissolved in toluene into a solid content of 10 wt %. A conductive polymer polyaniline (emeraldine base available from Aldrich, molecular weight: 20000) was dissolved in cyclohexanone into a solid content of 2 wt %. To 0.6 ml of the silicone modified cycloolefin polymer solution, 0.4 ml of the polyaniline solution [13.3 parts by mass for 100 parts by mass of silicone modified cycloolefin polymer (40 vol % to the silicone modified pullulan polymer)] was compounded, and the mixture was agitated with an ultrasonic homogenizer. Using the mixed solution, a film was formed on a polycarbonate support (Isopore available from Japan Millipore Ltd., average pore diameter: 0.22 μm) by a water surface process. Toluene and cyclohexanone were removed using a drier to yield a membrane having an average diameter of 0.1 μM.

Example 7A

The silicone modified cycloolefin polymer prepared in Synthetic Example 1A was dissolved in toluene into a solid content of 10 wt %. A conductive polymer polyaniline (emeraldine base available from Aldrich, molecular weight: 20000) was dissolved in cyclohexanone into a solid content of 2 wt %. To 0.6 ml of the silicone modified pullulan polymer solution, 0.4 ml of the polyaniline solution [13.3 parts by mass for 100 parts by mass of silicone modified pullulan polymer (40 vol % to silicone modified cycloolefin polymer)] was compounded. To 1 mL of this solution, 5 μL [0.5 parts by mass for 100 parts by mass of silicone modified cycloolefin polymer (0.83 vol % to the silicone modified cycloolefin polymer)] of 2N—HCl was added, and the mixture was agitated with an ultrasonic homogenizer. Using the mixed solution, a film was formed on a polycarbonate support (Isopore available from Japan Millipore Ltd., average pore diameter: 0.22 μm) by a water surface process. Toluene and cyclohexanone were removed using a drier to yield a membrane having an average diameter of 0.1 μm.

Comparative Example 1A

A silicone modified pullulan polymer (X-22-8400 available from Shin-Etsu Chemical Co., Ltd.) was dissolved in toluene into a solid content of 1 wt %. The solution was placed into a Teflon (Registered Trade Mark by Du Pont, USA) petri dish (diameter: 90 mm), and toluene was removed using a vacuum drier. A membrane having an average thickness of 15 μm was yielded.

Comparative Example 2A

The silicone modified cycloolefin polymer prepared in Synthetic Example 1A was dissolved in toluene into a solid content of 1 wt %. The solution was placed into a Teflon (Registered Trade Mark by Du Pont, USA) petri dish (diameter: 90 mm), and toluene was removed using a vacuum drier. A membrane having an average thickness of 15 μm was yielded.

[Evaluation of Membrane]
(Evaluation of Gas Permeability Coefficient)

The gas permeability coefficient for oxygen and nitrogen of the membranes prepared in Examples 1A to 7A and Comparative Examples 1A and 2A were measured with a gas permeability measurement system GTR-20XAMDE (made by GTR Tech) under the following conditions. The results are shown in Tables 2 and 3.

<Conditions>
Temperature: 23±2° C.
Downstream pressure of membrane: approximately 0.0013 atm
Upstream pressure of membrane: 1.05 to 1.20 atm
Pressure difference across membrane: 1.05 to 1.20 atm
(Evaluation of Blocking Rate of nSPM)

Figure 30:
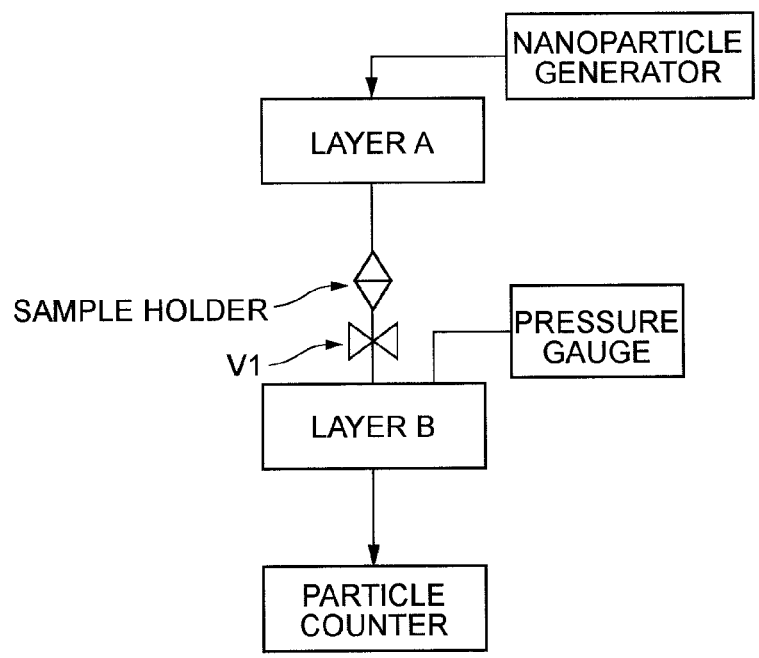
FIG. 30 is a schematic diagram illustrating a device that measures the shielding rate of nSPM.

The blocking factors of nSPM of the membranes prepared in Examples 4A to 7A and Comparative Examples 1A and 2A were measured using an apparatus schematically shown in FIG. 30 according to the following procedures. The results are shown in Table 3.
(1) Carbon particles of 10 to 500 nm were generated with a nanoparticle generator GFG-1000 (made by Palas GmbH);

(2) Each membrane was attached to a sample holder (area of membrane: MAX 16 [cm$^2$]), and the valve (V1) was closed to evacuate the layer B (differential pressure: 1 [kPa]);
(3) After the evacuation of the layer B, the valve (V1) was opened so that nanoparticles carried by gas flowing before the layer B returns atmospheric pressure are fed onto the membrane and accumulated in the layer B;
(4) The weight of particles in the layer B was measured with a particle counter SMPS-3034 (made by TSI); and
(5) The blocking rate was calculated by the following equation:

nSPM blocking rate[wt %]=100×{($C$in−$C$out)/$C$in} where "Cin" represents the concentration of particles [μg/ml] upstream of the membrane and "Cout" represents the concentration of particles [μg/ml] after permeation.

Examples 8A to 12A and Comparative Examples 3A to 8A

Silicone modified pullulan polymer (X-22-8400 available from Shin-Etsu Chemical Co., Ltd.) was dissolved in toluene into a solid content of 1 wt %. To 12 g of this solution, a predetermined amount of additive shown in Table 4 was added, followed by mixing with an ultrasonic homogenizer. The resulting filler-containing solution was placed into a Teflon (Registered Trade Mark by Du Pont, USA) petri dish (diameter: 90 mm), and toluene was removed using a vacuum drier. A membrane having an average thickness of 20 to 30 μm was yielded for each example. Characteristics of the additives listed in Table 4 are shown in Table 5.

TABLE 2

| | | Additive | | | Permeability coefficient [cm$^3$·cm·sec$^{-1}$·cm$^{-2}$·cmHg$^{-1}$] | | Separation ratio α |
|---|---|---|---|---|---|---|---|
| | Silicone polymer | Type | Surface property | Content (parts)* | Oxygen | Nitrogen | O$_2$/N$_2$ |
| Example 1A | Silicone modified pullulan polymer | Spherical silica | Hydrophobic | 164 | 2.53 × 10$^{-6}$ | 2.66 × 10$^{-6}$ | 0.95 |
| Example 2A | Silicone modified pullulan polymer | Mesoporous silica | Hydrophilic | 82 | 6.74 × 10$^{-5}$ | 7.02 × 10$^{-5}$ | 0.96 |
| Example 3A | Silicone modified pullulan polymer | Mesoporous silica | Hydrophobic | 82 | 6.6 × 10$^{-5}$ | 6.9 × 10$^{-5}$ | 0.96 |
| Comparative Example 1A | Silicone modified pullulan polymer | | Not added | | 1.74 × 10$^{-8}$ | 6.92 × 10$^{-9}$ | 2.51 |
| Comparative Example 2A | Silicone modified cycloolefin polymer | | Not added | | 2.37 × 10$^{-8}$ | 1.37 × 10$^{-8}$ | 1.73 |

*parts by mass for 100 parts by mass of silicone polymer

TABLE 3

| | | Additive | | | Permeability coefficient [cm$^3$·cm·sec$^{-1}$·cm$^{-2}$·cmHg$^{-1}$] | | Separation ratio α | nSPM blocking Rate |
|---|---|---|---|---|---|---|---|---|
| | Silicone polymer | Type | Content* | Addition of acid | Oxygen | Nitrogen | O$_2$/N$_2$ | wt % |
| Example 4A | Silicone modified pullulan polymer | Polyaniline | 13.3 parts by mass | None | 1.60 × 10$^{-7}$ | 1.65 × 10$^{-7}$ | 0.97 | 99.9 |
| Example 5A | | | 0.1 parts by mass | | 4.18 × 10$^{-7}$ | 4.35 × 10$^{-7}$ | 0.96 | 99.9 |
| Example 6A | Silicon modified cycloolefin polymer | | None | | 8.45 × 10$^{-8}$ | 8.74 × 10$^{-8}$ | 0.97 | 99.9 |
| Example 7A | | | 0.5 parts by mass | | 1.37 × 10$^{-7}$ | 1.41 × 10$^{-7}$ | 0.97 | 99.9 |
| Comparative Example 1A | Silicone modified pullulan polymer | | Not added | | 1.74 × 10$^{-8}$ | 6.92 × 10$^{-9}$ | 2.51 | 100 |
| Comparative Example 2A | Silicone modified cycloolefin polymer | | Not added | | 2.37 × 10$^{-8}$ | 1.37 × 10$^{-8}$ | 1.73 | 100 |

*parts by mass for 100 parts by mass of silicone polymer

TABLE 4

| | Additive | | | | Amount for 100 parts by mass of silicon polymer |
|---|---|---|---|---|---|
| | Type | Commercial name | Manufacturer | Content of additive (g) | |
| Example 8A | Mesoporous silica | Prepared in Synthetic Example 2A | | 0.098 | 81.7 |
| Example 9A | | | | 0.042 | 35.1 |
| Comparative Example 3A | Spherical silica | NanoTek SiO$_2$ | C.I. Chemicals | 0.013 | 10.5 |
| Comparative Example 4A | | | | 0.027 | 22.3 |
| Comparative Example 5A | | | | 0.042 | 35.3 |
| Comparative Example 6A | | | | 0.060 | 50.0 |
| Example 10A | | | | 0.080 | 66.7 |
| Example 11A | | | | 0.240 | 200.0 |
| Comparative Example 7A | Spherical titanium oxide | NanoTek TiO$_2$ | C.I. Chemicals | 0.021 | 17.7 |
| Comparative Example 8A | | | | 0.135 | 112.1 |
| Example 12A | | | | 0.404 | 336.3 |

TABLE 5

| Type | Name Manufacturer | Surface property | Micropores | Average particle diameter (nm) |
|---|---|---|---|---|
| Mesoporous silica | Prepared in Synthetic Example 2A | Hydrophilic | Present (mesopores) | 500-1000[a] |
| Spherical silica | NanoTek SiO$_2$ C.I. Chemicals | Hydrophilic | Not containing | 25 |
| Spherical titanium oxide | NanoTek TiO$_2$ C.I. Chemicals | Hydrophilic | Not containing | 30 |

[a]The value indicates the particle size distribution for mesoporous silica prepared in Synthetic Example 2A.

The gas permeability coefficient of oxygen and nitrogen and the nSPM blocking rate of membranes prepared in Examples 8A to 12A and Comparative Examples 3A to 8A were measured according to the [Evaluation of membrane] described above. The results are shown in Table 6.

TABLE 6

| | Permeability coefficient [cm$^3$ · cm · sec$^{-1}$ · cm$^{-2}$ · cmHg$^{-1}$] | | Separation ratio α | nSPM blocking Rate |
|---|---|---|---|---|
| | Oxygen | Nitrogen | O$_2$/N$_2$ | wt % |
| Example 8A | 6.32 × 10$^{-5}$ | 6.60 × 10$^{-5}$ | 0.96 | 99.5 |
| Example 9A | 1.21 × 10$^{-7}$ | 1.25 × 10$^{-7}$ | 0.97 | 100 |
| Comparative Example 3A | 3.35 × 10$^{-9}$ | 1.50 × 10$^{-9}$ | 2.23 | 100 |
| Comparative Example 4A | 3.90 × 10$^{-9}$ | 1.62 × 10$^{-9}$ | 2.41 | 100 |
| Comparative Example 5A | 3.96 × 10$^{-9}$ | 1.67 × 10$^{-9}$ | 2.37 | 100 |
| Comparative Example 6A | 4.34 × 10$^{-9}$ | 1.82 × 10$^{-9}$ | 2.38 | 100 |
| Example 10A | 3.47 × 10$^{-6}$ | 3.63 × 10$^{-6}$ | 0.96 | 99.9 |
| Example 11A | 2.02 × 10$^{-5}$ | 2.11 × 10$^{-5}$ | 0.96 | 99.3 |
| Comparative Example 7A | 4.19 × 10$^{-9}$ | 1.78 × 10$^{-9}$ | 2.35 | 100 |
| Comparative Example 8A | 2.96 × 10$^{-9}$ | 1.28 × 10$^{-9}$ | 2.31 | 100 |
| Example 12A | 4.83 × 10$^{-5}$ | 5.04 × 10$^{-5}$ | 0.96 | 99.2 |

Example 13A

The silicone modified cycloolefin polymer prepared in Synthetic Example 1A was dissolved in toluene into a solid content of 10 wt %. A conductive polymer polyaniline (emeraldine base available from Aldrich, molecular weight: 20000) was dissolved in cyclohexanone into a solid content of 2 wt %. To 0.6 ml of the silicone modified cycloolefin polymer solution, 0.4 ml of the polyaniline solution (13.3 parts by mass for 100 parts by mass of silicone modified cycloolefin polymer) was compounded, and 50 parts by weight of spherical silica (commercial name: NanoTek SiO2, available from C.I. Chemicals) and 0.5 parts by mass of hydrochloric acid were further added for 100 parts by weight of silicone modified cycloolefin polymer. The mixture was agitated with an ultrasonic homogenizer. Using the mixed solution, a film was formed on a polycarbonate support (Isopore available from Japan Millipore Ltd., average pore diameter: 1.2 μm) by a water surface process. Toluene and cyclohexanone were removed using a drier to yield a membrane having an average diameter of 1.0 μm.

Example 14A

The silicone modified cycloolefin polymer prepared in Synthetic Example 1A was dissolved in toluene into a solid content of 10 wt %. A conductive polymer polyaniline (emeraldine base available from Aldrich, molecular weight: 20000) was dissolved in cyclohexanone into a solid content of 2 wt %. To 0.6 ml of the silicone modified cycloolefin polymer solution, 0.4 ml of the polyaniline solution (13.3 parts by mass for 100 parts by mass of silicone modified cycloolefin polymer) was compounded, and 50 parts by weight of spherical silica (commercial name: NanoTek SiO$_2$, available from C.I. Chemicals) and 1.5 parts by mass of vinylphosphonic acid were further added for 100 parts by weight of silicone modified cycloolefin polymer. The mixture was agitated with an ultrasonic homogenizer. Using the solution containing polyaniline and silica, a film was formed on a polycarbonate support (Isopore available from Japan Millipore Ltd., average pore diameter: 1.2 μm) by a water surface process. Toluene and cyclohexanone were removed using a drier to yield a membrane having an average diameter of 1.0 μm.

Example 15A

The silicone modified cycloolefin polymer prepared in Synthetic Example 1A was dissolved in toluene into a solid content of 10 wt %. A conductive polymer polyaniline (emeraldine base available from Aldrich, molecular weight: 20000) was dissolved in cyclohexanone into a solid content of 2 wt %. To 0.6 ml of the silicone modified cycloolefin polymer solution, 0.4 ml of the polyaniline solution (13.3 parts by mass for 100 parts by mass of silicone modified cycloolefin polymer) was compounded, and 100 parts by weight of spherical silica (commercial name: NanoTek $SiO_2$, available from C.I. Chemicals) and 0.5 parts by mass of hydrochloric acid were further added for 100 parts by weight of silicone modified cycloolefin polymer. The mixture was agitated with an ultrasonic homogenizer. Using the solution containing polyaniline and silica, a film was formed on a polycarbonate support (Isopore available from Japan Millipore Ltd., average pore diameter: 1.2 μm) by a water surface process. Toluene and cyclohexanone were removed using a drier to yield a membrane having an average diameter of 1.0 μm.

Example 16A

The silicone modified cycloolefin polymer prepared in Synthetic Example 1A was dissolved in toluene into a solid content of 10 wt %. A conductive polymer polyaniline (emeraldine base available from Aldrich, molecular weight: 20000) was dissolved in cyclohexanone into a solid content of 2 wt %. To 0.6 ml of the silicone modified cycloolefin polymer solution, 0.4 ml of the polyaniline solution (13.3 parts by mass for 100 parts by mass of silicone modified cycloolefin polymer) was compounded, and 100 parts by weight of spherical silica (commercial name: NanoTek $SiO_2$, available from C.I. Chemicals) and 1.5 parts by mass of vinylphosphonic acid were further added for 100 parts by weight of silicone modified cycloolefin polymer. The mixture was agitated with an ultrasonic homogenizer. Using the solution containing polyaniline and silica, a film was formed on a polycarbonate support (Isopore available from Japan Millipore Ltd., average pore diameter: 1.2 μm) by a water surface process. Toluene and cyclohexanone were removed using a drier to yield a membrane having an average diameter of 1.0 μm.

The gas permeability coefficient of oxygen and nitrogen and the nSPM blocking rate of membranes prepared in Examples 13A to 16A were measured according to the [Evaluation of membrane] described above. The results are shown in Table 7.

compared to a membrane containing silica only. Such a trend is significant for a lower additive content (Example 13A). At high additive contents, gaps formed between silica particles ensures a highly permeable structure without a reduction in permeability. In contrast, use of water-insoluble vinylphosphonic acid does not allow polyaniline to be adsorbed on the silica surface, but allows it to be dispersed with silica, resulting in a synergistic increase in path of gas. Accordingly, the permeability of the membrane is improved as compared to a membrane containing silica only. A higher permeability in Example 16A than that is Example 14A is probably affected by new gaps that are generated between silica or polyaniline particles.

Examples 17A to 22A

Silicone modified pullulan polymer (X-22-8400 available from Shin-Etsu Chemical Co., Ltd.) was dissolved in toluene into a solid content of 10 wt %. A conductive polymer polyaniline (emeraldine base available from Aldrich, molecular weight: 20000) was dissolved in cyclohexanone into a solid content of 2 wt %. To 0.6 ml of the silicone modified pullulan polymer solution, 0.4 ml of the polyaniline solution (13.3 parts by mass for 100 parts by mass of silicone modified pullulan polymer) was compounded. To 1 mL of this solution, a predetermined amount of acid shown in Table 8 was added, and the mixture was agitated with an ultrasonic homogenizer. Using the mixed solution, a film was formed on a polycarbonate support (Isopore available from Japan Millipore Ltd., average pore diameter: 0.22 μm) by a water surface process. Toluene and cyclohexanone were removed using a drier to yield a membrane having an average diameter of 0.1 μm.

Examples 23A to 28A

The silicone modified cycloolefin polymer prepared in Synthetic Example 1A was dissolved in toluene into a solid content of 10 wt %. A conductive polymer polyaniline (emeraldine base available from Aldrich, molecular weight: 20000) was dissolved in cyclohexanone into a solid content of 2 wt %. To 0.6 ml of the silicone modified cycloolefin polymer solution, 0.4 ml of the polyaniline solution (13.3 parts by mass for 100 parts by mass of silicone modified cycloolefin polymer) was compounded, and the mixture was agitated

TABLE 7

| | Silicone polymer | Additive 1 | | | | Additive 2 | | Permeability coefficient [$cm^3 \cdot cm \cdot sec^{-1} \cdot cm^{-2} \cdot cmHg^{-1}$] | | Separation ratio α | nSPM blocking Rate |
|---|---|---|---|---|---|---|---|---|---|---|---|
| | Type | Type | Content* | Type of acid | Content* | Type | Content* | Oxygen | Nitrogen | $O_2/N_2$ | wt % |
| Example 13A | Silicone-modified cycloolefin polymer | Polyaniline | 13.3 parts by mass | Hydrochloric acid | 0.5 Parts by mass | Silica | 50 parts by mass | $1.44 \times 10^{-6}$ | $1.48 \times 10^{-6}$ | 0.97 | 97.1 |
| Example 14A | | | | Vinylphosphonic acid | 1.5 parts by mass | | | $4.32 \times 10^{-6}$ | $4.55 \times 10^{-6}$ | 0.95 | 96.5 |
| Example 15A | | Polyaniline | 13.3 parts by mass | Hydrochloric acid | 0.5 Parts by mass | | 100 parts by mass | $8.47 \times 10^{-6}$ | $8.91 \times 10^{-6}$ | 0.95 | 96.4 |
| Example 16A | | | | Vinylphosphonic acid | 1.5 parts by mass | | | $1.33 \times 10^{-5}$ | $1.40 \times 10^{-5}$ | 0.95 | 95.8 |

*parts by mass for 100 parts by mass of silicone polymer

It is suggested that these results are significantly affected by the affinity of the silica surface to acid. The surface of the silica used is hydrophilic. Probably, polyaniline containing hydrochloric acid can be readily adsorbed on the silica surface. This would reduce gaps at the interfaces between the silicone polymer and silica, resulting in low permeability with an ultrasonic homogenizer. To 1 mL of this solution, a predetermined amount of acid shown in Table 8 was added, and the mixture was agitated with an ultrasonic homogenizer. Using the mixed solution, a film was formed on a polycarbonate support (Isopore available from Japan Millipore Ltd., average pore diameter: 0.22 μm) by a water surface process.

Toluene and cyclohexanone were removed using a drier to yield a membrane having an average diameter of 0.1 µm.

The gas permeability coefficient of oxygen and nitrogen and the nSPM blocking rate of membranes prepared in Examples 17A to 28A were measured according to the [Evaluation of membrane] described above. The results are shown in Table 8.

TABLE 8

| | Silicone polymer | Type | Content* | | Type of acid | Acid Content* | Permeability coefficient [$cm^3 \cdot cm \cdot sec^{-1} \cdot cm^{-2} \cdot cmHg^{-1}$] Oxygen | Nitrogen | Separation ratio α $O_2/N_2$ | nSPM blocking Rate wt % |
|---|---|---|---|---|---|---|---|---|---|---|
| Example 17A | Silicone- | Polyaniline | 13.3 | IA*2 | Hydrochloric acid | 0.1 | $5.42 \times 10^{-7}$ | $5.64 \times 10^{-7}$ | 0.96 | 99.9 |
| Example 18A | modified | | parts by | | Perchloric acid | 0.3 | $3.85 \times 10^{-7}$ | $4.04 \times 10^{-7}$ | 0.95 | 99.5 |
| Example 19A | pullulan | | weight | | Sulfuric acid | 0.3 | $4.65 \times 10^{-7}$ | $4.72 \times 10^{-7}$ | 0.98 | 99.8 |
| Example 20A | polymer | | | | Nitric acid | 0.2 | $4.56 \times 10^{-7}$ | $4.74 \times 10^{-7}$ | 0.96 | 99.7 |
| Example 21A | | | | OA*3 | Vinylphosphonic acid | 0.3 | $3.22 \times 10^{-7}$ | $3.34 \times 10^{-7}$ | 0.96 | 99.7 |
| Example 22A | | | | | Acrylic acid | 0.2 | $1.23 \times 10^{-7}$ | $1.26 \times 10^{-7}$ | 0.98 | 99.7 |
| Example 23A | Silicone- | | | IA*2 | Hydrochloric acid | 0.5 | $4.30 \times 10^{-7}$ | $4.48 \times 10^{-7}$ | 0.96 | 99.9 |
| Example 24A | modified | | | | Perchloric acid | 1.4 | $7.71 \times 10^{-7}$ | $8.12 \times 10^{-7}$ | 0.95 | 99.9 |
| Example 25A | cycloolefin | | | | Sulfuric acid | 1.4 | $5.48 \times 10^{-7}$ | $5.69 \times 10^{-7}$ | 0.96 | 99.8 |
| Example 26A | polymer | | | | Nitric acid | 0.9 | $2.11 \times 10^{-7}$ | $2.21 \times 10^{-7}$ | 0.95 | 99.6 |
| Example 27A | | | | OA*3 | Vinylphosphonic acid | 1.5 | $2.69 \times 10^{-7}$ | $2.81 \times 10^{-7}$ | 0.96 | 99.8 |
| Example 28A | | | | | Acrylic acid | 1.0 | $3.81 \times 10^{-7}$ | $3.98 \times 10^{-7}$ | 0.96 | 99.9 |

*parts by mass for 100 parts by mass of silicone polymer
*2IA = Inorganic acid
*3OA = Organic acid Example 1B Silicone modified pullulan polymer (X-22-8400 available from Shin-Etsu Chemical Co., Ltd.) was dissolved in toluene into a solid content of 10 wt %. To the resulting solution, 20 parts by mass of ionic liquid 1-ethyl-4-methylimidazolium nitrate (available from Kanto Chemical Co., Inc., melting point: 38° C.) was added for 100 parts by weight of silicone modified pullulan polymer. The resulting solution containing ionic liquid was placed into a Teflon (Registered Trade Mark by Du Pont, USA) petri dish (diameter: 90 mm), and toluene was removed using a drier at a temperature (for example, 60° C.) that is higher than the melting point of the ionic liquid. A membrane having an average thickness of 15 µm was yielded. After evaporation of the organic solvent, the membrane was allowed to stand at a temperature (for example, 25° C.) below the melting point of the ionic liquid to solidify the ionic liquid.

Example 2B

Silicone modified pullulan polymer (X-22-8400 available from Shin-Etsu Chemical Co., Ltd.) was dissolved in toluene into a solid content of 10 wt %. To the resulting solution, 20 parts by mass of ionic liquid 1-ethyl-4-methylimidazolium phosphate (available from Kanto Chemical Co., Inc., melting point: 58-60° C.) was added for 100 parts by weight of silicone modified pullulan polymer. The resulting solution containing ionic liquid was placed into a Teflon (Registered Trade Mark by Du Pont, USA) petri dish (diameter: 90 mm), and toluene was removed using a drier at a temperature (for example, 70° C.) that is higher than the melting point of the ionic liquid. A membrane having an average thickness of 15 µm was yielded. After evaporation of the organic solvent, the membrane was allowed to stand at a temperature (for example, 25° C.) below the melting point of the ionic liquid to solidify the ionic liquid.

Example 3B

Silicone modified cycloolefin polymer (X-22-1960 available from Shin-Etsu Chemical Co., Ltd.) was dissolved in toluene into a solid content of 10 wt %. To the resulting solution, 20 parts by mass of ionic liquid 1-ethyl-4-methylimidazolium nitrate (available from Kanto Chemical Co., Inc., melting point: 38° C.) was added for 100 parts by weight of silicone modified cycloolefin polymer. The resulting solution containing ionic liquid was placed into a Teflon (Registered Trade Mark by Du Pont, USA) petri dish (diameter: 90 mm), and toluene was removed using a drier at a temperature (for example, 60° C.) that is higher than the melting point of the ionic liquid. A membrane having an average thickness of 15 µm was yielded. After evaporation of the organic solvent, the membrane was allowed to stand at a temperature (for example, 25° C.) below the melting point of the ionic liquid to solidify the ionic liquid.

Example 4B

Silicone modified cycloolefin polymer (X-22-1960 available from Shin-Etsu Chemical Co., Ltd.) was dissolved in toluene into a solid content of 10 wt %. To the resulting solution, 20 parts by mass of ionic liquid 1-ethyl-4-methylimidazolium phosphate (available from Kanto Chemical Co., Inc., melting point: 58-60° C.) was added for 100 parts by weight of silicone modified cycloolefin polymer. The resulting solution containing ionic liquid was placed into a Teflon (Registered Trade Mark by Du Pont, USA) petri dish (diameter: 90 mm), and toluene was removed using a drier at a temperature (for example, 70° C.) that is higher than the melting point of the ionic liquid. A membrane having an average thickness of 15 µm was yielded. After evaporation of the organic solvent, the membrane was allowed to stand at a temperature (for example, 25° C.) below the melting point of the ionic liquid to solidify the ionic liquid.

Comparative Example 1B

Silicone modified pullulan polymer (X-22-8400 available from Shin-Etsu Chemical Co., Ltd.) was dissolved in toluene into a solid content of 1 wt %. The resulting solution was placed into a Teflon (Registered Trade Mark by Du Pont, USA) petri dish (diameter: 90 mm), and toluene was removed using a vacuum drier (for example, 60° C.). A membrane having an average thickness of 15 μm was yielded.

Comparative Example 2B

Silicone modified cycloolefin polymer (X-22-1960 available from Shin-Etsu Chemical Co., Ltd.) was dissolved in toluene into a solid content of 1 wt %. The resulting solution containing ionic liquid was placed into a Teflon (Registered Trade Mark by Du Pont, USA) petri dish (diameter: 90 mm), and toluene was removed using a drier (for example, 60° C.). A membrane having an average thickness of 15 μm was yielded.

The gas permeability coefficient of oxygen and nitrogen and the nSPM blocking rate of membranes prepared in Examples 1B to 4B and Comparative Examples 1B and 2B were measured according to the [Evaluation of membrane] described above. The results are shown in Table 9.

TABLE 9

| | Additive | | | | Permeability coefficient [$cm^3 \cdot cm \cdot sec^{-1} \cdot cm^{-2} \cdot cmHg^{-1}$] | | Separation ratio α | nSPM blocking Rate |
|---|---|---|---|---|---|---|---|---|
| | Silicone polymer | Type | Content* | Melting point | Oxygen | Nitrogen | $O_2/N_2$ | wt % |
| Example 1B | Silicone modified pullulan polymer | 1-ethyl-4-methylimidazolium nitrate | 20 parts by mass | 38° C. | $8.84 \times 10^{-6}$ | $9.21 \times 10^{-6}$ | 0.96 | 99.9 |
| Example 2B | Silicone modified pullulan polymer | 1-ethyl-4-methylimidazolium phosphate | | 50-60° C. | $1.04 \times 10^{-6}$ | $1.09 \times 10^{-5}$ | 0.95 | 99.5 |
| Example 3B | Silicone modified cycloolefin polymer | 1-ethyl-4-methylimidazolium nitrate | | 38° C. | $3.29 \times 10^{-5}$ | $3.47 \times 10^{-5}$ | 0.95 | 99.3 |
| Example 4B | Silicone modified cycloolefin polymer | 1-ethyl-4-methylimidazolium phosphate | | 50-60° C. | $4.17 \times 10^{-5}$ | $4.39 \times 10^{-5}$ | 0.95 | 99.0 |
| Comparative Example 1B | Silicone modified pullulan polymer | Without additive | | | $1.74 \times 10^{-8}$ | $6.92 \times 10^{-8}$ | 2.51 | 100.0 |
| Comparative Example 2B | Silicone modified cycloolefin polymer | Without additive | | | $2.37 \times 10^{-8}$ | $1.37 \times 10^{-8}$ | 1.73 | 100.0 |

*parts by mass for 100 parts by mass of silicone polymer

Example 1C

A liquid mixture of 88 g of Pluronic P123 (available from BASF, (ethylene oxide)$_{20}$(propylene oxide)$_{70}$(ethylene oxide)$_{20}$), 2640 g of water, 453.5 ml of hydrochloric acid was stirred with a mechanical stirrer at room temperature. After Pluronic P123 was dissolved, 187.8 g of tetraethoxysilane (available from Kanto Chemical Co., Inc.) was added dropwise, and then the mixture was further stirred for 12 hours. The mixture was heated in an oven held at 35° C. for 20 hours, and further heated in an oven held at 100° C. for 24 hours. The resulting white solid was washed with water, was recovered by filtration, and was dried with a vacuum pump. The product was calcined in a furnace held at 550° C. for 6 hours to yield mesoporous silica (56.3 g).

Next, silicone modified pullulan polymer (X-22-8400 available from Shin-Etsu Chemical Co., Ltd.) was dissolved in toluene into a content of silicone modified pullulan polymer (solid content) of 10 wt %. To 12 g of the resulting solution, 0.098 g of the mesoporous silica described above (81.7 parts by mass of mesoporous silica for 100 parts by mass of solid component of silicone modified pullulan resin) was compounded. The mixture was agitated with an ultrasonic homogenizer to prepare a permselective material.

After a reinforcement mesh PET 64-HC was placed on a PET film, a mesh filler coating is applied to openings of the PET 64-HC placed on the PET film with a wire coater, to fill the openings of the PET 64-HC with the mesh filler coating. The mesh filler coating used is a 50 wt % HEAA resin (solid component) solution in ethanol.

After the openings of the PET 64-HC are filled with the mesh filler coating, the mesh filler coating applied to the PET 64-HC is heat-treated to evaporate ethanol diluent from the mesh filler coating in the openings of the PET 64-HC, whereby exposed portions of the PET 64-HC was formed through a reduction in volume of the mesh filler.

The permselective material was coated with a wire coater so as to cover the exposed portions of the PET 64-HC and the exposed portions of the mesh filler material in the openings. The solvent (toluene) is removed by heat treatment from the permselective material to prepare a permselective membrane from the permselective material.

The PET film was separated from a laminate of the PET 64-HC and the permselective membrane. The mesh filler in the openings of the PET 64-HC is removed by water washing from a surface remote from the permselective film. After the mesh filler is removed, the PET 64-HC and the permselective membrane were dried to prepare a permselective membrane structure of Example 1C. The average thickness of the permselective membrane of the permselective membrane structure was controlled to 3.8 μm.

Examples 2C to 4C and 7C to 9C

Permselective membrane structures of Examples 2C to 4C and 7C to 9C were prepared as in Example 1C except that the type of the reinforcement mesh, the type of the resin contained in the mesh filler coating, the content (wt %) of the resin (solid component) in the mesh filler coating, the type of the additive contained in the permselective material, the amount (parts by mass) of the additive for 100 parts by mass of silicone modified pullulan resin solid component are modified as shown in Table 10. NanoTek $SiO_2$ shown in Table 10 is an additive available from C.I. Chemicals.

TABLE 10

| | Reinforcement mesh | Resin | Mesh filler coating Weight % of solid component | Intermediate layer | Silicone polymer | Permselective material Weight % of solid component | Additive | Additive content* (parts by mass) |
|---|---|---|---|---|---|---|---|---|
| Comparative Example 1C | PET 64-HC | | Not used | | Silicone modified | 10 | NanoTek SiO$_2$ | 85.7 |
| Comparative Example 2C | PET 85-HC | | Not used | | pullulan polymer | 10 | | 85.7 |
| Example 1C | PET 64-HC | HEAA | 50 | Not used | Silicone | 10 | Mesoporous | 81.7 |
| Example 2C | PET 85-HC | HEAA | 50 | Not used | modified | 10 | silica | 81.7 |
| Example 3C | PET 85-HC | HEAA | 50 | Not used | pullulan | 10 | NanoTek | 85.7 |
| Example 4C | PET 85-HC | HEAA | 80 | Not used | polymer | 10 | SiO$_2$ | 85.7 |
| Example 5C | PET 85-HC | HEAA | 80 | PVA 20 wt % JL-05E | | 10 | | 85.7 |
| Example 6C | PET 85-HC | HEAA | 80 | PVA 20 wt % ASP05 | | 10 | | 85.7 |
| Example 7C | PET 85-HC | DEAA | 50 | Not used | | 10 | | 85.7 |
| Example 8C | PET 85-HC | DEGV | 50 | Not used | | 10 | | 85.7 |
| Example 9C | PET 85-HC | PEG | 50 | Not used | | 10 | | 85.7 |

*Amount (parts by mass) of additive for 100 parts by mass of silicone polymer

Example 5C

In Example 5C, a permselective membrane structure was prepared as in Example 1C except that the type of the reinforcement mesh, the type of the resin contained in the mesh filler coating, the content (wt %) of the resin (solid component) in the mesh filler coating, the type of the additive contained in the permselective material, the amount (parts by mass) of the additive for 100 parts by mass of silicone modified pullulan resin solid component were modified as shown in Table 10. The permselective membrane structure of Example 5C was prepared by another method different from that in Example 1C, as follows:

After a reinforcement mesh PET 85-HC was placed on a PET film, a mesh filler coating is applied to PET 85-HC on the PET film to fill the openings of PET 85-HC with the mesh filler coating.

A coating that is adhesive to both the mesh filler and the permselective material is applied onto PET 85-HC coated with the mesh filler coating to form an intermediate layer from this coating. The thickness of the intermediate layer was about 2.6 μm. The coating for the intermediate layer was an aqueous solution containing 20 wt % PVA (JL-05E available from Japan VAM & POVAL Co., Ltd.) that was adhesive to both the mesh filler HEAA and the permselective material.

After the formation of the intermediate layer, the solvent component contained in the mesh filler in the openings of PET 85-HC and the intermediate layer was removed through heat treatment, whereby exposed portions of PET 85-HC were formed by the volume shrinkage of the mesh filler and the intermediate layer.

The permselective material was applied with a wire coater so as to cover the exposed portions of PET 85-HC and the intermediate layer. The solvent component in the permselective material was removed by heat treatment; thereby a permselective membrane was formed of the permselective material.

After the formation of the permselective membrane, the PET film was removed from PET 85-HC provided with the permselective membrane. The mesh filler in the opening of the PET 85-HC and the inner intermediate layer were removed by water washing from the free surface, remote from the permselective membrane of the PET 85-HC. After the removal of the mesh filler and the intermediate layer, the PET 85-HC and the permselective membrane were dried; thereby a permselective membrane structure of Example 5C was formed.

Example 6C

A permselective membrane structure of Example 6C was formed as in Example 5C except that the coating for forming the intermediate layer was an aqueous 20 wt % PVA (ASP05 available from Japan VAM & POVAL Co., Ltd.) solution.

Comparative Examples 1C and 2C

In Comparative Examples 1C and 2C, permselective membrane structures were formed as in Example 1C except that the type of the reinforcement mesh, the type of the resin contained in the mesh filler coating, the content (wt %) of the resin (solid components) in the mesh filler coating, the type of the additive contained in the permselective material, the content of the additive (parts by mass) for 100 parts by mass of the silicone modified pullulan resin solid component were modified as shown in Table 10. Furthermore, in Comparative Examples 1C and 2C, the permselective material was directly applied to the reinforcement mesh without treatment with mesh filler.

In each of Examples 1C to 9C and Comparative Examples 1C and 2C, after the formation of the permselective membrane by the coating of the permselective material to the reinforcement mesh, the properties (uniformity of the thickness and surface smoothness) of the resulting permselective membrane were evaluated.

In Examples 1C to 9C involving the reinforcement meshes treated with the mesh filler, each permselective membrane structure had permselective membrane having a smooth surface with a uniform thickness, without excess flow of the permselective material into the opening of the reinforcement mesh. In Examples 1C to 6C using a HEAA resin solution in ethanol as a mesh filler, it was confirmed that mesh-filling was ensured by the mesh filler and the permselective membrane was satisfactorily formed.

By contrast, in Comparative Examples 1C and 2C involving the permselective membranes formed by directly applying a permselective material to the reinforcement meshes without treatment of the reinforcement meshes with the mesh filler, the permselective membranes did not have a smooth surface with a uniform thickness due to excess flow of the permselective material into the openings of the reinforcement meshes.

(Evaluation of Gas Permeability Coefficient)

A permselective membrane structure of Example 3a was prepared as in Example 3C except that the thickness of the permselective membrane was modified to a value shown in Table 11. A permselective membrane structure of Example 4a was prepared as in Example 4C except that the thickness of the permselective membrane was modified to a value shown in Table 11. A permselective membrane structure of Example 6a was prepared as in Example 6C except that the thickness of the permselective membrane was modified to a value shown in Table 11. A permselective membrane structure of Example 1a was prepared as in Example 1C except that the thickness of the permselective membrane was modified to a value shown in Table 11. With the membranes prepared in Examples 3a, 4a, and 6a and Comparative Example 1a, the gas permeability coefficient for oxygen and nitrogen and nSPM blocking rate were measured according to the [Evaluation of membrane] described above. The results are shown in Table 11.

TABLE 11

| | Thickness of permselective membrane (μm) | Gas permeability | | | nSPM blocking rate weight % |
|---|---|---|---|---|---|
| | | $P(O_2)$ | $P(N_2)$ | $\alpha(P(O_2)/P(N_2))$ | |
| Example 3a | 3 | $3.8 \times 10^{-6}$ | $4.0 \times 10^{-6}$ | 0.95 | 82.2 |
| Example 4a | 2.3 | $6.2 \times 10^{-7}$ | $6.5 \times 10^{-7}$ | 0.96 | 80.9 |
| Example 6a | 1.8 | $2.3 \times 10^{-7}$ | $2.4 \times 10^{-7}$ | 0.96 | 87.6 |
| Comparative Example 1a | 6.5 | $4.5 \times 10^{-6}$ | $4.7 \times 10^{-6}$ | 0.95 | 66.2 |

Reference Examples 1C to 3C

In Reference Examples 1C to 3C, permselective membrane structures were prepared as in Example 1C except that no mesh filler was used and the type of the reinforcement mesh, the type of the additive contained in the permselective material, and the content (parts by mass) of the additive for 100 parts by mass of silicone modified pullulan resin solid component were modified as shown in Table 12. Furthermore, in Reference Examples 1C to 3C, the permselective membrane structure was prepared by the following process different from that in Example 1C. In Reference Examples 1C to 3C, a water-miscible PVA film was formed on an removable PET film as a support by a coater process. The average thickness of the PVA film is shown in Table 12. A permselective material shown in Table 12 was applied onto the PVA film by a coater process to form a permselective membrane. After the permselective membrane was transferred onto a reinforcement mesh (PET 85-HC), it was dipped into water to dissolve the PVA film. Accordingly, a permselective membrane structure was formed.

In Reference Examples 1C to 3C, the properties (uniformity of thickness and surface smoothness) of the permselective membrane were evaluated.

In Reference Examples 1C to 3C, each permselective membrane structure had a uniform thickness with a smooth surface. It was confirmed that the amount of the residue of the PVA film remaining on the produced permselective membrane structure was reduced as the thickness of the water-miscible PVA film on the exfoliate PET film was reduced.

The invention claimed is:

1. A permselective material comprising a polymer having an organosiloxane skeleton and containing a dispersed solid additive, wherein when oxygen and nitrogen are passed through a membrane comprising the permselective material, the relation between the permeability coefficients [cm³·cm·sec⁻¹·cm⁻²·cmHg⁻¹] of oxygen and nitrogen at a temperature of 23±2° C. under a pressure difference of 1.05 atm to 1.20 atm through the membrane is expressed by Formula (1):

$$0.94 \leq \frac{P(O_2)}{P(N_2)} < 1 \quad (1)$$

where $P(O_2)$ denotes the permeability coefficient of oxygen, while $P(N_2)$ denotes the permeability coefficient of nitrogen.

2. A permselective membrane structure comprising a product made by a method comprising the steps of:
filling openings of a reinforcement mesh with a mesh filler;
reducing the volume of the mesh filler filled in the openings;
forming a permselective membrane of a permselective material so as to cover exposed portions of the reinforcement mesh uncovered with the mesh filler and exposed portions of the mesh filler filled in the openings; and

TABLE 12

| | Supporting film | | | Permselective material | | | |
|---|---|---|---|---|---|---|---|
| | Reinforcement mesh | Resin | Thickness of permselective membrane (μm) | Silicone polymer | Content of solid component (wt %) | Additive | Content of additive (parts by mass for 100 parts by mass of silicone polymer) |
| Reference Example 1C | PET 85-HC | PVA 20 wt % JL-05E | 10 | Silicone modified pullulan polymer | 10 | NanoTek SiO₂ | 85.7 |
| Reference Example 2C | | | 3.5 | | | | |
| Reference Example 3C | | | 2 | | | | | removing the mesh filler from the openings of reinforcement mesh after the formation of the permselective membrane, wherein the permselective membrane structure includes the reinforcement mesh and the permselective membrane stacked on the reinforcement mesh, wherein the permselective material to form the permselective membrane comprises a polymer having an organosiloxane skeleton and containing a dispersed solid additive, and when oxygen and nitrogen are passed through the membrane comprising the permselective material, the relation between the permeability coefficients [cm$^3$·cm·sec$^{-1}$·cm$^{-2}$·cmHg$^{-1}$] of oxygen and nitrogen at a temperature of 23±2° C. under a pressure difference of 1.05 atm to 1.20 atm through the membrane is expressed by Formula (1), the width of the opening of the reinforcement mesh being larger than the thickness of the permselective membrane, and the opening ratio of the reinforcement mesh being not less than 30%;

$$0.94 \leq \frac{P(O_2)}{P(N_2)} < 1 \quad (1)$$

where $P(O_2)$ denotes the permeability coefficient of oxygen, while $P(N_2)$ denotes the permeability coefficient of nitrogen.

3. A permselective membrane structure comprising a product made by a method comprising the steps of:

filling openings of a reinforcement mesh with a mesh filler;

reducing the volume of the mesh filler filled in the openings;

forming a permselective membrane of a permselective material so as to cover exposed portions of the reinforcement mesh uncovered with the mesh filler and exposed portions of the mesh filler filled in the openings; and removing the mesh filler from the openings of reinforcement mesh after the formation of the permselective membrane, wherein the permselective membrane structure includes the reinforcement mesh and the permselective membrane stacked on the reinforcement mesh, wherein the permselective material to form the permselective membrane comprises a polymer having an organosiloxane skeleton and containing an ionic liquid additive, and when oxygen and nitrogen are passed through the membrane comprising the permselective material, the relation between the permeability coefficients [cm$^3$·cm·sec$^{-1}$·cm$^{-2}$·cmHg$^{-1}$] of oxygen and nitrogen at a temperature of 23±2° C. under a pressure difference of 1.05 atm to 1.20 atm through the membrane is expressed by Formula (1), the width of the opening of the reinforcement mesh being larger than the thickness of the permselective membrane, and the opening ratio of the reinforcement mesh being not less than 30%;

$$0.94 \leq \frac{P(O_2)}{P(N_2)} < 1 \quad (1)$$

where $P(O_2)$ denotes the permeability coefficient of oxygen, while $P(N_2)$ denotes the permeability coefficient of nitrogen.

4. A ventilation system comprising a permselective membrane structure that supplies gas to a space to be ventilated and/or discharges the gas from the space, wherein the permselective membrane structure is a permselective membrane structure according to claim 2.

5. The permselective material according to claim 1, wherein when gas passes through the membrane comprising the permselective material, a Knudsen flow occurs in the flow of gas therethrough.

6. The permselective material according to claim 1, wherein the polymer having an organosiloxane skeleton is a silicone copolymer composed of polyorganosiloxane units and organic monomer units or a polyorganosiloxane.

7. A ventilation system having a membrane that supplies gas to a space to be ventilated and/or discharges gas from the space, wherein the membrane comprises the permselective material according to claim 1.

8. A permselective membrane structure comprising a product made by a method comprising the steps of:

filling openings of a reinforcement mesh with a mesh filler;

forming an intermediate layer capable of bonding both the mesh filler and a permselective material on exposed portions of the mesh filler filled in the opening;

reducing the volume of the mesh filler filled in the opening;

forming a permselective membrane of a permselective material so as to cover exposed portions of the reinforcement mesh uncovered with the mesh filler and the intermediate layer; and removing the mesh filler and the intermediate layer from the openings of the reinforcement mesh after the formation of the permselective membrane;

wherein the permselective membrane structure includes the reinforcement mesh and the permselective membrane stacked on the reinforcement mesh, wherein the permselective material to form the permselective membrane comprises a polymer having an organosiloxane skeleton and containing a dispersed solid additive, and when oxygen and nitrogen are passed through the membrane comprising the permselective material, the relation between the permeability coefficients [cm$^3$·cm·sec$^{-1}$·cm$^{-2}$·cmHg$^{-1}$] of oxygen and nitrogen at a temperature of 23±2° C. under a pressure difference of 1.05 atm to 1.20 atm through the membrane is expressed by Formula (1), the width of the opening of the reinforcement mesh being larger than the thickness of the permselective membrane, and the opening ratio of the reinforcement mesh being not less than 30%;

$$0.94 \leq \frac{P(O_2)}{P(N_2)} < 1 \quad (1)$$

where $P(O_2)$ denotes the permeability coefficient of oxygen, while $P(N_2)$ denotes the permeability coefficient of nitrogen.

9. A permselective membrane structure comprising a product made by a method comprising the steps of:

filling openings of a reinforcement mesh with a mesh filler;

forming an intermediate layer capable of bonding both the mesh filler and a permselective material on exposed portions of the mesh filler filled in the opening;

reducing the volume of the mesh filler filled in the opening;

forming a permselective membrane of a permselective material so as to cover exposed portions of the reinforcement mesh uncovered with the mesh filler and the intermediate layer; and removing the mesh filler and the intermediate layer from the openings of the reinforcement mesh after the formation of the permselective membrane;

wherein the permselective membrane structure includes the reinforcement mesh and the permselective membrane stacked on the reinforcement mesh, wherein the permselective material to form the permselective membrane comprises a polymer having an organosiloxane skeleton and containing an ionic liquid additive, and when oxygen and nitrogen are passed through the membrane comprising the permselective material, the relation between the permeability coefficients [cm$^3$·cm·sec$^{-1}$·cm$^{-2}$·cmHg$^{-1}$] of oxygen and nitrogen at a temperature of 23±2° C. under a pressure difference of 1.05 atm to 1.20 atm through the membrane is expressed by Formula (1), the width of the opening of the reinforcement mesh being larger than the thickness of the permselective membrane, and the opening ratio of the reinforcement mesh being not less than 30%;

$$0.94 \leq \frac{P(O_2)}{P(N_2)} < 1 \tag{1}$$

where $P(O_2)$ denotes the permeability coefficient of oxygen, while $P(N_2)$ denotes the permeability coefficient of nitrogen.

10. A ventilation system comprising a permselective membrane structure that supplies gas to a space to be ventilated and/or discharges the gas from the space, wherein the permselective membrane structure is a permselective membrane structure according to claim 3.

11. A ventilation system comprising a permselective membrane structure that supplies gas to a space to be ventilated and/or discharges the gas from the space, wherein the permselective membrane structure is a permselective membrane structure according to claim 8.

12. A ventilation system comprising a permselective membrane structure that supplies gas to a space to be ventilated and/or discharges the gas from the space, wherein the permselective membrane structure is a permselective membrane structure according to claim 9.

* * * * *